United States Patent
Li et al.

(10) Patent No.: US 11,761,845 B2
(45) Date of Patent: Sep. 19, 2023

(54) INSPECTION OF VACUUM PACKAGED PRODUCT FOR DETECTION OF GAS INSIDE PACKAGE

(71) Applicant: Cryovac, LLC, Charlotte, NC (US)

(72) Inventors: Honglei Li, Charlotte, NC (US); Dewitt Jones, Greer, SC (US); Elyse Ford, Fort Mill, SC (US); Wafic Omar El-Kara, Charlotte, NC (US); Solomon Bekele, Charlotte, NC (US); Kalpit Shailesh Mehta, Charlotte, NC (US); Richard Keith Watson, Fort Mill, SC (US); Kevin Heitz, Charlotte, NC (US); Benjamin Scott Oslund, Charlotte, NC (US)

(73) Assignee: Cryovac, LLC, Charlotte, NC (US)

( * ) Notice: Subject to any disclaimer, the term of this patent is extended or adjusted under 35 U.S.C. 154(b) by 12 days.

(21) Appl. No.: 17/266,154

(22) PCT Filed: Aug. 8, 2019

(86) PCT No.: PCT/US2019/045640
§ 371 (c)(1),
(2) Date: Feb. 5, 2021

(87) PCT Pub. No.: WO2020/033635
PCT Pub. Date: Feb. 13, 2020

(65) Prior Publication Data
US 2021/0310893 A1    Oct. 7, 2021

Related U.S. Application Data

(60) Provisional application No. 62/716,187, filed on Aug. 8, 2018.

(51) Int. Cl.
*G01M 3/20* (2006.01)

(52) U.S. Cl.
CPC .................. *G01M 3/20* (2013.01)

(58) Field of Classification Search
CPC ................ G01M 3/20; G91M 3/20
See application file for complete search history.

(56) References Cited

U.S. PATENT DOCUMENTS

| 4,278,738 A | 7/1981 | Brax et al. |
| 5,692,360 A | 12/1997 | McDonald et al. |

(Continued)

FOREIGN PATENT DOCUMENTS

| EP | 0065619 A1 * | 2/1982 | ............ G01M 3/226 |
| EP | 0673507 | 6/1997 | |

(Continued)

OTHER PUBLICATIONS

Bischoff, "New Oxygen Barrier Joint Containing a Color Revelator", (FR 3017683 A1) (Year: 2015).*

*Primary Examiner* — John Fitzgerald
(74) *Attorney, Agent, or Firm* — Jason R. Womer

(57) ABSTRACT

A process, product, and system for detecting a defective vacuum in a packaged product. The process may include providing a packaged product including a product enclosed within a packaging article. The packaging article may include a film having at least one layer containing a fluorescence-based indicator. The process may further include exposing the packaged product to incident electromagnetic energy to produce an excited fluorescence-based indicator, such that the excited fluorescence-based indicator emits fluorescent electromagnetic energy; and determining, based on the fluorescent electromagnetic energy emitted by the excited fluorescence-based indicator, that gas is present within the packaging article.

22 Claims, 27 Drawing Sheets

(56) References Cited

U.S. PATENT DOCUMENTS

| | | | |
|---|---|---|---|
| 6,499,274 B1 | 12/2002 | McDonald et al. | |
| 7,534,615 B2 * | 5/2009 | Havens | B65D 79/02 |
| | | | 436/127 |
| 9,097,609 B1 | 8/2015 | Kelley et al. | |
| 2003/0082321 A1 * | 5/2003 | Kennedy | G01N 31/225 |
| | | | 428/690 |
| 2004/0246479 A1 * | 12/2004 | Cartlidge | G06T 3/40 |
| | | | 250/222.2 |
| 2012/0087968 A1 | 4/2012 | Ebner et al. | |
| 2016/0266002 A1 * | 9/2016 | Hunt | G01M 3/22 |
| 2017/0268996 A1 * | 9/2017 | Krottmaier | G01N 33/0036 |

FOREIGN PATENT DOCUMENTS

| | | | | |
|---|---|---|---|---|
| FR | 3017683 A1 * | 8/2015 | ........... | B32B 27/304 |
| WO | 2004052644 | 6/2004 | | |
| WO | WO-2004052644 A2 * | 6/2004 | ........... | B32B 27/065 |
| WO | WO-2005059500 A1 * | 6/2005 | ............ | G01M 3/226 |
| WO | 2012047947 | 4/2012 | | |

* cited by examiner

INSPECTION OF VACUUM PACKAGED PRODUCT FOR DETECTION OF GAS INSIDE PACKAGE

BACKGROUND

The invention relates to a process for inspecting vacuum packaged products for quality assurance, to ensure that vacuum tightness is obtained and maintained inside the package.

Flexible films are frequently used in vacuum packaging because they are capable of conforming to surfaces of products. Various package defects can result in gas inside a vacuum package, including, among other causes: hole or tear in film, seal discontinuity at time of forming seal, seal failure after seal is formed, and obtaining insufficient vacuum during the packaging process.

Products with a short shelf life, such as food products, exhibit extended shelf life when packaged under vacuum, i.e., in a vacuum package. Food contact with gas inside a vacuum package lowers the shelf life of the food by accelerating the rate of spoilage.

Detection of leaking vacuum packages containing food products remains today as a labor-intensive, offline, destructive process at the customer packaging facility. Traditional instrumented leaker detection methods are known which are based on the pressure difference, pressure gradient, or emitted gas (e.g., $CO_2$) detection. Most of these processes and systems are destructive and can only be performed offline.

It would be desirable to be able to check vacuum packaged products for package vacuum integrity, e.g., a check for the presence of gas inside the vacuum package, in a nondestructive process in an embodiment which can be performed in-line. It would also be desirable to have a package integrity check that can inspect the vacuum package for the desired vacuum level.

BRIEF SUMMARY

During packaging and/or distribution, early detection of gas inside a vacuum package, followed by unpackaging and repackaging, can thwart potential food spoilage, enhance shelf life, and improve product consistency.

It has been discovered that if a film is provided with an indicator which fluoresces after being excited by incident electromagnetic energy, and the film is used in the vacuum packaging of a product, the presence of gas inside the vacuum package enhances the measured intensity of fluorescence in any region(s) of the package in which the film is separated from the product with gas between the product and the film. More particularly, it has been discovered that in region(s) in which gas is present inside the package in a gap between the film and the product, the fluorescence of the excited indicator is detectable at an intensity greater in the area(s) in which gas is between the film and the product, versus areas at which gas is not between the film and the product. It is believed that the enhanced fluorescence may be caused by the refractive index and light scattering of the gas within the package which may increase the fluorescent electromagnetic energy emitted back to the viewer and imaging devices. The indicator may cause constructive interference of the light passing through the film in the areas having gas between the film and product, and the indicator may cause changes in the light reflected back to the viewer that are detectable to the human eye and/or imaging sensors (e.g., changes in wavelength or intensity compared to the surrounding film and product with no trapped gas). As a result, detection of one or more regions of enhanced intensity of fluorescence reveals the presence of a package defect associated with gas between film and product, which in turn reveals the presence of gas inside the vacuum package, i.e., a problem with the integrity of the vacuum package or a problem with the vacuum level within the package.

A first aspect is directed to a process for detecting gas inside a vacuum package, comprising: A) placing a product inside an open packaging article to provide a partially-packaged product, the packaging article comprising a film having at least one layer containing a fluorescence-based indicator; B) evacuating atmosphere from inside the vacuum chamber and from inside the packaging article by placing the partially-packaged product into a vacuum chamber and evacuating gas from within the vacuum chamber; C) sealing the packaging article closed after the gas has been evacuated from inside the packaging article, to produce a vacuum-packaged product; D) removing the vacuum-packaged product from the vacuum chamber and bringing the vacuum-packaged product into the ambient atmosphere; E) exposing the vacuum-packaged product to incident electromagnetic energy to produce an excited fluorescence-based indicator so that the excited indicator emits fluorescent electromagnetic energy; F) generating raw data based on fluorescent electromagnetic energy emitted by the excited indicator; G) forming image data from the raw data; H) assessing the image data to determine whether the vacuum-packaged product exhibits a fluorescence wavelength shift and/or intensity of fluorescence corresponding with gas between the product and the film.

In an embodiment, the product is an oxygen-sensitive product.

In an embodiment, the gas is air.

In an embodiment, the film is a monolayer film. In another embodiment, the film is a multilayer film.

In an embodiment, the film is a heat-shrinkable film having a total free shrink at 85° C. of ≥10%, measured in accordance with ASTM D2732. In other embodiments, the film has a total free shrink at 85° C. of ≥15%, or ≥20%, or ≥30%, or ≥40%, or ≥50%, or ≥60%, or ≥70%, or ≥80%, or ≥90%, or ≥100%, or ≥110%, or ≥120%, measured in accordance with ASTM D2732.

In an embodiment, the film is a heat-shrinkable film and the process further comprises shrinking the film against the product after the removing the vacuum-packaged product from the vacuum chamber. The vacuum-packaged product is in contact with the ambient atmosphere upon removal of the vacuum-packaged product from the vacuum chamber.

In an embodiment, the raw data is generated at least one second after the vacuum-packaged product is removed from the vacuum chamber and brought into the ambient atmosphere. In an embodiment, the raw data is generated ≥1 second, ≥5 seconds, or ≥10 seconds, or ≥20 seconds, or ≥30 seconds, or ≥60 seconds, or ≥120 seconds, or ≥300 seconds after the vacuum-packaged product is removed from the vacuum chamber and brought into the ambient atmosphere.

In an embodiment, the raw data is generated after shrinking the film against the product. In an embodiment, the film is shrunk against the product by passing the vacuum packaged product through a shrink tunnel, and the raw data is generated at least one second after the vacuum packaged product emerges from the shrink tunnel. In other embodiments, the raw data is generated ≥1 second, ≥5 seconds, or ≥10 seconds, or ≥20 seconds, or ≥30 seconds, or ≥60 seconds, or ≥120 seconds, or ≥300 seconds after the vacuum packaged product emerges from the shrink tunnel.

In an embodiment, the vacuum packaged product is passed through a hot water bath to shrink the film around the product, followed by passing the vacuum packaged product through a blow off unit to blow water off of the vacuum packaged product. In an embodiment, the raw data is generated at least one second after the vacuum packaged product emerges from the blow off unit. In other embodiments, the raw data is generated ≥1 second, ≥5 seconds, or ≥10 seconds, or ≥20 seconds, or ≥30 seconds, or ≥60 seconds, or ≥120 seconds, or ≥300 seconds after the vacuum packaged product emerges from the blow off unit.

It has been discovered that a vacuum package which lacks integrity due to the presence of a small passageway which allows ambient gas (e.g., air) to enter the package (e.g., a "leaker" with a small leak) may exhibit a significant delay in having a substantial quantity of ambient gas enter the package. This delay can be shortened by passing the vacuum packaged product through a package manipulator which subjects the vacuum package to one or more forms of manipulation that enhance the rate of entry of ambient gas into the package. In some embodiments, the vacuum packaged product may be manipulated before or simultaneous with searching for gas inside the packaging article using any of the sensing means disclosed herein. The package may also be manipulated manually.

The forms of manipulation include vibration, impact, tumbling, air jets, temperature variance, etc., i.e., any form of manipulation which increases the rate of gas flow into the package through the small passageway, which entry of gas thereby increases the area of separation of the film from the product, thereby enhancing the ability to detect the leak in the vacuum package. In an embodiment, the raw data is generated at least one second after the vacuum packaged product emerges from the package manipulator. In other embodiments, the raw data is generated ≥1 second, ≥5 seconds, or ≥10 seconds, or ≥20 seconds, or ≥30 seconds, or ≥60 seconds, or ≥120 seconds, or ≥300 seconds after the vacuum packaged product emerges from the package manipulator.

Alternatively or in addition, the package manipulator can be used to reveal the presence of a leaking package by causing the film to become loose or wrinkle, or by separating a portion of the film from the product in a manner that causes gas which has entered the package to go to an area of the package from which raw data is obtained corresponding with gas between product and film. Either the presence of an induced wrinkle, or separation of the film from the product, may indicate the presence of gas in the package.

In some embodiments, the package manipulator may also be used where insufficient vacuum has been formed in an otherwise sealed article (e.g., a "low-vac" condition). In a low-vac condition, gas is trapped in the packaged product, but no leak exists. The package manipulator may be useful in such circumstances to move the gas into an area of the package that allows for easier detection or to reveal the presence of a leaking package by causing the film to become loose or wrinkle.

Although a snapshot image can be used to determine whether atmosphere has already entered the package, the package manipulator can be used to either (i) move gas inside the package to an area more easily observed, and/or (ii) generate package anomalies such as wrinkles in the packaging article, which wrinkles are also more easily observed. The ease of observation includes observation by the naked eye and/or using a machine vision system. Both (i) and (ii) can be used to enhance the ability to detect the presence or absence of gas inside the package. Furthermore, a video image (or multiple snapshots) of the package undergoing manipulation can assist manual observation and/or the machine vision software in assessing whether a package has gas between the film and the product.

In an embodiment, the package is in a fixed position relative to the position of an imaging device (e.g., a camera or other light-sensitive sensor) during the time at which the snapshot or video is taken. In an embodiment, the package is not in a fixed position (i.e., is moving) relative to the position of the imaging device during the time at which the snapshot or video is taken.

In an embodiment, the fluorescence-based indicator is uniformly distributed through the at least one layer which contains the fluorescence-based indicator.

In an embodiment, the film contains a layer comprising a blend of a polymer and the fluorescence-based indicator in which the concentration of the fluorescent-based indicator is present in the blend in an amount of from about 5 to 50 ppm, based on total layer weight, with the fluorescence-based indicator being uniformly blended with the polymer. The uniformity of the indicator in the indicator/polymer blend refers to the concentration of the indicator in the blend being subject to a variation of not more than 20%, and not less than 20%, based on a target concentration of the indicator in the blend, upon taking 10 random samples, each sample having a size of 10 grams. In an embodiment, the polymer comprises PVDC, i.e., polyvinylidene chloride.

The target concentration of the indicator in the polymer is calculated as [WI/Wu]×100, where WI represents total weight of indicator used in preparing the blend, and WB represents total blend weight, i.e., total weight of all components combined to make the blend, including the indicator. The weight percent of the indicator in each sample can be determined by determining the amount of fluorescence emitted by the sample, and comparing the fluorescence to the fluorescence of a set of standards of known WI/WB, the standards including a standard at the target concentration, as well as standards the variance limits, i.e., standards at 20% above and 20% below the target concentration.

In another embodiment, the uniformity of the indicator in the indicator/polymer blend refers to the concentration of the indicator in the blend being subject to a variation of not more than 20%, and not less than 20%, based on a target concentration of the indicator in the blend, upon taking 10 random samples, each sample having a size of 1 gram. In an embodiment, the polymer comprises PVDC, i.e., polyvinylidene chloride.

In another embodiment, the uniformity of the indicator in the indicator/polymer blend refers to the concentration of the indicator in the blend being subject to a variation of not more than 20%, and not less than 20%, based on a target concentration of the indicator in the blend, upon taking 10 random samples, each sample having a size of 0.1 gram. In an embodiment, the polymer comprises PVDC, i.e., polyvinylidene chloride.

In another embodiment, the uniformity of the indicator in the indicator/polymer blend refers to the concentration of the indicator in the blend being subject to a variation of not more than 20%, and not less than 20%, based on a target concentration of the indicator in the blend, upon taking 10 random samples, each sample having a size of 0.01 gram. In an embodiment, the polymer comprises PVDC, i.e., polyvinylidene chloride.

In another embodiment, the uniformity of the indicator in the indicator/polymer blend refers to the concentration of the indicator in the blend being subject to a variation of not more than 20%, and not less than 20%, based on a target concentration of the indicator in the blend, upon taking 10 random samples, each sample having a size of 0.001 gram. In an embodiment, the polymer comprises PVDC, i.e., polyvinylidene chloride.

In another embodiment, the uniformity of the indicator in the indicator/polymer blend refers to the concentration of the indicator in the blend being subject to a variation of not more than 20%, and not less than 20%, based on a target concentration of the indicator in the blend, upon taking 10 random samples, each sample having a size of 0.0001 gram. In an embodiment, the polymer comprises PVDC, i.e., polyvinylidene chloride.

Although the functional layer containing the fluorescent indicator may be an oxygen barrier layer, the fluorescent indicator may be placed any of a wide variety of functional or non-functional film layers. In some embodiments, the indicator can be incorporated into the packaging article in any form, as part of the package structure or added in the film manufacturing process via coating for example. That is, films include a wide variety of layers in addition to oxygen barrier layers. Packaging designed to provide a microbial barrier may contain an active agent that neutralizes microbes, as described in US 2012/0087968 A1 and WO 2012/047947, each of which is hereby incorporated, in its entirety, by reference thereto. Some of these films are designed for food packaging. Others are designed for non-food-contact end uses. Food-contact films containing materials approved for food use may include, for example, naturally derived materials such as antibiotic, bacteriocin, chitosan, enzyme, natural extract, peptide, polysaccharide, protein, and/or allylisothiocyanate.

Other films may have a layer containing one or more acids such as: acetic acid, citric acid, cinnamic acid, lactic acid, lauric acid, octanoic acid, propionic acid, sorbic acid, and/or benzoic acid. Such a layer can be provided with a detectable component added so that the layer can be inspected by a machine vision system in the same manner as the inspection of the film having an oxygen barrier layer, i.e., as described above.

Still other films may have a layer containing acid salt, bacteriocin, bacteriophage, 1,2-Benzisothiazolin-3-one, BHA/BHT, cetyl pyridinium chloride, chitosan, chlorine dioxide, imazalil, lysozyme, and/or lactoferrin. Such a layer can be provided with a detectable component therein so that the layer can be inspected by a machine vision system in the same manner as the inspection of the film having an oxygen barrier layer, i.e., as described above.

Still other films may have a layer containing a metal or metal salt (e.g., silver, copper, or zinc), metal oxide, and/or monolaurin. Such a layer can be provided with a detectable component added so that the layer can be inspected by a machine vision system in the same manner as the inspection of the film having an oxygen barrier layer, i.e., as described above.

Still other films may have a layer containing a natural oil or extract such as thymol, eugenol, vanillin, garlic oil, grape seed extract, cinnamon, onion, basil, oregano, bay, and/or clove.

Still other films may have a layer containing polyhexamethylene biguanide hydrochloride, paraben, grafted silane-quaternary amine, triclosan, and zeolite of silver, copper, and/or zinc.

Still other films may have a coating including the fluorescent indicator, which is applied after printing on the film. The coating may improve aesthetic purposes or protect printing on the product.

The fluorescent indicator can be present in any portion or layer of the film at any level that is detectable by the detector while allowing the functional layer to maintain its intended function, if the indicator is incorporated into a functional layer. Too much fluorescent indicator in a functional layer may interfere with layer function. Too little fluorescent indicator may become undetectable to the detector. In some embodiments, the indicator may be incorporated into a non-functional layer or added as a coating to the film. In an embodiment, the fluorescent indicator may be present at a level of at least 0.5 parts per million (ppm). As used herein, the phrase "part per million" and the equivalent expression "ppm" refer to the weight of the fluorescent indicator versus the total weight of the layer (weight fluorescent indicator+ weight of remainder of components in the layer). Of course, the majority component of the layer is one or more thermoplastic polymers which are a solid at room temperature. Both the fluorescent indicator and the thermoplastic polymer of the layer can be solids at room temperature. In an embodiment, the fluorescent indicator can be present at a level of at least 1 ppm, or at least 1.5 ppm, or at least 2 ppm, or at least 3 ppm, or at least 5 ppm, or at least 10 ppm, or at least 20 ppm, or at least 40 ppm, or at least 80 ppm, or at least 120 ppm, or at least 160 ppm, or at least 200 ppm, or at least 300 ppm, or at least 500 ppm. In an embodiment, the fluorescent indicator can be present in the layer at a level of from 0.5 to 40 ppm, or from 1 to 20 ppm, or from 1.5 to 10 ppm, or from 2 to 5 ppm. In order for a film to be suitable for food contact end use, the fluorescent indicator is present in the layer in an amount of not more than 150 ppm.

A UV-based fluorescent indicator is a UV-absorbing compound with distinctive absorption and/or fluorescence properties. Preferred UV-absorbing fluorescent indicator component has a unique optical signature that is not present in nature and not easily confused with signals from natural sources. A preferred UV-fluorescent indicator has multiple unique absorption or fluorescent features in its UV spectra. For example, as used herein, electromagnetic radiation at 375 nanometers was used as incident radiation to excite a fluorescent indicator known as 2,5-thiophenediylbis(5-tert-butyl-1,3-benzoxazole), which is assigned CAS registry number 7128-64-5, and which is also known as: 2,2'-(2,5-thiophenediyl)bis[5-tert-butylbenzoxazole]; 2,5-bis-2-(5-tert-butyl-benzoxalyl)thiophene; 2,5-bis(5-t-butyl-2-benzoxazolyl)thiophene; 2,5-bis-(5-t-butylbenzoxazolyl-[2-yl])-thiophene; 2,5-bis-(5-tert-butyl-2-benzoxazol-2-yl) thiophene; 2,5-bis(5'-tert-butyl-2-benzoxazol-2-yl) thiophene; 2,5-bis(5'-tert-butyl-2'-benzoxazolyl)thiophene; 2,5-bis(5-tert-butyl-2-benzoxazolyl)thiophene; 2,5-bis(5'-tert-butyl-benzoxazol-2-yl)thiophene; 2,5-bis(5-tert-butyl-benzoxazolyl)-2-thiophene; 2,5-di(5-tert-butylbenzoxazol-2-yl)thiophene; 2,2'-(2,5-thiophenediyl)bis[5-(1,1-dimethylethyl)-benzoxazole]; 2,5-bis(5'-tert-butyl-2-benzoxazolyl)thiophene; and 2,5-thiophenediylbis(5-tert-butyl-1,3-benzoxazole). The absorption of the incident radiation at 375 nanometers caused the excited 2,5-thiophenediylbis(5-tert-butyl-1,3-benzoxazole) optical brightener detectable component to emit radiation at 435 nanometers. The fluorescent indicator was uniformly blended into a PVDC resin which was used to produce an oxygen barrier layer of a multilayer film. Exposing the resulting annular tape and/or heat-shrinkable film tubing to incident radiation at 375 nm excited the 2,5-thiophenediylbis(5-tert-butyl-1,3-benzoxazole) optical brightener to emit radiation at 435 nanometers. The emitted 435 nm radiation was detected by a machine vision system, which revealed the presence, continuity, and thickness of the PVDC barrier layer of the tape and a multilayer film tubing.

In an embodiment, the evacuating of the atmosphere from the vacuum chamber is carried out until pressure within the vacuum chamber is less than 4 mm Hg before sealing the packaging article closed, and after removing the vacuum-packaged product from the vacuum chamber, the assessing of the image data produces an indication that inside at least a region of the package, ambient atmosphere is present between the film and the product, with the indication being that the ambient atmosphere inside the package is at a pressure of at least 10 mm Hg. In another embodiment, the indication is that the ambient atmosphere inside the package is at a pressure equivalent to ambient atmospheric pressure outside the package.

In an embodiment, the indication of gas is inside the package is present in combination with a hole through the film.

In an embodiment, the indication of gas inside the package is present in combination with a gap in a seal.

In an embodiment, the indication of gas inside the package is present in a region of the packaging article having a defect which allows the gas to pass into the package.

In an embodiment, the packaging article is sealed closed and completely surrounds the product, but after removing the vacuum-packaged product from the vacuum chamber, the assessing of the image data produces an indication that inside at least a region of the package, gas is present at a level greater than 4 mm Hg, thereby indicating that a desired vacuum level was not achieved during evacuation of the atmosphere from the packaging article. In some embodiments, a desired vacuum level is 5 mm Hg or less. In some embodiments, a desired vacuum level is 4 mm Hg or less. In some embodiments, a desired vacuum level is 3 mm Hg or less. In some embodiments, a desired vacuum level is 2 mm Hg or less. In some embodiments, a desired vacuum level is 1 mm Hg or less. Reasons for not achieving the desired low pressure inside the package include (i) rate of evacuation too low and/or duration of evacuation was too short, and/or (ii) vacuum pump was not performing properly, and/or (iii) vacuum chamber was not fully airtight; (iv) atmosphere trapped between product and film was not removed during atmospheric evacuation; and/or (v) defect in the film.

In an embodiment, at least one of (i) a fluorescent electromagnetic energy intensity is higher in a region wherein gas is between the film and the product relative to a region in which gas is not present between the film and the product, or (ii) a fluorescent electromagnetic energy color shift (downward in energy, i.e., longer wavelength, lower frequency) occurs in a region wherein gas is between the film and the product, which color shift does not occur in regions in which gas is not present between the film and the product.

In an embodiment, the fluorescent electromagnetic energy intensity is at least 10% higher in the region wherein gas is between the film and the product, relative to a region in which the film is in direct contact with the product. In another embodiment, the fluorescent electromagnetic energy intensity is ≥15% higher, or ≥20% higher, or ≥30% higher, or ≥40% higher, or ≥50% higher, or ≥60% higher in the region wherein gas is between the film and the product, relative to the intensity of the fluorescent electromagnetic energy in a region in which the film is in direct contact with the product. Factors that can affect the fluorescence image emitted by the package include, among others: (i) angle of view, (ii) focal distance between imaging device and area of package under consideration, (iii) exposure time, (iv) amount of excitation, and (v) thickness variations in the film, including the increase in thickness at a heat seal of the film to itself or to another film.

In an embodiment, the region of enhanced fluorescence makes up ≥1 mm$^2$. In another embodiment, the region of enhanced fluorescence makes up ≥2 mm$^2$, or ≥2 mm$^2$, ≥5 mm$^2$, or ≥10 mm$^2$, or ≥20 mm$^2$, or ≥40 mm$^2$, or ≥100 mm$^2$, or ≥500 mm$^2$, or ≥1000 mm$^2$, or ≥2000 mm$^2$, or ≥5000 mm$^2$.

In an embodiment, the acquiring of the image data and the assessing of the image data is carried out by manually inspecting the fluorescent electromagnetic energy emitted by the excited indicator, to determine whether the fluorescence image includes fluorescence corresponding with gas between the film and the product.

In an embodiment, the process is carried out by manually exposing the vacuum-packaged product to incident electromagnetic energy to manually produce an excited fluorescence-based indicator. In an embodiment, the manual exposure of the packaged product to incident electromagnetic energy is carried out in combination with manually assessing (i.e., visually assessing) the fluorescent electromagnetic energy emitted by the excited indicator, to determine whether the fluorescence image includes fluorescence corresponding with gas between the film and the product.

In an embodiment, the acquiring of the image data is carried out using an imaging device that generates image data of the fluorescent electromagnetic energy emitted by the excited indicator, with the assessing of the image data being carried out using a computing device programmed with an algorithm capable of assessing intensity of the fluorescent electromagnetic energy emitted by the excited indicator.

In an embodiment, the indicator comprises at least one member selected from the group consisting of ultraviolet-indicator, infrared-indicator, dye, pigment, optical brightener, fluorescent whitening agent, 2,2'-(2,5-thiophenylenediyl)bis(5-tert-butylbenzoxazole), hydroxyl-4-)p-tolylamino)anthracene-9,10-dione, 2,5-thiophenediylbis(5-tert-butyl-1,3-benzoxazole), and anthraquinone dyestuff. The indicator is of a type which, if exposed to radiation at a first peak wavelength, emits radiation at a second peak wavelength.

In an embodiment, the indicator is present in at least one layer of the film, with the indicator being present at a level of from 0.5 to 150 ppm, based on layer weight. In another embodiment, the indicator is present in at least one layer of the film, with the indicator being present at a level of from 1 to 20 ppm, or from 2 to 10 ppm, based on layer weight. In an embodiment, the detectable component is present in a film layer at a level of at least 1 part per million.

In an embodiment, the detectable component is of a type which, if exposed to radiation at a first peak wavelength, emits radiation at a second peak wavelength.

In an embodiment, the signal generated in response to the detection of a defective vacuum package comprises at least one member selected from the group consisting of an alarm, flagging the defective vacuum package, displaying an image of the defective vacuum package, displaying data pertaining to the defective package, and generating a report of the defective vacuum package.

In an embodiment, the product is a food product. In an embodiment, the food product comprises at least one member selected from the group consisting of meat and cheese.

In an embodiment, the film is a multilayer film comprising a functional layer, and the indicator is present in the functional layer.

In an embodiment, the multilayer film comprises: A) a first layer which is a first outer film layer and which serves as a heat seal layer; B) a second layer which is a second outer layer and which serves as an abuse layer; C) a third film layer which is between the first layer and the second layer, the third layer serving as a functional layer; D) a fourth film layer which is between the first layer and the third layer, the fourth layer serving as a first tie layer; and E) a fifth film layer which is between the second layer and the third layer, the fifth layer serving as a second tie layer. In some embodiments the film may comprise a first layer, second layer, and third layer as described above, without the first and second tie layers.

In an embodiment, the functional layer of the multilayer film is a member selected from the group consisting of oxygen barrier layer, organoleptic barrier layer, moisture barrier layer, hazardous chemical barrier layer, microbial barrier layer, acid layer, acid salt layer, bacteriocin layer, bacteriophage layer, metal layer, metal salt layer, natural oil layer, natural extract layer, layer containing polyhexamethylene biguanide hydrochloride, layer containing paraben, layer containing grafted silane-quaternary amine, layer containing triclosan, layer containing zeolite of silver, copper, and/or zinc.

In an embodiment, the functional layer is an oxygen barrier layer comprising at least one member selected from the group consisting of vinylidene chloride copolymer, saponified ethylene/vinyl acetate copolymer, polyamide, polyester, oriented polypropylene, and ethylene homopolymer.

In an embodiment, the packaging article is a member selected from the group consisting of end-seal bag, side-seal bag, pouch, or backseamed packaging article. In some embodiments, the packaging article may a film container (e.g., end-seal bag, side-seal bag, etc.) having film surrounding the product. The film may include substantially uniformly distributed fluorescent indicator therein such that the packaged product may indicate gas within the packaging article on all sides of the product. In some embodiments, the packaging article may include a rigid or semi-rigid shell with a film covering or seal enclosing the shell. In such embodiments, the film may include indicator allowing detection of gas through the film seal on the article. In some embodiments, the packaging article may include a skin pack. In some embodiments, the film having a fluorescence-based indicator may only partially surround the product.

In an embodiment, upon assessing the image data for a plurality of vacuum-packaged products: i) a first set of vacuum packaged products exhibit image data corresponding with no gas between the film and the product, the first set of vacuum packaged products being forwarded to pack-off; ii) a second set of vacuum-packaged products exhibit image data corresponding with one or more regions of gas between the film and the product, with the vacuum packaged products of the second set being unpackaged with the products being re-packaged in a second vacuum package and again subjected to the process for detecting gas inside the vacuum package.

In an embodiment, the process further comprises generating a signal upon assessing the image data for a vacuum packaged product and determining the presence of gas is between the product and the film, a signal is generated in response to the presence of gas between the product and the film, the signal comprising at least one member selected from the group consisting of an alarm, package flagging, displaying an image of a defective vacuum package, generating a report, marking the vacuum package, and diverting the vacuum package.

In an embodiment, the process comprises generating the raw data before shrinking the film against the product. In some embodiments, the process comprises a non-shrinking film.

In an embodiment, the process comprises taking a plurality of images of the same vacuum packaged product over a period of time. This process enables assessing whether any amount of gas inside the package is increasing with time. A determination that the amount of gas increases with time is likely to correspond with a leak in the package. A determination that the amount of gas inside the package is not increasing with time is likely to correspond with achieving less than the desired vacuum level inside the package.

In an embodiment, the film has a total free shrink, at 85 C, of 10 percent or more. In an embodiment, the film has a total free shrink, at 85 C, of 10 percent or less. In an embodiment, the film has zero total free shrink at 85 C.

In an embodiment, the process further comprises manipulating the packaged product with a product manipulator after the packaged product is removed from the vacuum chamber but before generating raw data based on fluorescent electromagnetic energy emitted by the excited indicator.

It has been discovered that a vacuum package which lacks integrity due to the presence of passageway which allows external gas to enter the package (i.e., a "leaker") may exhibit a significant delay in having a substantial quantity of ambient gas enter the package, particularly if the passageway is small. This delay can be shortened by passing the vacuum packaged product through a package manipulator which subjects the vacuum package to one or more forms of manipulation. Manipulation can be carried out in the form of movement (e.g., translational and/or rotational), vibration, impact, tumbling, etc., i.e., any form of manipulation which (i) increases the rate of gas flow into the package through a leak, e.g., a hole in the film or a gap in a seal, which entry of gas thereby increases the area of separation of the film from the product, thereby enhancing the ability to detect the presence of the leak in the vacuum package, and/or (ii) increases the movement of gas inside the package from one location to another, thereby enhancing the ability to detect the presence of the gas inside the vacuum package, whether or not a leak is present.

In an embodiment, the raw data is generated at least one second after the vacuum packaged product emerges from the package manipulator. In other embodiments, the raw data is generated ≥1 second, ≥5 seconds, or ≥10 seconds, or ≥20 seconds, or ≥30 seconds, or ≥60 seconds, or ≥120 seconds, or ≥300 seconds after the vacuum packaged product emerges from the package manipulator.

Alternatively or in addition, the package manipulator can be used to reveal the presence of gas in a package by causing the film to become loose or wrinkle, or by separating a portion of the film from the product in a manner that causes gas which has entered the package to go to an area of the package from which raw data is obtained corresponding with gas between product and film. Either the presence of an induced wrinkle, or separation of the film from the product, may indicate the presence of a leak in the package or a low-vac condition in the package.

A second aspect is directed to a system for detecting gas inside a vacuum packaged product comprising a product packaged inside a packaging article comprising a film containing a fluorescence-based indicator. The system comprises: A) a vacuum chamber configured to evacuate atmosphere from inside a partially-packaged product comprising an open packaging article having a product inside, the vacuum chamber comprising a heat sealer configured to seal the packaging article closed to form the vacuum packaged product; B) an illuminator configured to generate incident electromagnetic energy and to direct the incident electromagnetic energy against the vacuum packaged product and thereby produce an excited fluorescence-based indicator; C) an imaging device arranged to generate raw data based on fluorescent electromagnetic energy emitted by the excited fluorescence-based indicator; and D) instructions stored in memory to form image data from the raw data using an algorithm, wherein the instructions, in response to execution by a processor, cause the processor to indicate whether the packaged product has gas between the film and the product.

In an embodiment, the system further comprises a shrink tunnel configured to shrink the packaging article before the vacuum packaged product is exposed to incident radiation. In some embodiments, any means of shrinking the packaging article may be used, including but not limited to hot air shrink or dip tanks.

In an embodiment, the data acquisition system is configured to acquire the image data after the packaging article is sealed closed. For example, the data acquisition system can be configured to acquire the image data at least 10 seconds after the packaging article is sealed closed, or at least 20 seconds, or at least 30 seconds, or at least 1 minute, or at least 5 minutes, or at least 10 minutes, or at least 30 minutes after the packaging article is sealed closed. In some embodiments, the image data may be acquired after the packaging article is closed but before shrinking the packaging article (e.g., in embodiments using a shrinking film). In some embodiments, the image data may be acquired after the packaging article is closed and after manipulation of the package by a manual or automated manipulator. In some embodiments, the image data may be acquired during manipulation of the package by a manual or automated manipulator. In some embodiments, the image data may be acquired during shrinking of the film (e.g., in a shrink tunnel, hot air shrink apparatus, dip tank, or the like). In some embodiments, the image data may be acquired before pack off of the packaged product. In some embodiments, the image data may be acquired during pack off of the packaged product. In some embodiments, the image data may be acquired after pack off of the packaged product.

In an embodiment, the vision inspection engine is configured to output an indication that gas is present between the film and the product, based on the intensity or wavelength of the fluorescence from the fluorescence-based indicator.

In an embodiment, the system further comprises a vacuum package manipulator configured to enhance the rate of gas entering the package.

In an embodiment, the system further comprises a separator configured to separate the vacuum packaged products that exhibit a vacuum defect.

In an embodiment, the system further comprises a packer configured to pack off vacuum packaged products exhibiting package integrity.

In an embodiment, the system further comprises a diverter configured to divert vacuum packaged products which have been determined to have gas between the film and the product.

In an embodiment, the detectable component comprises at least one member selected from the group consisting of ultraviolet-indicator, infrared-indicator, dye, pigment, optical brightener, fluorescent whitening agent, and 2,5-thio-phenediylbis(5-tert-butyl-1,3-benzoxazole), 2,2'-(2,5-thio-phenylenediyl)bis(5-tert-butylbenzoxazole), hydroxyl-4-)p-tolylamino)anthracene-9,10-dione, 2,5-thiophenediylbis(5-tert-butyl-1,3-benzoxazole), and anthraquinone dyestuff 2,5-Thiophenediylbis(5-tert-butyl-1,3-benzoxazole) is marketed as an optical brightener by a plurality of suppliers, including BASF Corporation (TINOPAL OP® 2,5-thiophenediylbis (5-tert-butyl-1,3-benzoxazole) fluorescent brightening agent) and Mayzo, Inc (BENETEX OB PLUS® 2,5-thio-phenediylbis(5-tert-butyl-1,3-benzoxazole) fluorescent brightening agent). The indicator is of a type which, if exposed to radiation at a first peak wavelength, emits radiation at a second peak wavelength.

BRIEF DESCRIPTION OF THE DRAWINGS

Figure 1A:
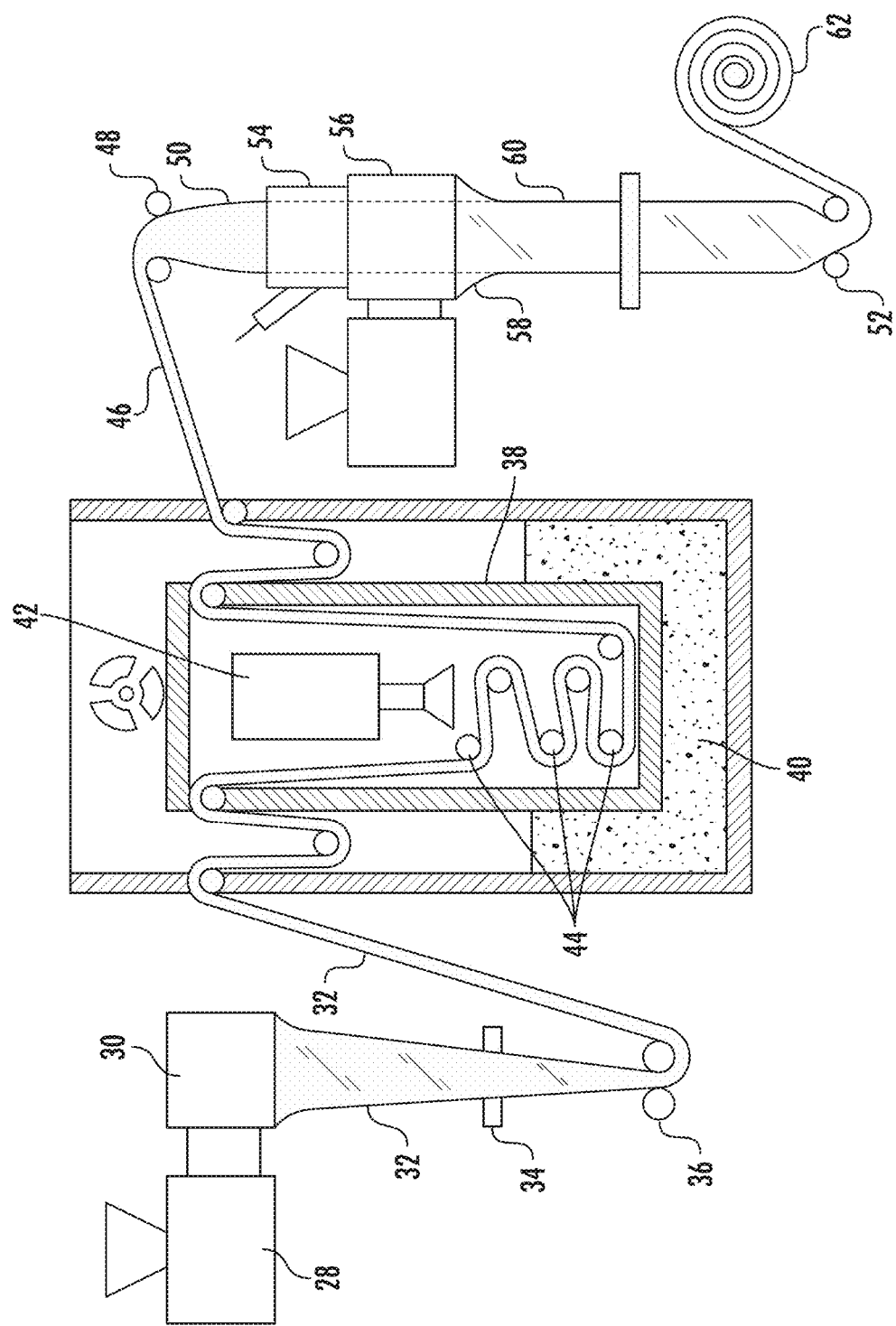
Figure 1B:
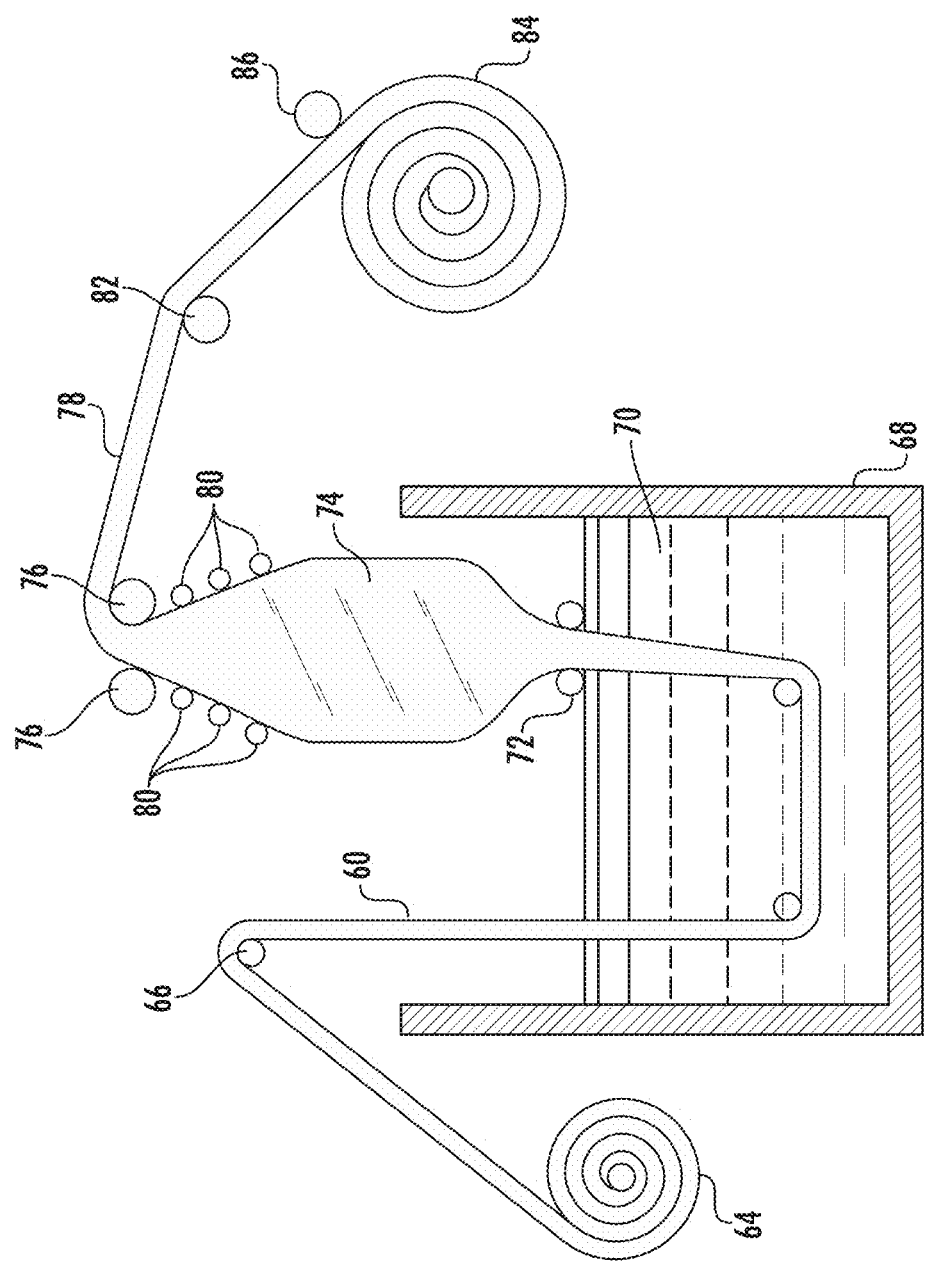
Figure 1C:
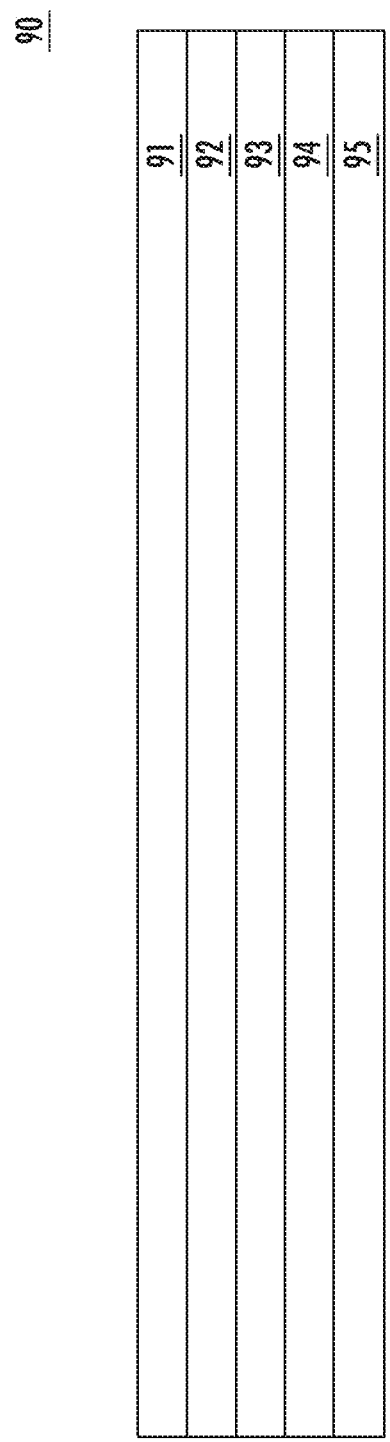
Figure 1D:
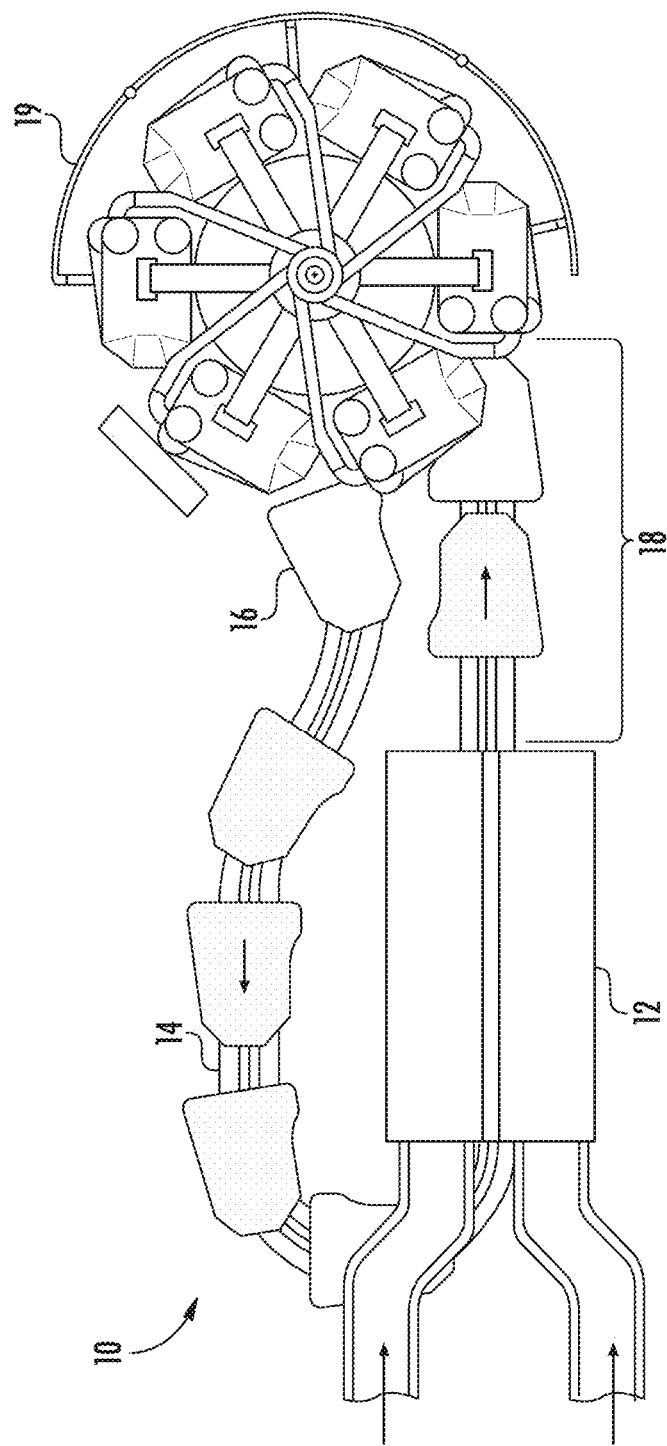
Figure 2:
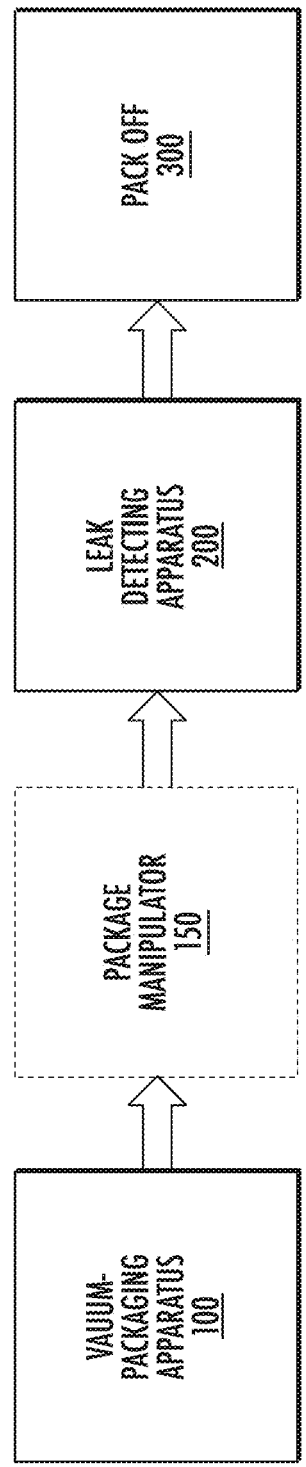
Figure 3:
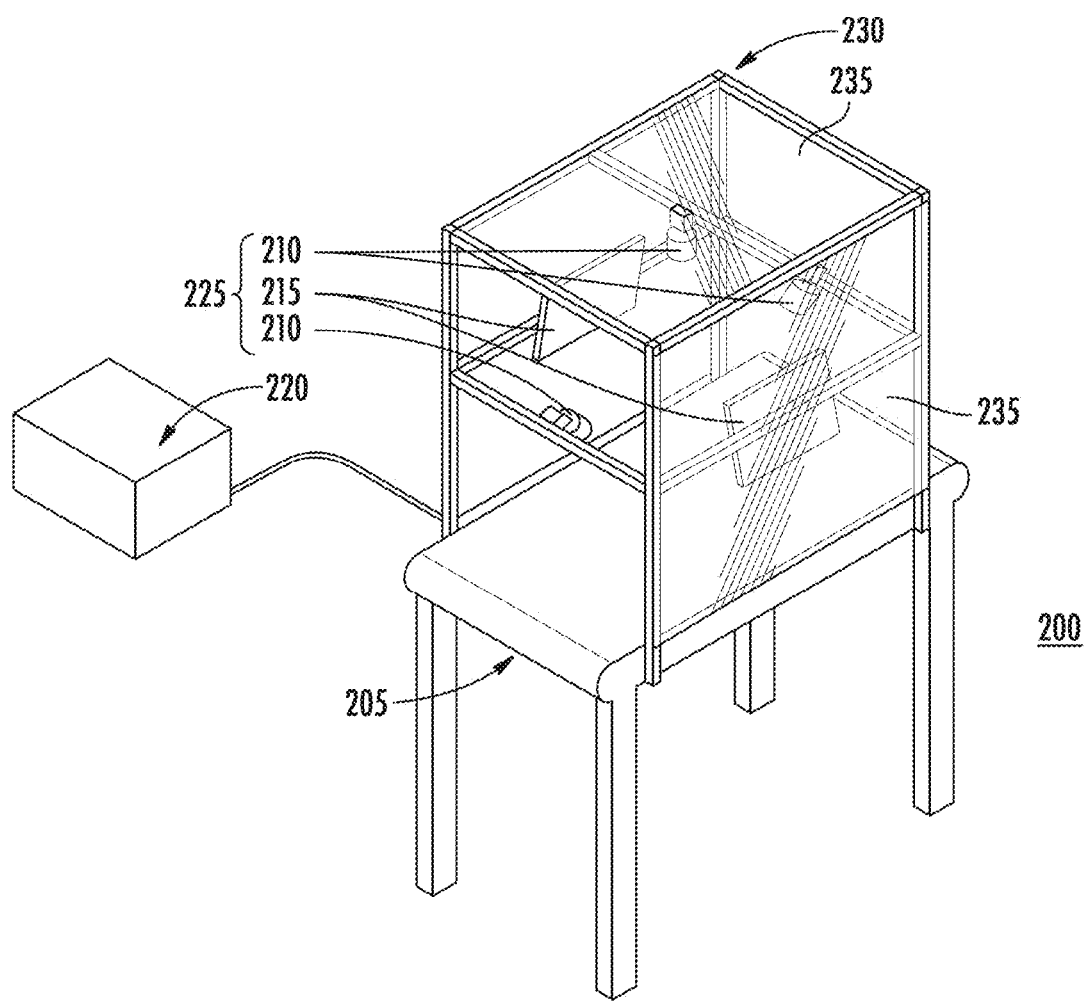
Figure 4A:
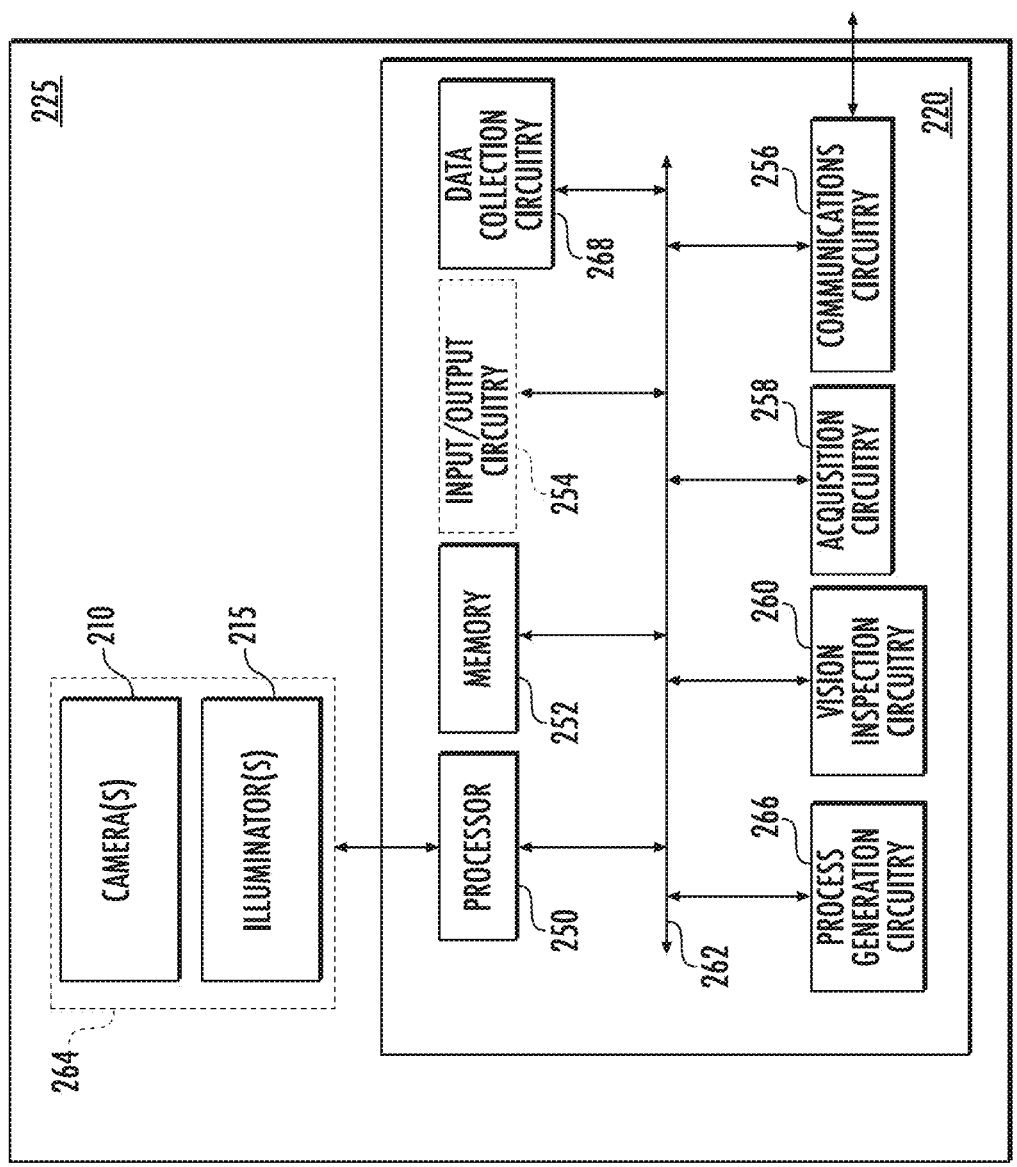
Figure 4B:
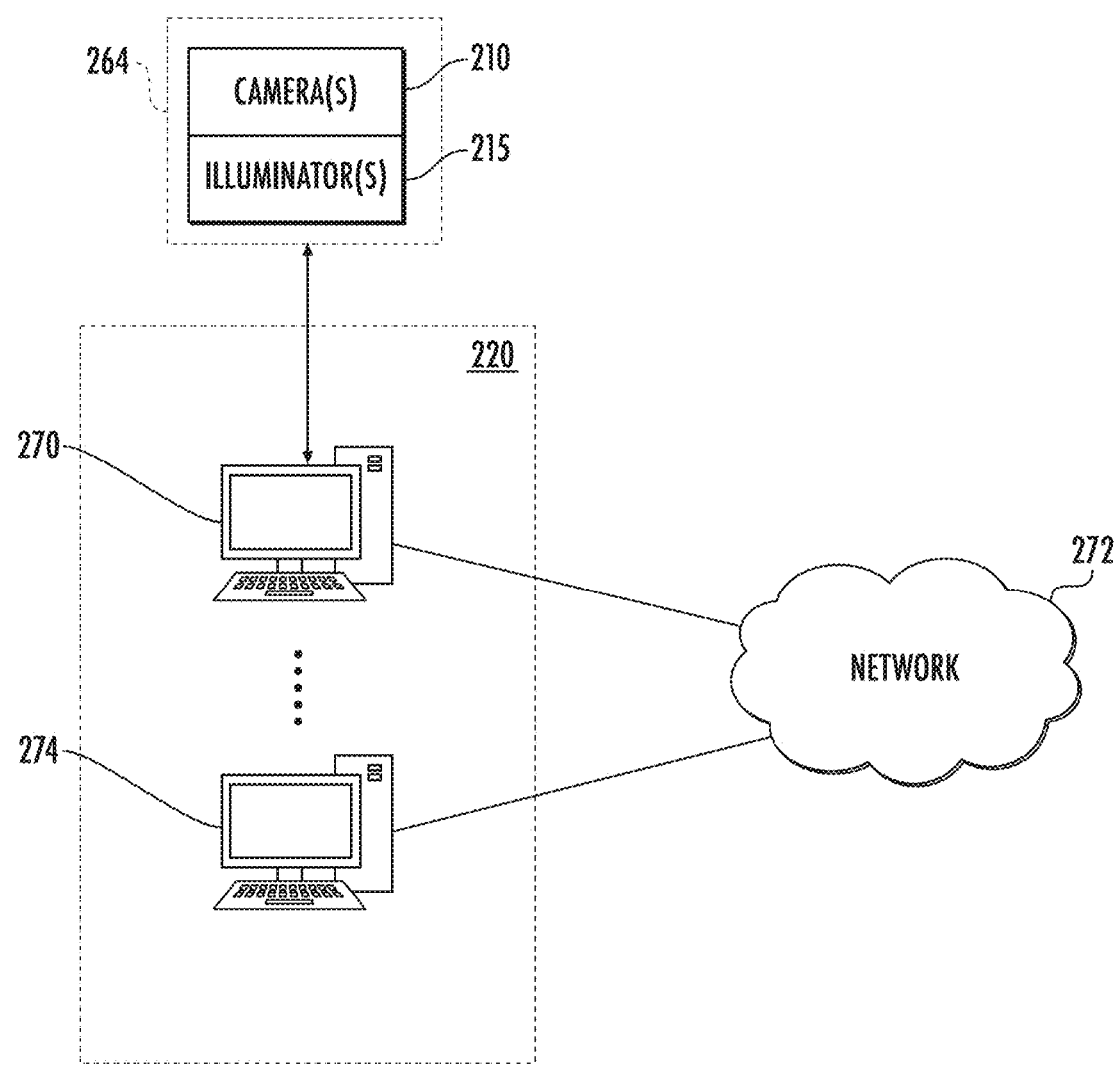
Figure 5A:
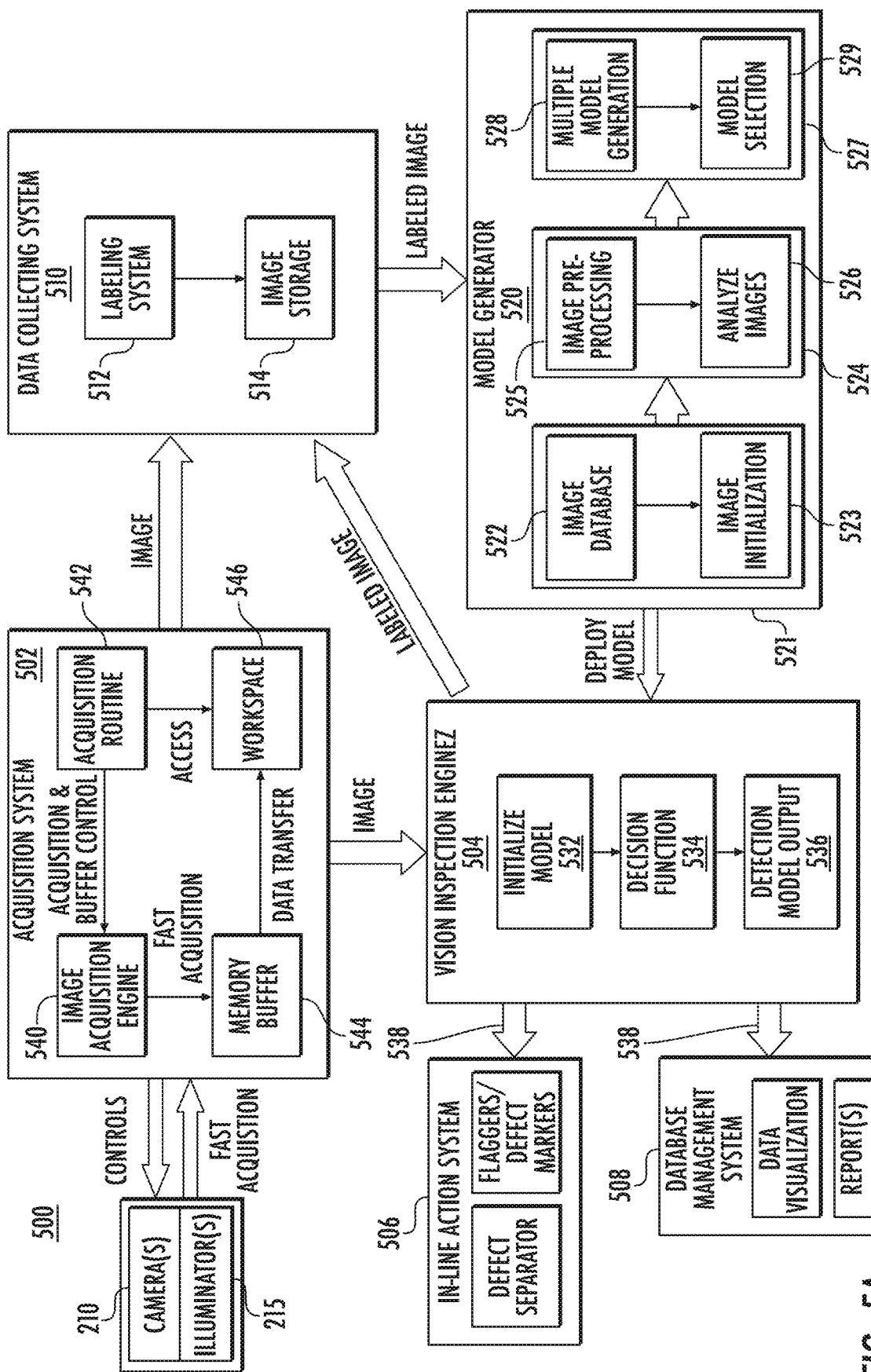
Figure 5B:
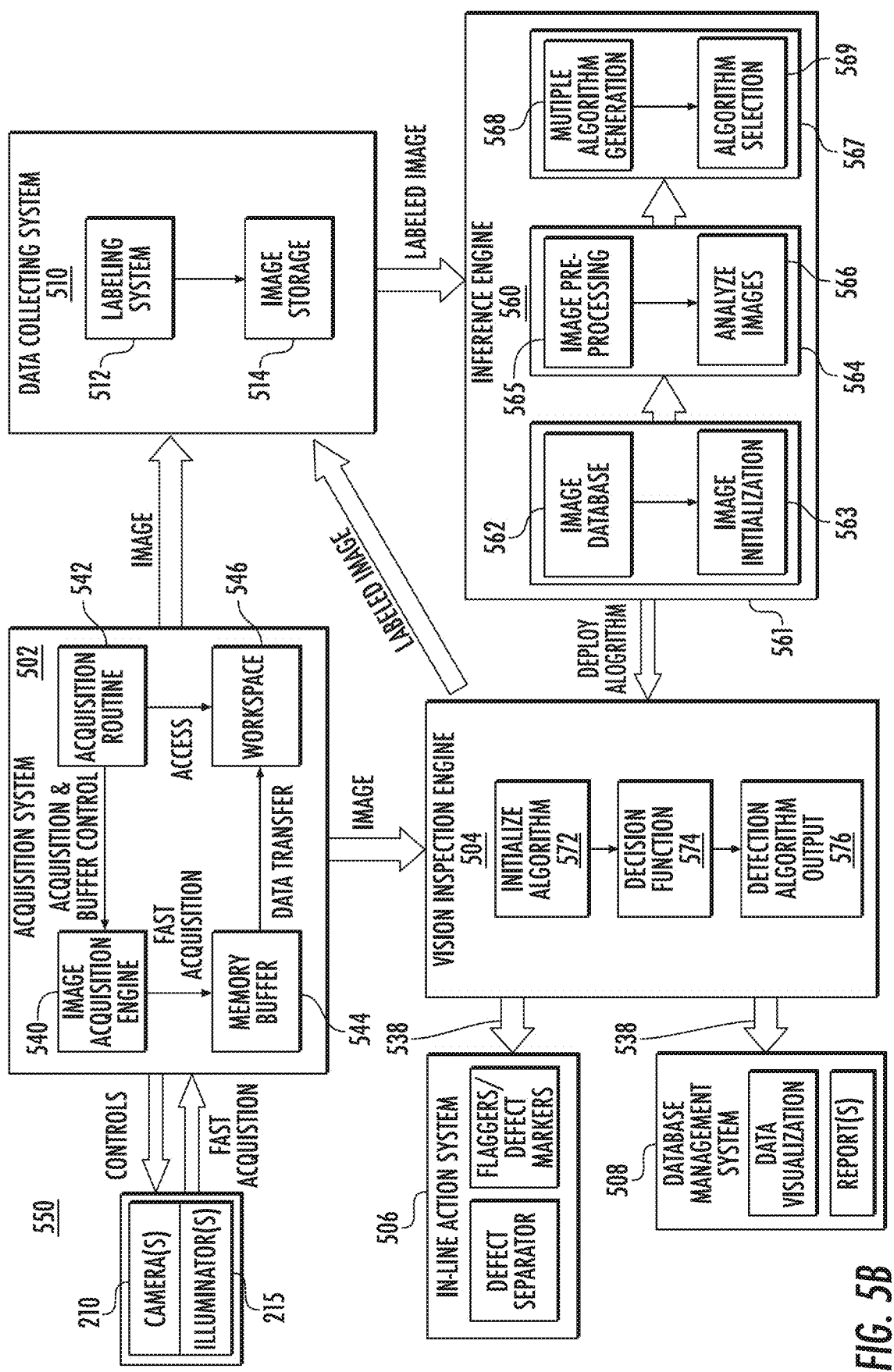
Figure 6:
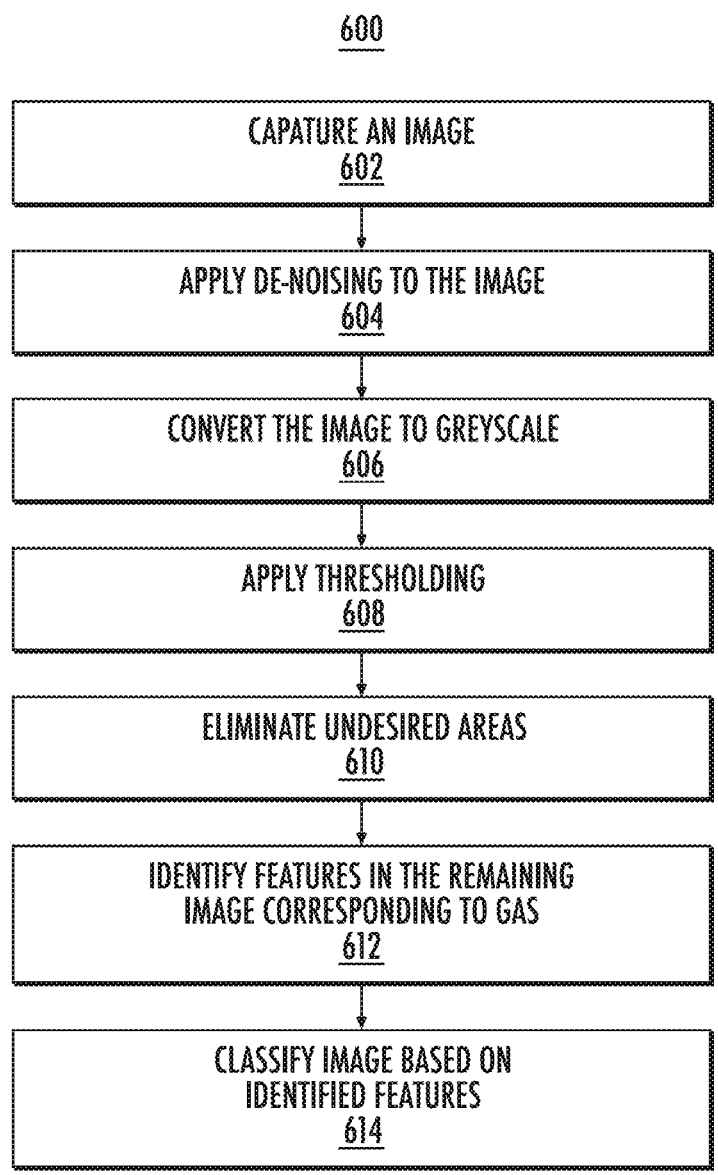
Figure 7:
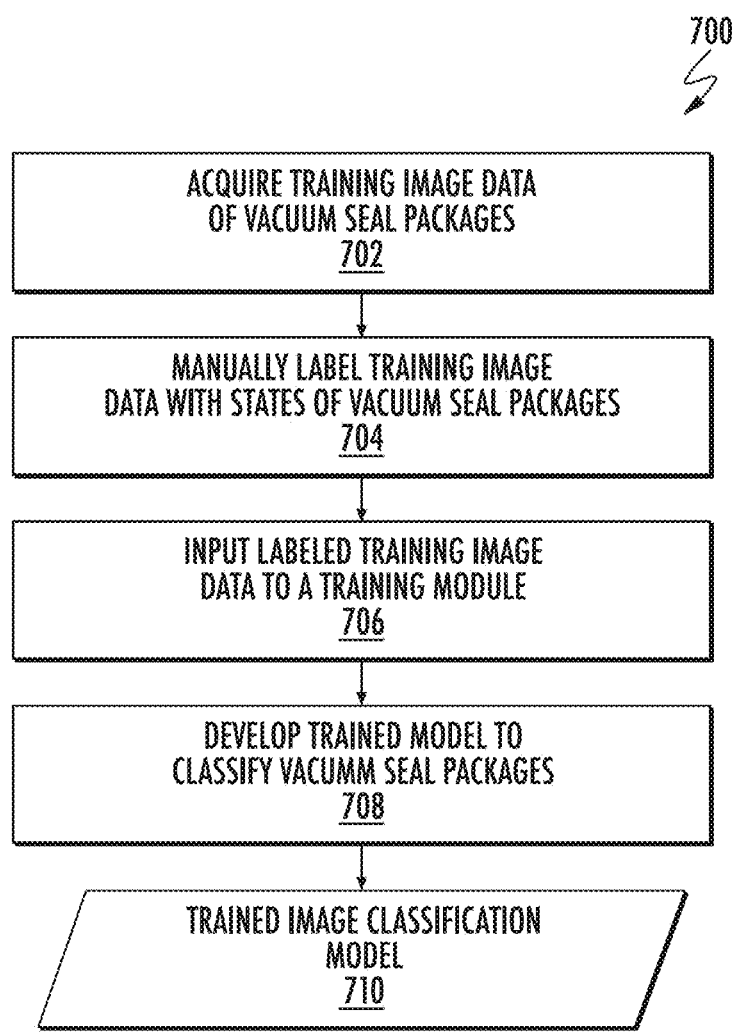
Figure 8:
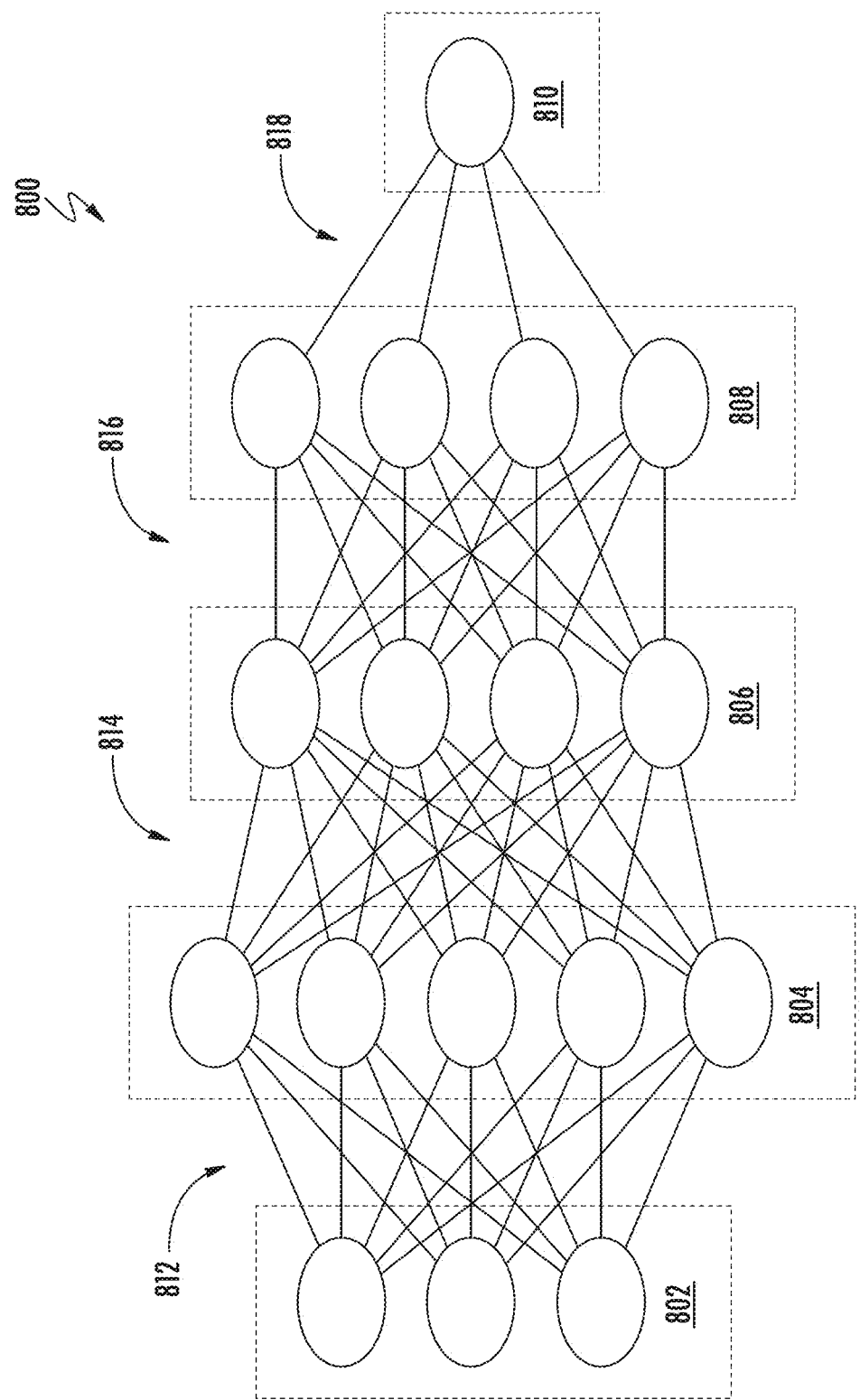
Figure 9:
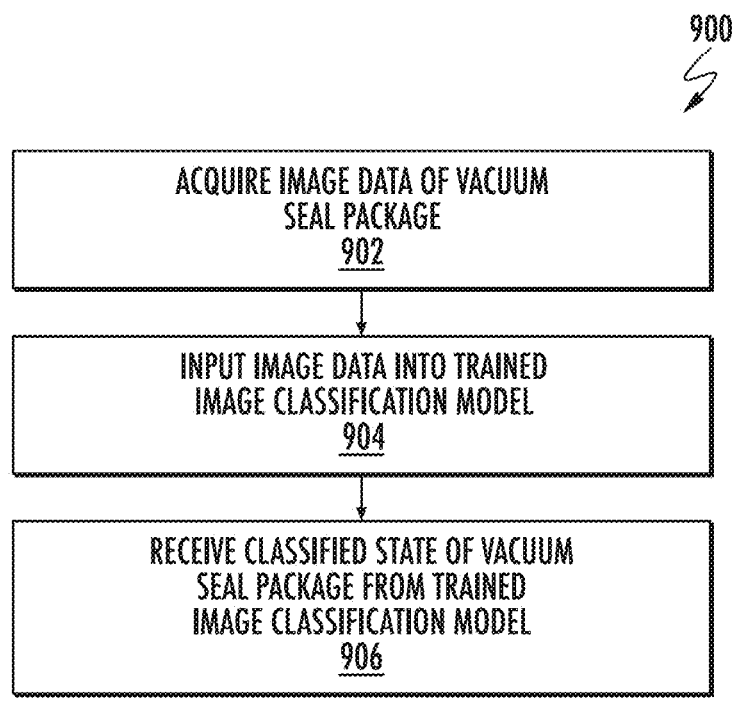
Figure 10:
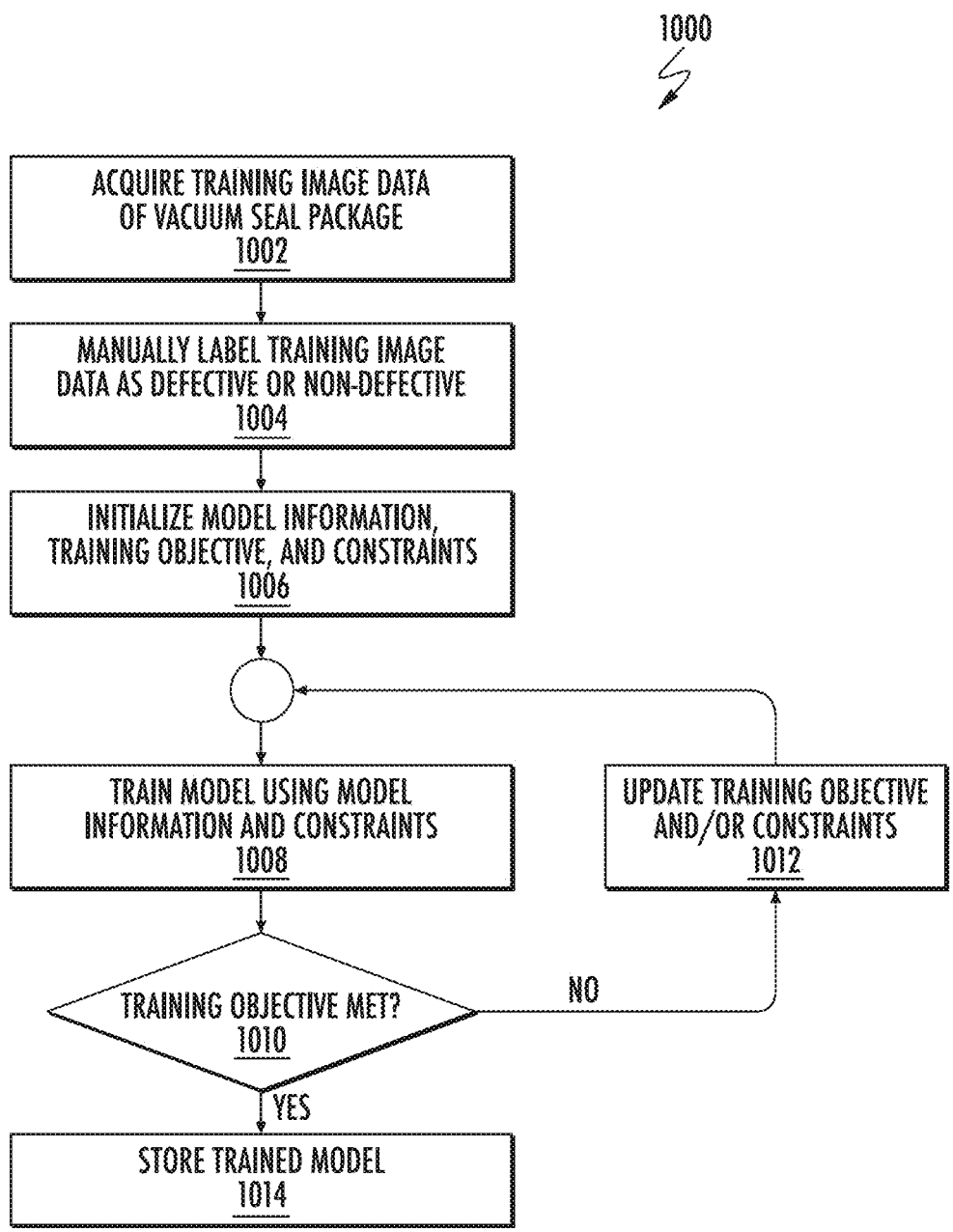
Figure 11:
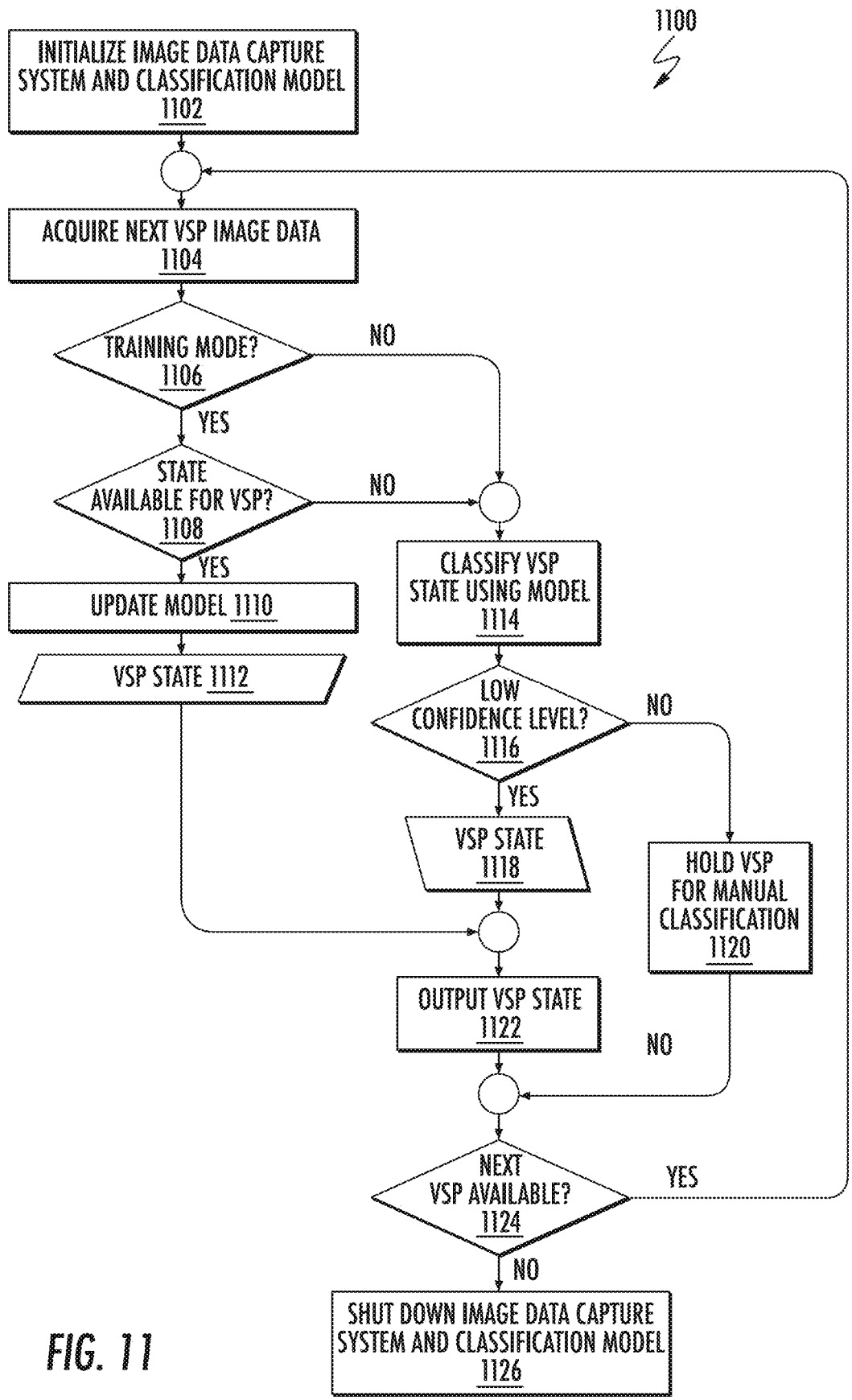
Figure 12:
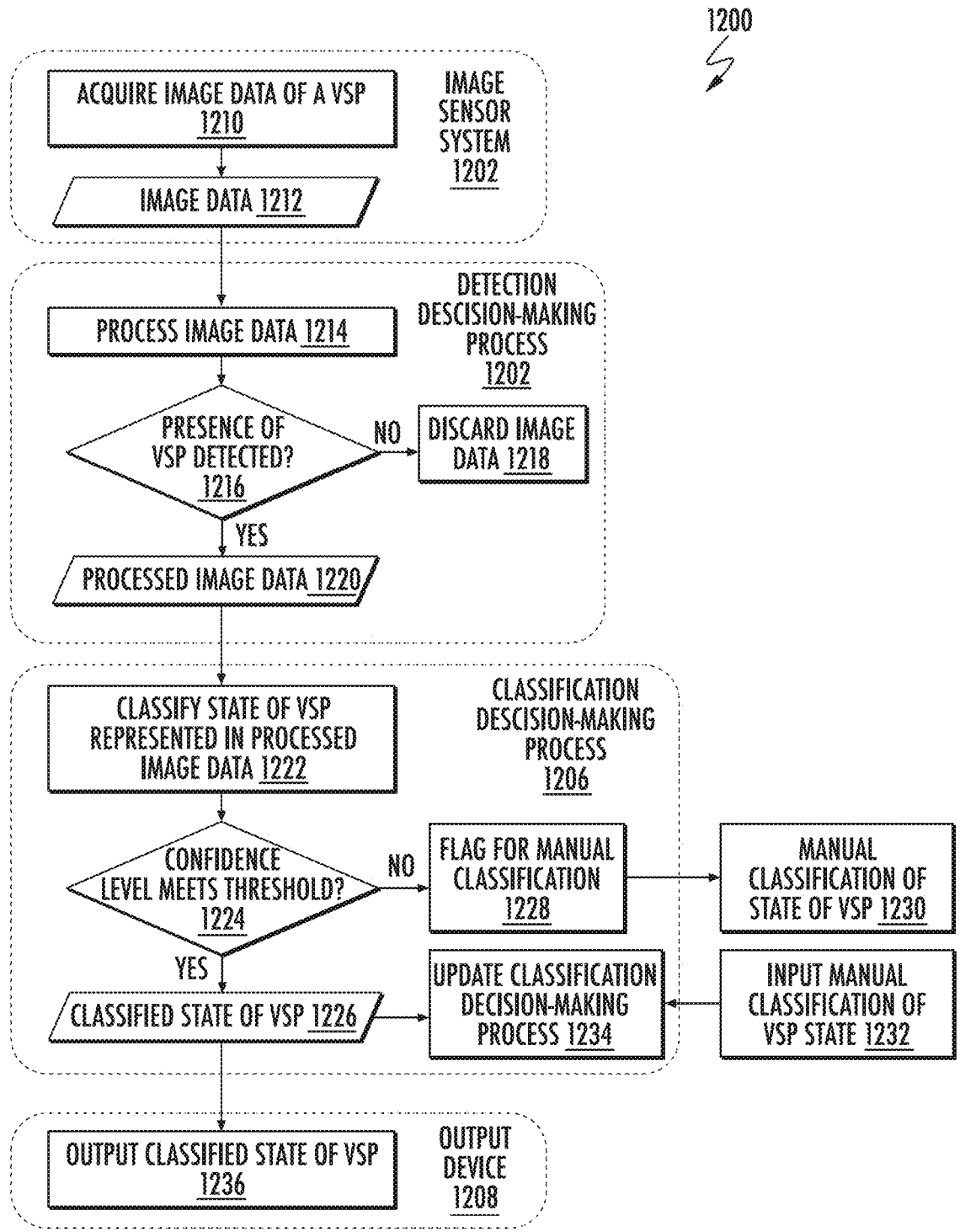
Figure 13:
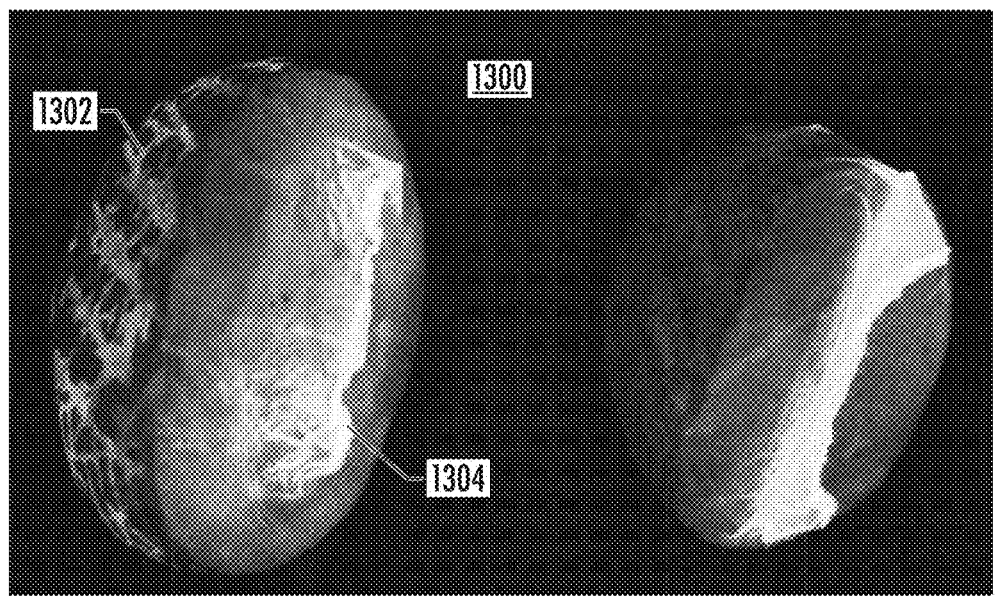
Figure 14:
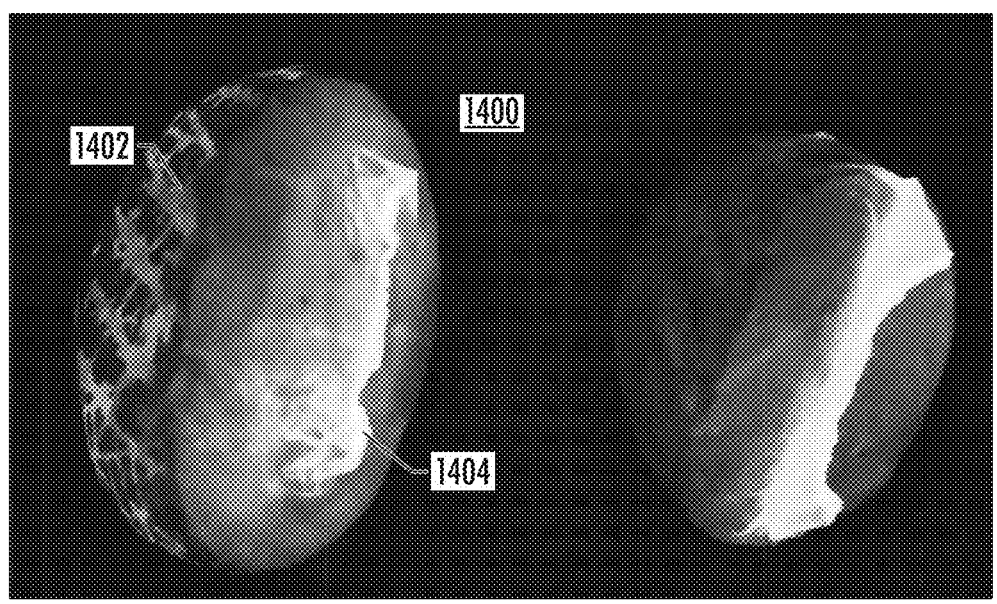
Figure 15:
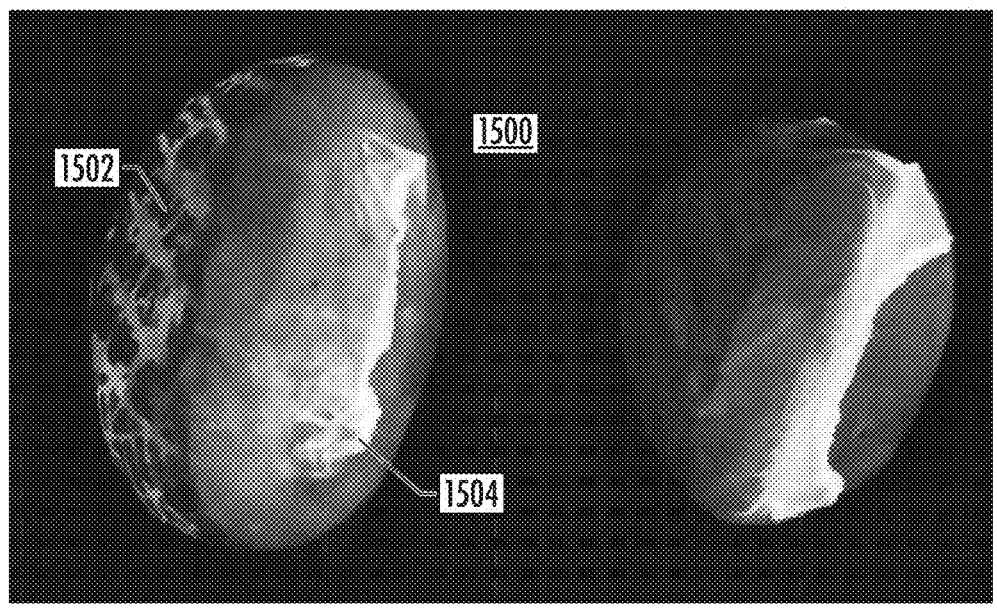
Figure 16:
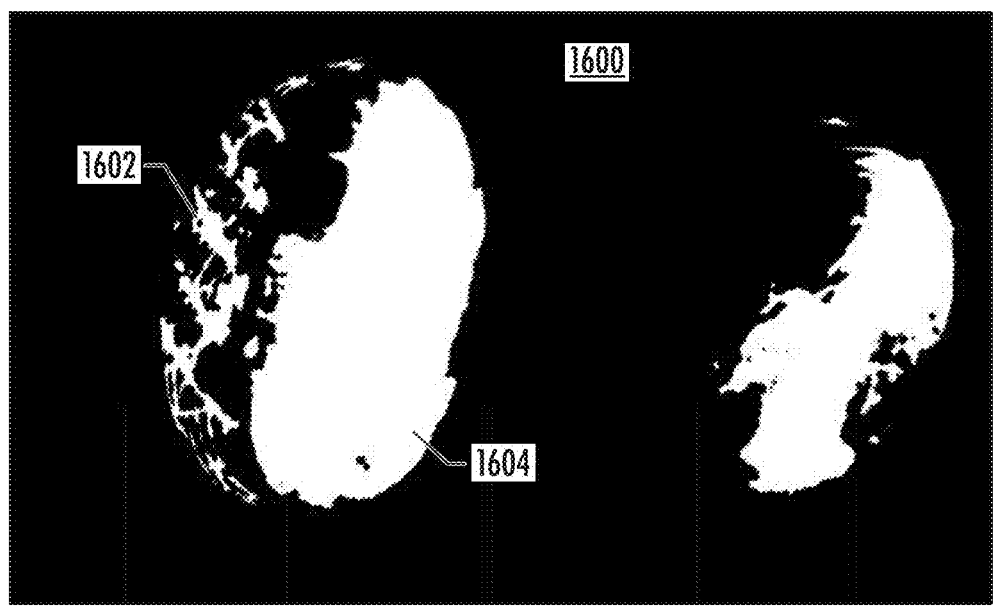
Figure 17:
Figure 18:
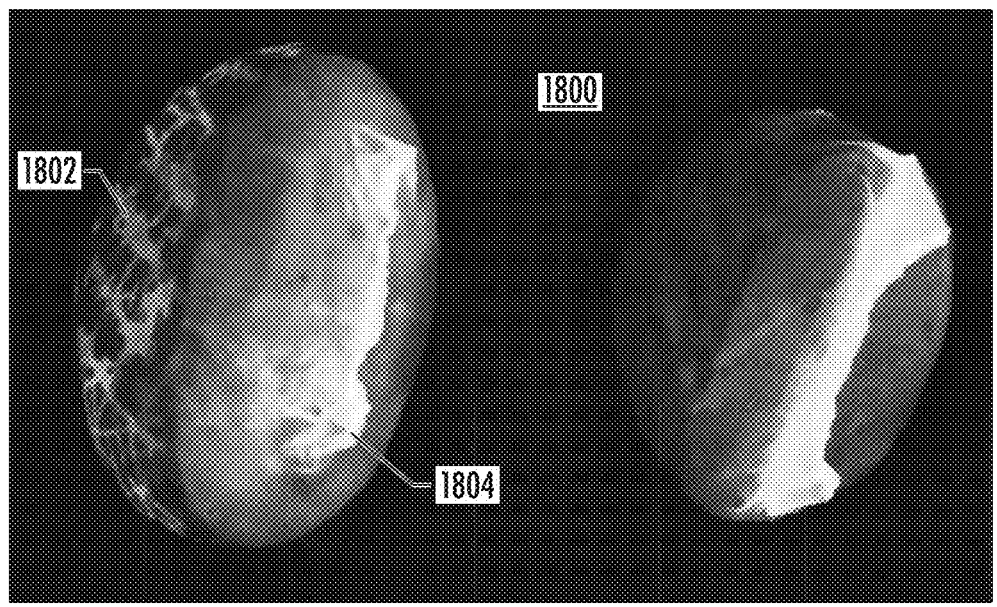
Figure 19:
Figure 20:
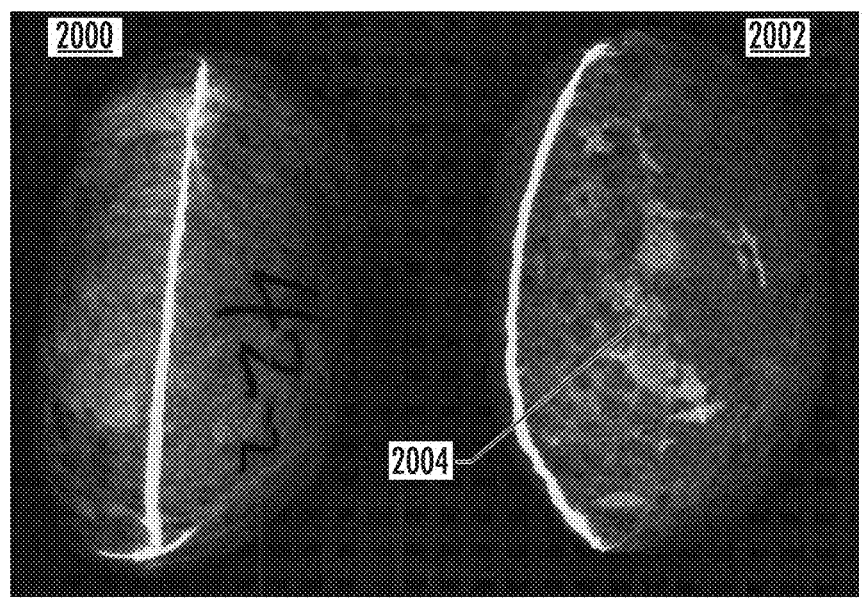
Figure 21:
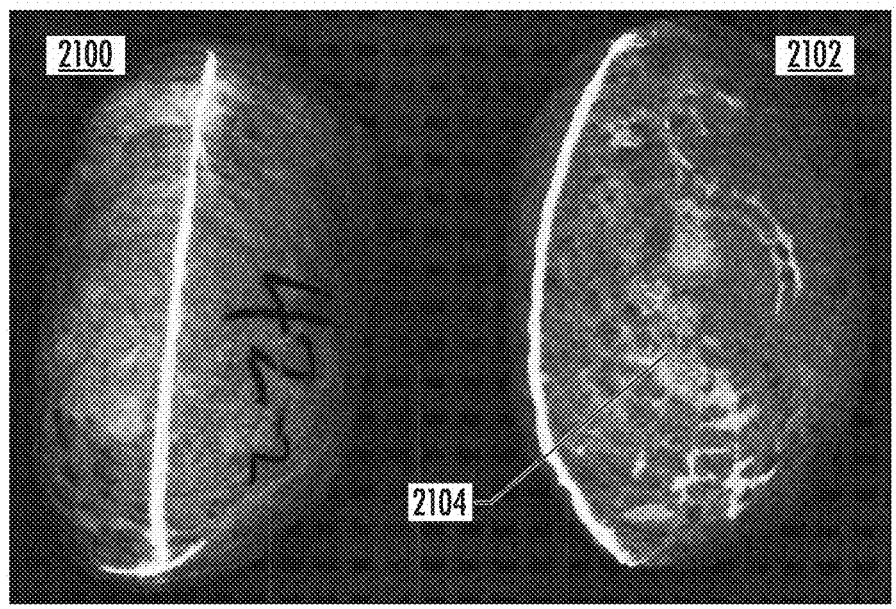
Figure 22:
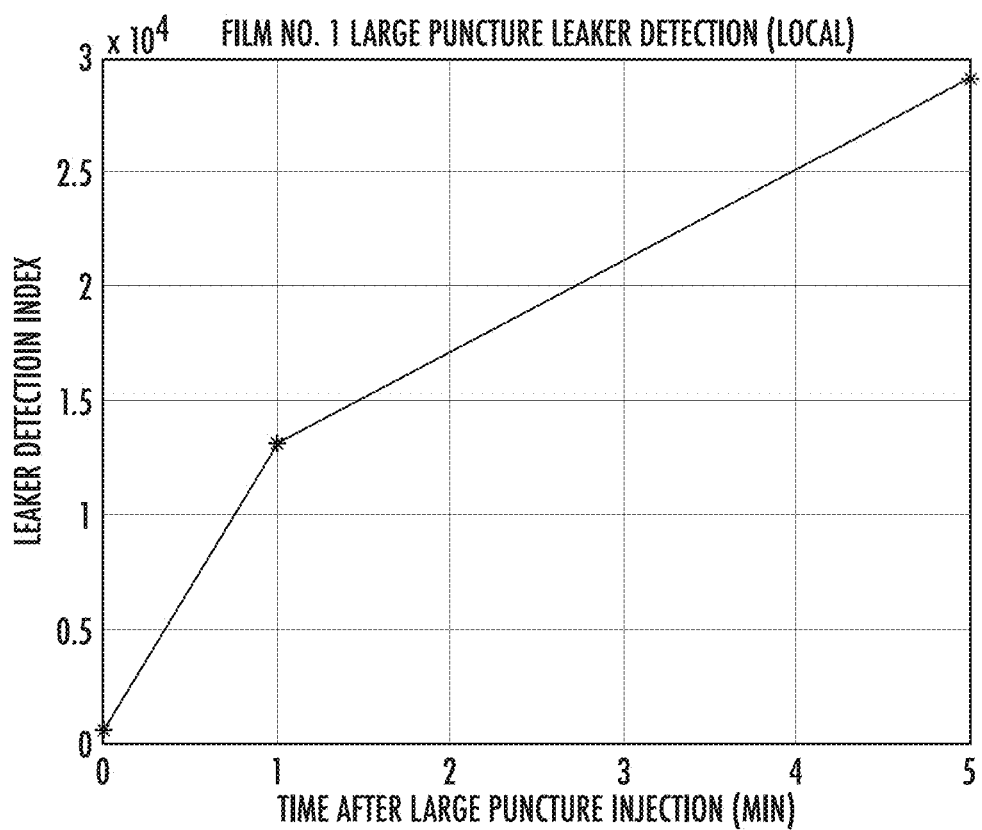
Figure 23:
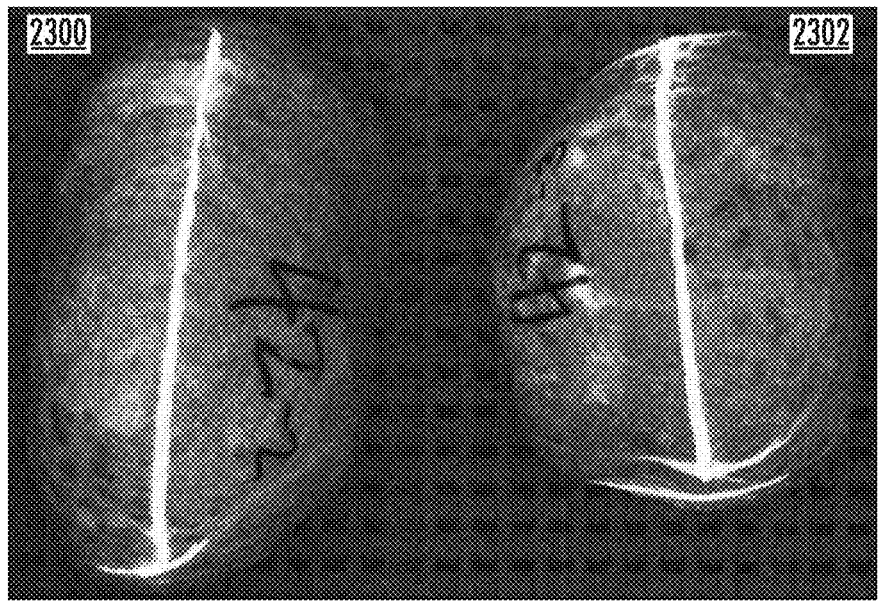
Figure 24:
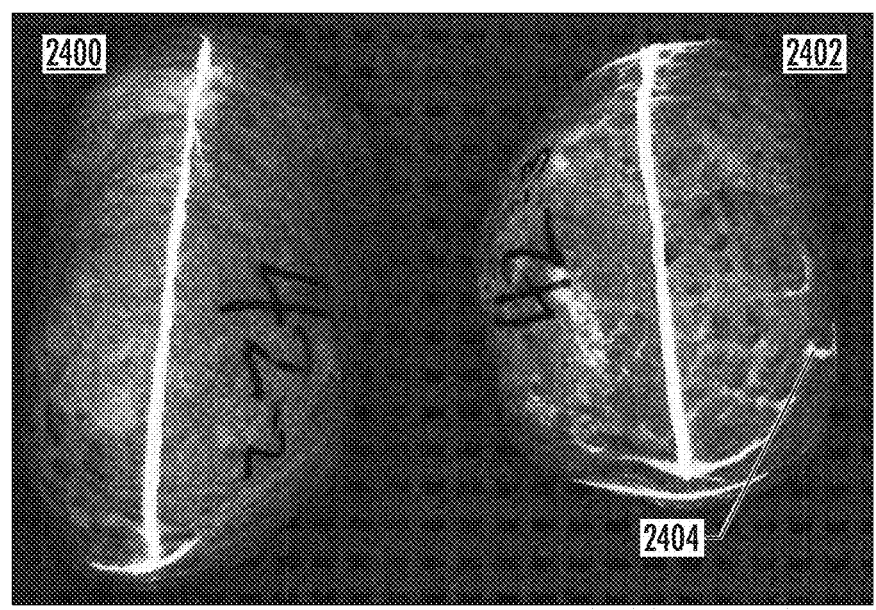
Figure 25:
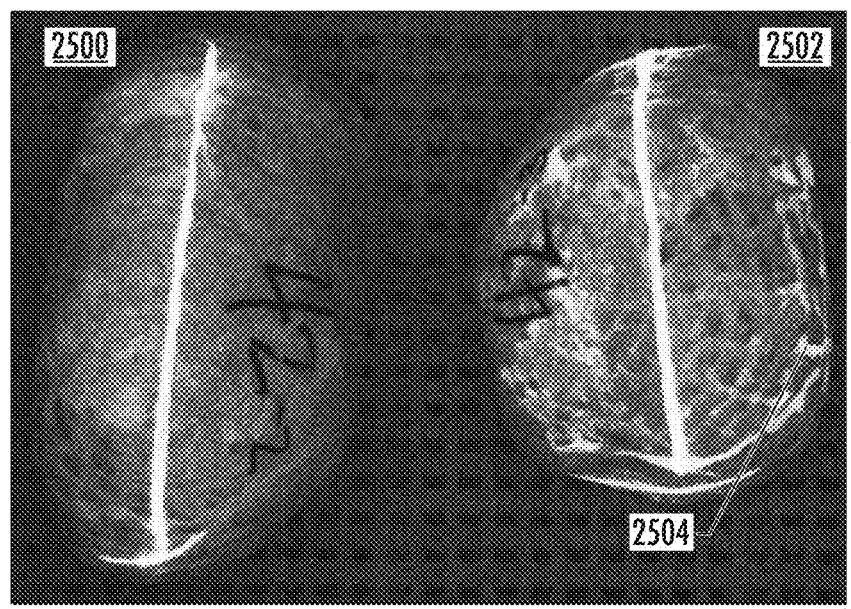
Figure 26:
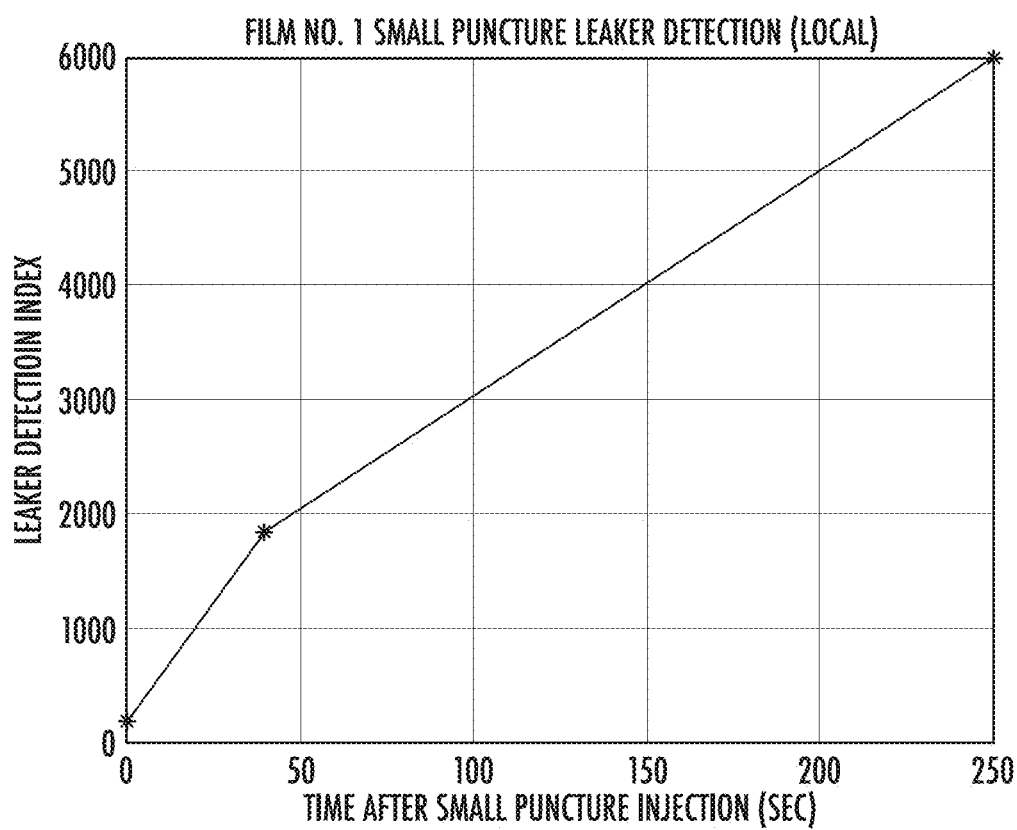
Figure 27:
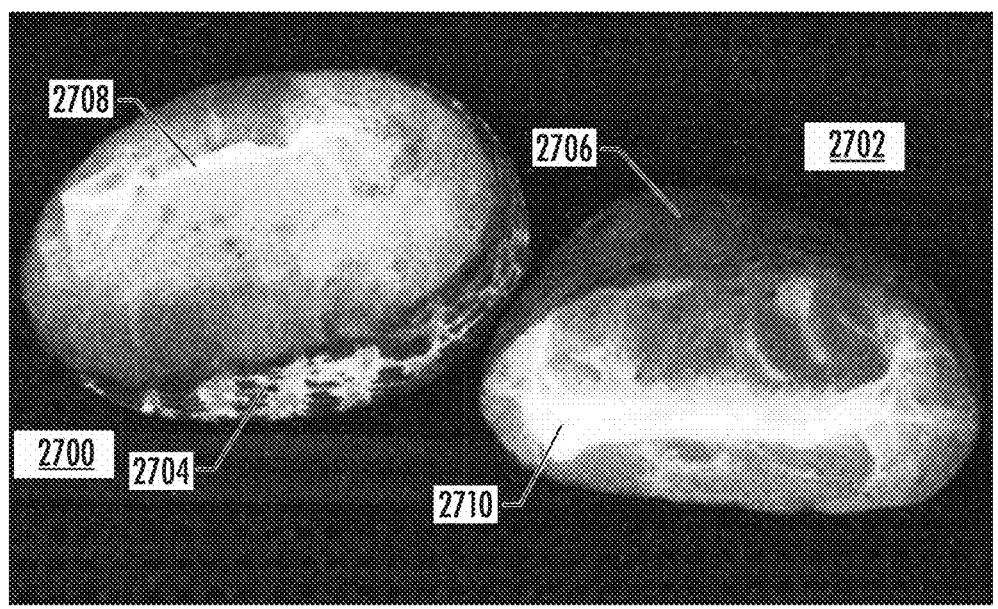
Figure 28:
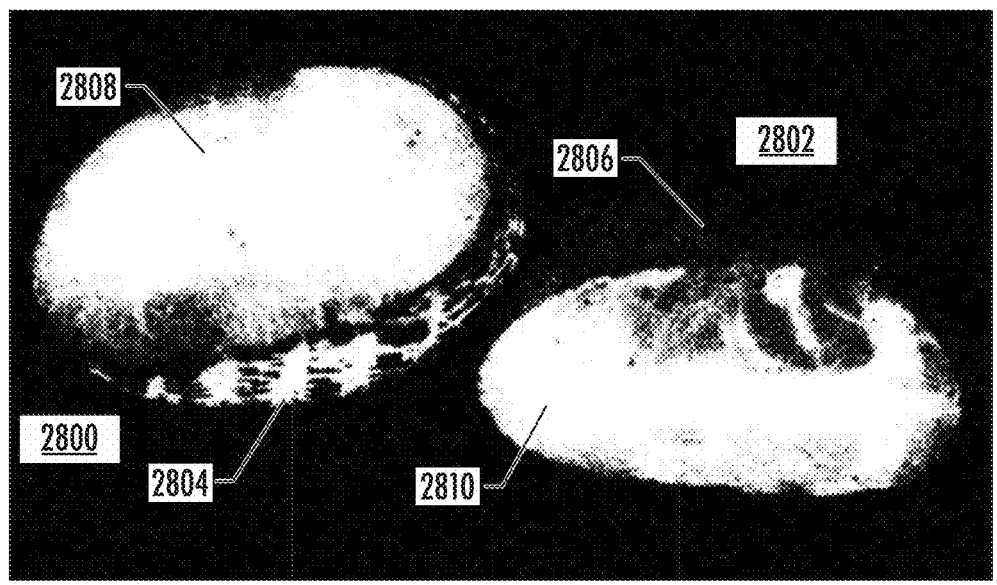
Figure 29:
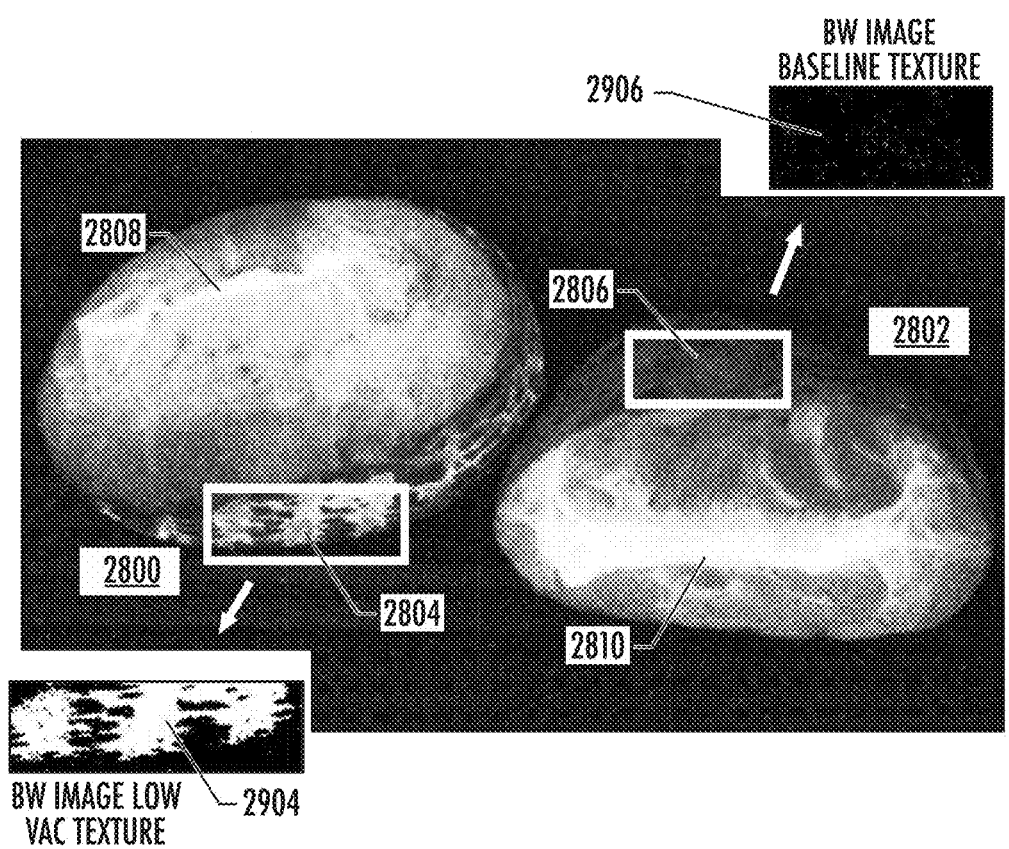
Figure 30:
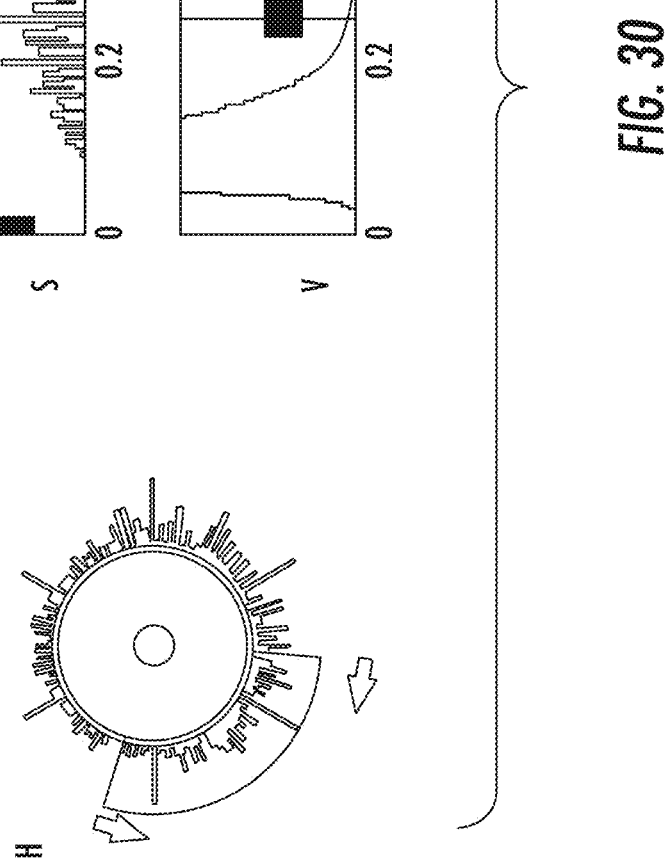

Having thus described the disclosure in general terms, reference will now be made to the accompanying drawings, which are not drawn to scale, and wherein:

FIG. 1A is a schematic of a web production process for extruding an annular web to make an annular tape in accordance with some embodiments herein;

FIG. 1B is a schematic of a further web production process for converting the annular tape produced in FIG. 1A into an annular film tubing in accordance with some embodiments herein;

FIG. 1C is an illustration of a multi-layer film that may be manufactured using the process of FIGS. 1A-1B in accordance with some embodiments herein;

FIG. 1D is a schematic view of vacuum-packaging apparatus for loading, vacuumizing, and sealing a packaging article;

FIG. 2 is a block diagram for a system to seal, test, and pack-off one or more products in accordance with some embodiments herein;

FIG. 3 is a perspective view of a gas-detecting apparatus in accordance with some embodiments discussed herein;

FIG. 4A is a block diagram of a vision system in accordance with some embodiments discussed herein;

FIG. 4B is a block diagram of a distributed vision system in accordance with some embodiments discussed herein;

FIG. 5A is a flow diagram of a model-based process for assessing the integrity of a packaged product in accordance with some embodiments discussed herein;

FIG. 5B is a flow diagram of an algorithm-based process for assessing the integrity of a packaged product in accordance with some embodiments discussed herein;

FIG. 6 is a block diagram of an example algorithm in accordance with some embodiments discussed herein;

FIG. 7 is an embodiment of a method of developing a trained image classification model in accordance with some embodiments discussed herein;

FIG. 8 is an example neural network that is a multilayer neural network in accordance with some embodiments discussed herein;

FIG. 9 is an embodiment of a method of developing a trained image classification model based on a number of parameters in accordance with some embodiments discussed herein;

FIG. 10 is an embodiment of a method of developing a trained image classification model based on a number of parameters in accordance with some embodiments discussed herein;

FIG. 11 is an embodiment of a method for an image classification system to both train a model to classify states of vacuum seal packages and apply the trained model to classify states of vacuum seal packages in accordance with some embodiments discussed herein;

FIG. 12 is an embodiment of a method of classifying a state of a vacuum seal package in accordance with some embodiments discussed herein;

FIG. 13 is a color image of two packaged products showing gas between a packaging article and product (e.g., ham) in accordance with some embodiments discussed herein;

FIG. 14 is the color image of FIG. 13 having undergone a de-noising process in accordance with some embodiments discussed herein;

FIG. 15 is the de-noised image of FIG. 14 converted to greyscale in accordance with some embodiments discussed herein;

FIG. 16 is the greyscale image of FIG. 15 having undergone a thresholding process in accordance with some embodiments discussed herein;

FIG. 17 is the thresholded image of FIG. 16 having undergone a contour detection and area thresholding process in accordance with some embodiments discussed herein;

FIG. 18 is a superimposition of the image of FIG. 17 onto the de-noised image of FIG. 14 in accordance with some embodiments discussed herein;

FIG. 19 is a color image of two packaged products having a film that is fluorescing, with the product on the left being a control and the product on the right being a leaker having a large puncture;

FIG. 20 is a color image of the two packaged products of FIG. 19 after a period of time, in which the leaker product on the right is exhibiting increased fluorescence indicative of a leak;

FIG. 21 is a color image of the two packaged products of FIG. 20 after a further period of time, in which the leaker product on the right is exhibiting increased fluorescence indicative of a leak;

FIG. 22 is a graph of leaker detection index as a function of time for the index values provided for the images of FIGS. 19-21;

FIG. 23 is a color image of two packaged products having a film that is fluorescing, with the product on the left being a control and the product on the right being a leaker having a small puncture;

FIG. 24 is a color image of the two packaged products of FIG. 23 after a period of time, in which the leaker product on the right is exhibiting increased fluorescence indicative of a leak;

FIG. 25 is a color image of the two packaged products of FIG. 24 after a further period of time, in which the leaker product on the right is exhibiting increased fluorescence indicative of a leak;

FIG. 26 is a graph of leaker detection index as a function of time for the index values provided for the images of FIGS. 23-25;

FIG. 27 is a color image of two packaged products having a film that is fluorescing, with the product on the right being a control and the product on the left having a low-vac condition;

FIG. 28 is a black and white image of the two packaged products of FIG. 27 having been processed with a thresholding algorithm;

FIG. 29 is a composite image of the packaged products of FIGS. 27-28 showing a texture analysis of the low-vac and baseline products; and FIG. 30 shows example hue, saturation, value (HSV) plots used in connection with an example image masking process.

DETAILED DESCRIPTION

Example embodiments will now be described more fully hereinafter with reference to the accompanying drawings, in which some, but not all embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

As used herein, the term "film" is inclusive of plastic web, regardless of whether it is film (up to 10 mils thick) or sheet (greater than 10 mils thick). In an embodiment, the orientation of a web in the solid state to produce a heat shrinkable film can be carried out by first extruding a monolayer or multilayer thermoplastic annular "tape," which is thereafter quenched and collapsed into its lay-flat configuration, and thereafter optionally irradiated (to crosslink the polymer) and optionally extrusion coated with one or more additional thermoplastic layers, following which the annular tape is reheated to its softening point and then biaxially oriented (i.e., stretched in the transverse direction and drawn in the machine direction) while in the solid state in a trapped bubble process to result in a heat-shrinkable film, as described in examples below and as illustrated in FIGS. 1A and 1B. The result is a heat-shrinkable film tubing, i.e., a film having a total (i.e., longitudinal plus transverse, L+T) free shrink of at least 10% at 185° F. (85° C.).

As used herein, the phrase "functional layer" refers to a layer of monolayer or multilayer film that has one or more functions, such as, for example, a strength layer, a heat seal layer, an abuse layer, a gloss layer, a barrier layer, a shrink layer, an easy-open layer, or a tie layer for adhering two otherwise incompatible layers to one another. The functional layer may comprise a thermoplastic polymer. The indicator may be present in one or more layers of a multilayer film, including functional or non-functional layers as described herein.

As used herein, the term "barrier", and the phrase "barrier layer", as applied to films and/or film layers, are used with reference to the ability of a film or film layer to serve as a barrier to one or more gases. In the packaging art, oxygen (i.e., gaseous $O_2$) barrier layers have included, for example, hydrolyzed ethylene/vinyl acetate copolymer (designated by the abbreviations "EVOH" and "HEVA", and also referred to as "ethylene/vinyl alcohol copolymer"), polyvinylidene chloride, amorphous polyamide, polyamide MXD6, polyester, polyacrylonitrile, etc., as known to those of skill in the art. In addition to the first and second layers, the heat-shrinkable film may further comprise at least one barrier layer.

The phrase "oxygen transmission rate" ("OTR") is defined herein as the amount of oxygen in cubic centimeters ($cm^3$) which will pass through a 100 square inches of film in 24 hours at 0% relative humidity and at 23° C. The thickness (gauge) of the film has a direct relationship on the oxygen transmission rate. Packaging films which are useful as an oxygen barrier are required to have an OTR value of from about 0 to 10.0 cm$^3$/100 in$^2$ over 24 hr at 0% relative humidity and 23° C. at 1.0 mils or less. Oxygen transmission may be measured according to ASTM D-3985-81 which is incorporated herein by reference.

As used herein, the term "indicator" and the phrase "detectable component" refer to any component that can be added to a thermoplastic material extruded to make a film layer, which component emits fluorescent electromagnetic energy upon absorbing incident electromagnetic energy of a wavelength that produces fluorescence in the indicator. The resulting fluorescent electromagnetic energy is detectable by a detector, machine vision, or any other means for determining the presence or absence of the component in a particular area of the film.

As used herein, the phrase "in-line" refers to carrying out the process while a stream of vacuum packaged products are being forwarded, and without having to remove packages from the stream in order to conduct the process, and without having to open a package in order to detect a leak or low-vac condition.

As used herein, the term "vacuum" refers to a sufficiently low pressure to meet the preservation and packaging requirements of the particular use to which the vacuum-packaged product relates, and does not require an absolute, theoretical vacuum. The exact pressure that constitutes a low-vac condition, a defective product, a leak, or like terminology may vary in some embodiments from case to case, package to package, and/or product to product.

In an embodiment, the functional layer functions as a barrier layer. The barrier layer can be an oxygen barrier layer, an organoleptic barrier layer (barrier to aroma and/or flavor components), a moisture barrier layer, or any other barrier layer known to those of skill in the film art.

Suitable moisture barrier layers include ethylene-based polymers such as high density polyethylene, polypropylene (especially biaxially oriented polypropylene), polyester, polystyrene, and polyamide.

Suitable thermoplastic oxygen barrier layers include polyvinylidene chloride (PVDC), saponified ethylene/vinyl acetate copolymer (also commonly referred to as ethylene/vinyl alcohol copolymer, or EVOH), polyamide, polyester, oriented polypropylene, and ethylene homopolymer.

In an embodiment, a detectable component (e.g., an ultra-violet (UV) fluorescing agent) is blended with an oxygen barrier resin such as PVDC or EVOH, or even included with the reactants which polymerize to form the PVDC or EVOH. Providing the detectable component within the barrier resin at a consistent level so that the detectable component is homogeneously dispersed throughout the resin (and thereby dispersed throughout the resulting film layer) allows for accurate detection of gas across the packaged product. Homogeneity can be accomplished by blending and/or compounding steps as known to those of skill in the art of blending additives into polymers or preparing polymers in the presence of additives. For example, making a homogeneous blend of 15 ppm indicator with a thermoplastic polymer can be carried out using staged blending, as follows. In a first blending stage, 3 parts by weight indicator master batch are blended with 97 parts by weight primary polymer, resulting in a first stage blend containing indicator at a level of 30,000 ppm. In a second blending stage, part or all of the first stage blend is diluted 20:1 with the primary polymer, resulting in a second stage blend containing indicator at a level of 1500 ppm. In the third stage blend, part or all of the second stage blend is diluted 100:1 with the primary polymer, resulting in a third stage blend which contains indicator at a level of 15 ppm indicator. In each stage, blending is carried out to a high degree of uniformity by using, for example, a high shear mixer. The homogeneity of the resulting blend also allows the barrier resin to retain its barrier function in the barrier layer of the film.

The detectable component can be added at a low level (e.g., 20 ppm) such that the layer retains its barrier property but the detectable component is present at a level high enough that it is readily detectable by the machine vision system. If a UV-fluorescing agent is used, upon receiving UV radiation that excites the fluorescing agent, the UV agent is provided at a level high enough that its fluorescence can be readily detected by the machine vision system, but at the same time at a level low enough that the presence of the UV agent does not substantially reduce the oxygen barrier character of the oxygen barrier polymer from which the barrier layer is made.

The detectable component/barrier material blend can then be extruded alone or in combination with one or more additional melt streams, to form a monolayer or multilayer film.

Although the presence of the detectable component in the packaged product is preferably not readily visible to a consumer, if a UV-fluorescing agent is used as the detectable component, a product packager using a roll of such a film to package product is able to positively confirm the presence or absence of the barrier layer in the film by simply illuminating the roll of film with a UV-light (e.g., UV flashlight) to cause the UV agent to fluorescence, thereby confirming the presence or absence of the oxygen barrier layer in the film based on whether the desired fluorescence is observed.

The ability to immediately identify a barrier layer in a film is important because a wide variety of films are utilized for packaging, with some of the films requiring a barrier layer and other packaging films not requiring a barrier layer. If a non-barrier film is inadvertently mislabeled as a barrier film, or inadvertently utilized to package a product which requires a barrier film, the shelf life of a product packaged in the film may be compromised, potentially resulting in product damage. The presence of, for example, the UV fluorescing agent in an oxygen barrier layer of the film, allows for quick and accurate testing to positively confirm the presence or absence of the barrier layer in the film, thereby minimizing the chance that an oxygen-sensitive product is packaged in a film lacking an oxygen barrier layer.

Example Components

Below is information on the identity of various resins and other components present in films of the examples set forth hereinbelow.

SSPE1 was AFFINITY® PL 1281G1 homogeneous ethylene/octene copolymer having a density of 0.900 g/cm$^3$ and a melt index of 6.0 dg/min, obtained from The Dow Chemical Company.

SSPE2 was AFFINITY® PL 1850G homogeneous ethylene/octene copolymer having a density of 0.902 g/cm$^3$ and a melt index of 3.0 dg/min, obtained from The Dow Chemical Company.

SSPE3 was EXCEED® 1012HJ homogeneous ethylene/hexene copolymer having a density of 0.912 g/cm$^3$ and a melt index of 1.0 dg/min, obtained from ExxonMobil.

VLDPE1 was XUS 61520.15L very low density polyethylene having a density of 0.903 g/cm$^3$ and a melt index of 0.5 dg/min, obtained from The Dow Chemical Company.

LLDPE1 was LL 3003.32 heterogeneous ethylene/hexene copolymer having a density of 0.9175 g/cm$^3$ and a melt index of 3.2 dg/min, obtained from Exxon Mobil.

LLDPE2 was DOWLEX® 2045.04 linear low density polyethylene having a density of 0.920 g/cm$^3$ and a melt index of 1.0 dg/min, obtained from The Dow Chemical Company.

EVA1 was EB524AA ethylene/vinyl acetate copolymer (14% vinyl acetate) having a density of 0.934 g/cm$^3$ and a melt index of 3.5 dg/min, obtained from Westlake Chemical.

EVA2 was ESCORENE® LP761.36 ethylene/vinyl acetate copolymer (26.7% vinyl acetate) having a density of 0.951 g/cm$^3$ and a melt index of 5.75 dg/min, obtained from Exxon Mobil.

PVDC-2 was IXAN® PV910 vinylidene chloride/methyl acrylate copolymer having a density of 1.71 g/cm$^3$, obtained from Solvin.

OB was BENETEX OB PLUS® 2,5-thiophenediylbis(5-tert-butyl-1,3-benzoxazole fluorescent agent, obtained from Mayzo Inc.

MB 1 was 100458 masterbatch of fluoropolymer in linear low density polyethylene, having a density of 0.93 g/cm$^3$ and a melt index of 2.3 g/10 min, obtained from Ampacet.

MB 2 was IP-1121 masterbatch of fluoropolymer in linear low density polyethylene, having a density of 0.92 g/cm$^3$ and a melt index of 2 g/10 min, obtained from Ingenia Polymers.

Production and Composition of Films Nos. 1 and 2

Multilayer, heat-shrinkable films herein referred to as Film No. 1 and Film No. 2 were prepared using the process illustrated in FIG. 1A. In some embodiments, the packaging article may be manufactured using any known method resulting in any combination of packaging materials provided an indicator as described herein is incorporated into the packaging article. In some embodiments, solid polymer beads (not illustrated) were fed to a plurality of extruders 28 (for simplicity, only one extruder is illustrated). Inside extruders 28, the polymer beads were forwarded, melted, and degassed, following which the resulting bubble-free melt was forwarded into die head 30, and extruded through an annular die, resulting in annular tape 32, which was about 15 mils thick.

After cooling and quenching by water spray from cooling ring 34, annular tape 32 was collapsed into lay-flat configuration by nip rollers 36. When collapsed, the annular tape had a lay-flat width of about 2.5 inches. Annular tape 32 in lay-flat configuration then passed through irradiation vault 38 surrounded by shielding 40, where annular tape 32 was irradiated with high energy electrons (i.e., ionizing radiation) from iron core transformer accelerator 42. Annular tape 32 was guided through irradiation vault 38 on rolls 44. Preferably, the irradiation of annular tape 32 was at a level of about 64 kGy.

After irradiation, irradiated annular tape 46 was directed through pre-coating nip rollers 48, following which irradiated annular tape 46 was slightly inflated, resulting in trapped bubble 50. At trapped bubble 50, irradiated annular tape 46 was not significantly drawn longitudinally, as the surface speed of post-coating nip rollers 52 was about the same as the surface speed of pre-coating nip rollers 48. Furthermore, irradiated tape 46 was inflated only enough to place the annular tape into a substantially circular configuration without significant transverse orientation, i.e., without transverse stretching.

Irradiated tape 46, slightly inflated by bubble 50, was passed through vacuum chamber 54, and thereafter forwarded through coating die 56. Annular coating stream 58 was melt extruded from coating die 56 and coated onto inflated, irradiated annular tape 46, to form coated annular tape 60. Coating stream 58 comprised an $O_2$-barrier layer made from PVDC, together with additional layers, all of which did not pass through the ionizing radiation. Further details of the above-described coating step were generally as set forth in U.S. Pat. No. 4,278,738, to BRAX et. al., which is hereby incorporated by reference thereto, in its entirety.

After irradiation and coating, coated annular tape 60, now having a thickness of about 25 mils, was wound up onto windup roll 62.

Thereafter, turning to FIG. 1B, windup roll 62 was installed as unwind roll 64, on a second stage in the process of making the desired heat-shrinkable film tubing. Coated annular tape 60 was unwound from unwind roll 64, and passed over guide roll 66, after which coated annular tape 60 was passed into hot water bath tank 68 containing hot water 70. Coated tubular film 60, still in lay-flat configuration, was immersed in hot water 70 (preferably at a temperature of from about 185° F. to 210° F.) for a period of from about 10 to about 100 seconds, i.e., long enough to bring annular tape 60 up to its softening point, i.e., the desired temperature for biaxial orientation while the coated annular tape was in the solid state.

Thereafter, coated annular tape 60 was directed through nip rolls 72, and bubble 74 was blown, thereby transversely solid state stretching coated annular tape 60. Furthermore, while being blown, i.e., transversely stretched, nip rolls 76 drew annular tape 60 in the longitudinal direction, as nip rollers 76 had a surface speed higher than the surface speed of nip rollers 72. As a result of the transverse stretching and longitudinal drawing, annular tape 60 was biaxially oriented in the solid state to form biaxially-oriented, heat-shrinkable film tubing 78. Heat-shrinkable film tubing 78 was stretched transversely at a ratio of 3.6:1, and drawn longitudinally at a ratio of 3.6:1, for a total orientation of about 13×. While bubble 74 was maintained between pairs of nip rollers 72 and 76, the resulting blown film tubing 78 was collapsed into lay-flat configuration by rollers 80. Blown film tubing 78 had a lay-flat width of about 10 inches. Film tubing 78 in lay-flat configuration was thereafter conveyed through nip rollers 76 and across guide roll 82, and then rolled onto wind-up roll 84. Idler roll 86 assures a good wind-up.

Each of Film No. 1 and Film No. 2 was a multilayer heat-shrinkable film having a layer arrangement, layer composition, layer thickness, and layer function as generally set forth in Tables 1 and 2, below. The seal layer, 1$^{st}$ bulk layer, and 1$^{st}$ tie layer were all coextruded together and subjected to high energy irradiation in vault 38. The barrier layer, 2$^{nd}$ tie layer, 2$^{nd}$ bulk layer, and abuse layer were put on in the coating step, i.e., were not irradiated. The heat-shrinkable film tubing made from Films No. 1 and Film No. 2 had the following layer arrangement, composition, and thickness:

Film No. 1

| Layer | Film Tubing of Film No. 1 | | | | | | | |
|---|---|---|---|---|---|---|---|---|
| function | Seal | 1st Bulk | 2nd Bulk | 1st Tie | Barrier | 2nd Tie | 3rd Bulk | Abuse |
| Composition | 80% SSPE1 20% LLDPE1 | 80% VLDPE1 19% SSPE3 1% MB-1 | 100% EVA1 | 100% EVA2 | PVDC-2 containing 52 ppm OB | 100% EVA2 | 80% VLDPE1 19% SSPE3 1% MB1 | 80% SSPE2 19% LLDPE2 1% MB-2 |
| wt. % | 19.6 | 45.2 | 4.1 | 2.7 | 8.2 | 2.7 | 9.6 | 7.8 |
| Thickness | 0.43 mil | 0.99 mil | 0.09 mil | 0.06 mil | 0.18 mil | 0.06 mil | 0.21 mil | 0.17 mil |

The layer arrangement, layer composition, layer function, and layer thickness for the film tubing of Film No. 2 were as follows:

Film No. 2

| Layer | Film Tubing of Film No. 2 | | | | | | | |
|---|---|---|---|---|---|---|---|---|
| function | Seal | 1st Bulk | 2nd Bulk | 1st Tie | Barrier | 2nd Tie | 3rd Bulk | Abuse |
| Composition | 80% SSPE1 20% LLDPE1 | 80% VLDPE1 19% SSPE3 1% MB-1 | 100% EVA1 | 100% EVA2 | PVDC-2 containing 18 ppm OB | 100% EVA2 | 80% VLDPE1 19% SSPE3 1% MB1 | 80% SSPE2 19% LLDPE2 1% MB-2 |
| wt. % | 19.6 | 45.2 | 4.1 | 2.7 | 8.2 | 2.7 | 9.6 | 7.8 |
| Thickness | 0.43 mil | 0.99 mil | 0.09 mil | 0.06 mil | 0.18 mil | 0.06 mil | 0.21 mil | 0.17 mil |

The barrier layer formulations for each of Film No. 1 and Film No. 2 were provided with an indicator which was more particularly, Film Nos. 1 and 2 each contained 2,2'-(2,5-(thiophenediyl)-bis(5-tert-butylbenzoxazole)) optical brightener as the detectable component. More particularly, the optical brightener was BENETEX OB PLUS® optical brightener obtained from Mayzo, Inc of 3935 Lakefield Court, Suwanee, Ga. Although this material has been used as a brightening agent to reduce the appearance of the browning of PVDC during film extrusion, 2,2'-(2,5-(thiophenediyl)-bis(5-tert-butyl-1,3-benzoxazole)) also acts as a fluorescent agent when subject to incident radiation at 375 nm. Upon excitement by exposure to radiation having at peak wavelength of 375 nm, the indicator fluoresced at peak wavelength of 435 nm. Film No. 1 had a barrier layer with an OB level of 45 ppm. Film No. 2 had a barrier layer with an OB level of 15 ppm.

Film Nos. 1 and 2 may be used to make end-seal bags that were used to package meat products in accordance with the methods and apparatus detailed herein. In some embodiments, a non-shrinkable film may be used. In some embodiments, the film may be clear and transparent.

In some embodiments, the combination of PVDC and any of the claimed indicators in a film may further improve the recyclability of the packaging articles. In particular, PVDC may require more sophisticated recycling apparatuses that cannot be handled by mainstream recycling facilities (e.g., as compared to traditional PE or PVC films). In some embodiments, a recycler may illuminate the materials sent to the recycling facility (e.g., using any of the illuminating technologies discussed herein) to quickly identify a PVDC-based packaging article based on the presence of the fluorescence-based indicator. In such embodiments, the fluorescence-based indicator films disclosed herein may increase the efficiency of mainstream recycling facilities by allowing quick identification and separation of the disclosed packaging articles.

With reference to FIG. 1C, in an embodiment, the multilayer film 90 comprises: A) a first layer 91 which is a first outer film layer and which serves as a heat seal layer; B) a second film layer 95 which is a second outer layer and which serves as an abuse layer; C) a third film layer 93 which is between the first layer and the second layer, the third layer serving as a functional layer; D) a fourth film layer 92 which is between the first layer 91 and the third layer 93, the fourth layer serving as a first tie layer; and E) a fifth film layer 94 which is between the second layer 95 and the third layer 93, the fifth layer serving as a second tie layer.

With reference to FIG. 1D, a vacuum-packaging apparatus 10 is shown for loading, vacuumizing, and sealing a packaging article from the films discussed herein. While one example is shown, any method of enclosing and sealing a packaged product may be used. Examples of a vacuum-packaging apparatus include the apparatus disclosed in U.S. Pat. No. 6,499,274 (McDonald et al.), which is incorporated by reference herein in its entirety. The depicted apparatus 10 includes a bag loading apparatus 12. Bag loading apparatus 12 can be a manual system for placing a bagged article onto a subplaten. Alternatively, bag loading apparatus 12 can be an automated or semi-automated system. Examples include the bag loading apparatus disclosed in U.S. Pat. No. 5,692,360 (McDonald et al.), which is incorporated by reference herein in its entirety. In the depicted embodiment of FIG. 1D, conveyor 14 transports subplatens 16 with loaded, preferably clamped bagged articles to a synchronizing assembly 18. The synchronizing assembly 18 acts as a buffer between the bag loading apparatus 12, which typically operates in intermittent motion, and the vacuum/seal apparatus 19. This is especially useful if the vacuum/seal apparatus 19 is a rotary chamber machine (as depicted in FIG. 1D), which operates in continuous motion. The advantage here is that the bag loading apparatus 12, if automated, requires no designed-in direct labor, and the bag neck of each bagged article 26 is straightened automatically and clamped to a subplaten 16. Vacuumizing and sealing can thus be done at high speeds on otherwise conventional vacuum/seal apparatus 19.

System Setup

Provided herein are means for non-destructively identifying gas in a packaged product. After manufacturing the film (e.g., Film Nos. 1 and 2 described above), a product may be packed and sealed within a packaging article formed from the film. FIG. 2 shows an example block diagram for a system to seal, test, and pack-off one or more products in accordance with the systems and methods herein. In the depicted embodiment, a vacuum-packaging apparatus 100 is shown for packaging the product in a packaging article, removing gas from the packaging article, and sealing the packaging article to form the packaged product. The vacuum-packaging apparatus 100 may include, but is not limited to, a vacuum chamber in which a packaging article and product are inserted to remove air from the space surrounding the article and product; a nozzle connected to the packaging article; a gap between two films that make up the packaging article through which air may be evacuated; and/or holes in a packaging article through which a vacuum may be drawn. For example, a Darfesh® or Multivac® thermoforming system may be used as the vacuum-packaging apparatus.

After forming the packaged product, the packaged product may be passed into a gas-detecting apparatus 200 to verify the integrity of the seal of the packaging article. In some embodiments, the gas-detecting apparatus 200 may feed into a pack-off apparatus 300, which may be automated or manual. In some embodiments, the packaged product may pass through a package manipulator 150 prior to entering the gas-detecting apparatus 200. The package manipulator 150 may include any of the manipulation apparatuses disclosed herein (e.g., vibration, impact, tumbling, air jets, temperature variance, etc.) and may accelerate the leaking of any defective portions of the packaging article so that defects are identified early. The package manipulator 150 may move gas within the packaged product to areas of the packaging article and product more. In some embodiments, the gas detection process, and use of the gas-detection apparatus disclosed herein, may occur at any time after packaging and sealing of the product, including but not limited to prior to boxing and shipping or after shipping and receipt by an intermediate or end customer. In some embodiments, the gas-detecting apparatus 200 or portions thereof (e.g., vision system 225) may be integrated with or coupled to any other apparatus or assembly of a production line. The gas-detecting apparatus 200 may be used in-line within a packing and shipping operation, or in some embodiments, the gas-detecting apparatus may be a standalone apparatus configured to perform leakage and trapped gas checks on packaged products offline.

With continued reference to FIG. 2, the assembly may further include a pack-off apparatus 300 for facilitating packaging and shipping of the non-defective packaged products. In some embodiments, robotic pack-off can be employed to direct properly vacuum sealed packages into bulk shipping containers. A robotic package handler and packer can be used to obtain automatic pack-off. In some embodiments, a robotic package handler may also facilitate in-line gas detection in a packaged product (with potential additional package manipulation to accelerate the leaker rate of existing small leakers that happen to have close contact with product and move obscured gas into more visible areas of the package), and in combination with an action system (e.g., an automatic separator) mentioned in 2) for the defect packages to be picked out and recycled back to re-packaging.

In some embodiments, the gas-detecting apparatus 200 may be positioned adjacent or may be integrated with one or more of the other components in a production assembly. For example, in some embodiments, one or more imaging devices 210 (e.g., cameras shown in FIG. 3) may be positioned on or adjacent a robotic package handler to detect gas within the packaging article while the packaged products are being boxed for shipping. In another example, one or more imaging devices 210 (e.g., cameras shown in FIG. 3) may be positioned on or adjacent a separate manipulator. In either of the aforementioned examples, the one or more imaging devices 210 (shown in FIG. 3) may capture image(s) or video of the packaged product during manipulation (e.g., manipulation by the manipulator 150, a user, or any other device or process described herein) to search for gas in the packaging article. In some embodiments, a sequence of images (e.g., video) may be used to track changes in the packaged product over time, either with or without manipulation. Imaging the packaged product during manipulation may allow for comparison of the packaged product between images in a sequence of images to observe moving gas within the packaging article of the packaged product. In another example, the gas-detecting apparatus 200 may be positioned at least partially within the vacuum-packaging apparatus or within a vacuum chamber of the vacuum-packaging apparatus itself to detect gas in the packaged product immediately after packaging. The vision system 225 of the gas-detecting apparatus 200 disclosed herein may be used in addition to or instead of other gas-detecting means, such as destructive inspection methods, contact-based leak detection, and/or manual inspection. In some embodiments, the gas-detecting apparatus may include a combination of nondestructive (e.g., imaging according to any embodiment disclosed herein) and destructive inspection methods either in sequence or simultaneously. For example, a water basin test may be used in addition to the fluorescence-based imaging techniques described herein.

In some embodiments, a shrink tunnel or other film shrinking device may be positioned downstream of the vacuum-packaging apparatus 100. In some embodiments a blow-off unit may be positioned downstream of the film shrinking device. In some embodiments, the gas-detecting apparatus 200 may be positioned downstream of the shrinking device and/or blow-off unit. In some embodiments, the gas-detecting apparatus 200 may be integral with either the shrinking device or the blow-off unit.

FIG. 3 shows an example gas-detecting apparatus 200 for detecting gas within an otherwise vacuum-packaged product in accordance with the systems and methods herein. The depicted embodiment shows a bench-scale gas-detecting apparatus 200 with 35 inches from at least one imaging device 210 (e.g., a camera) to conveyer, (i.e., a 35 inch focal distance); however, the scale may be adjusted to any commercial packaging operation. In some embodiments, the imaging devices 210 may be positioned at different longitudinal and lateral points along the conveyor 205 to capture images of the packaged product from different angles. In an instance in which the apparatus 200 includes multiple cameras, each of the imaging devices 210 may be oriented towards a common focal point. In some embodiments, at least one imaging device 210 may be positioned above the conveyor 205 and above the packaged products (e.g., a top-down angle). In some embodiments at least one imaging device 210 may be positioned to one side of the packaged products (e.g., a low angle). In low angle applications the imaging device 210 reduces false positives by reducing reflected light and increasing the ratio of emitted light as compared to reflected light. In an embodiment, the imaging device 210 is placed at a low angle. In an embodiment, the imaging device 210 is placed at a top-down angle (90 degree). In an embodiment, the imaging device 210 are placed such that the angle of the vertical plane to the imaging device 210 is between an angle of 0 and 60 degrees. In an embodiment, the imaging device 210 are placed such that the angle of the vertical plane to the imaging device 210 is between an angle of 10 and 50 degrees.

The gas-detecting apparatus 200 may comprise a conveyor 205, which may connect the gas-detecting apparatus to the remainder of the line (e.g., vacuum-packaging apparatus 100 and pack-off apparatus 300) in an in-line embodiment. In some embodiments, the conveyor 205 may be configured to continuously feed packaged products through the apparatus, and the apparatus 200 may image the packaged products as they move under the imaging devices 210. In some embodiments, the conveyor 205 may be configured to pause to allow stationary imaging of one or more packaged products. The conveyor 200 may be programmed to operate at any interval or speed sufficiently slow to allow the vision system 225 to image the packaged products.

In some embodiments, the vision system 225 may be integrated with another component in a production line. For example, in some embodiments, the vision system 225 or portions thereof (e.g., imaging devices 210) may be positioned adjacent to or inside a vacuum chamber of a vacuum-packaging apparatus to detect gas in a packaged product immediately or shortly after packaging. In some embodiments, the vision system 225 or portions thereof (e.g., imaging devices 210) may be positioned adjacent or inside a shrink tunnel for imaging during a heat-shrink process. In some embodiments, the vision system 225 or portions thereof (e.g., imaging devices 210) may be positioned adjacent or inside a manipulator 150. In some embodiments, the vision system 225 or portions thereof (e.g., imaging devices 210) may be positioned adjacent or inside a pack-off apparatus (e.g., a robotic packaging arm). In some embodiments, the vision system 225 or portions thereof (e.g., imaging devices 210) may be positioned at or adjacent any location where a packaged product is manipulated or handled.

In some embodiments, a user may manually inspect the images captured by an imaging device 210 in addition to or instead of under the control of the computing apparatus 220. In some embodiments, a user may manually capture the images with a handheld imaging device. In some embodiments, a user may observe the packaged product to look for defects in addition to or instead of the vision system 225. In some embodiments, a user may use a handheld illuminator 215 (e.g., a handheld black light) to inspect the packaged products in addition to or instead of the vision system.

The gas-detecting apparatus 200 may further comprise an enclosure 230 through which the conveyor 205 travels and in which the imaging device(s) 210 and illuminator(s) 215 may be positioned (e.g., as shown in FIG. 3). In some embodiments, the enclosure 230 may define a plurality of walls 235 forming a tunnel through which the conveyor 205 passes. In some embodiments, the walls 235 may be at least partially reflective to improve the amount and coverage of the electromagnetic radiation from the illuminators.

In some embodiments, the vision system 225 may include one or more imaging devices 210, one or more illuminators 215, and one or more computing apparatus 220. In some embodiments, the imaging devices 210 may comprise any sensor capable of detecting the electromagnetic energy radiating from the excited fluorescence-based indicator at a wavelength and intensity emitted by the indicator. For example, in one example embodiment, the vision system 225 may include a camera head which is a GigE color zoom camera. The camera(s) may include a color camera or a monochrome camera. In some embodiments, the camera(s) may include an area-scan camera or a line-scan camera, and the camera may have 4 k or 8 k pixels per line. The line-scan camera may be preferred in some embodiments because it produces less data that can be analyzed more quickly. In some embodiments, the imaging devices 210 may be film cameras. In some embodiments, the imaging devices 210 may be complementary metal-oxide-semiconductor (CMOS) image sensors. In some embodiments, the imaging devices 210 may be charge-coupled device (CCD) image sensors.

One embodiment of a vision system that can be adapted to carry out the inspection of the packaged products is a system marketed by Isra Surface Vision Inc. This system operates at 320 megahertz. With the 4K line-scan color camera, using the standard lens, each scan has 4096 pixels across. Each pixel has a gray scale value of from 0 to 255, with 0 being white, 255 being black, and 1-254 being shades of grey. An alternative embodiment employs a 4K line scan monochrome camera. Using the standard lens with the monochrome camera, each scan has 4096 pixels across.

In some embodiments, the illuminators 215 may comprise any source of electromagnetic radiation capable of producing the electromagnetic radiation at a peak wavelength and intensity sufficient to excite the fluorescence-based indicator. In some embodiments, the illuminators 215 may have a variable intensity. For example, in one example embodiment, the lighting was 4 black lights each having a length of 24 inches, arranged in a square with the imaging device on top and aligned in the middle position. In some embodiments, the illuminators 215 may include LEDs. In some embodiments, the illuminators 215 may include fluorescent, incandescent lamps, or other lamps or light sources. In an embodiment, the illuminators 215 include a visible light block filter to block certain wavelengths of light from passing to the package. In an embodiment, the light block filter has a band pass of 100 to 600 nm. In an embodiment, the light block filter (also known as a band pass filter) has a band pass range of 200 nm. In an embodiment, the illuminator(s) 215 is placed at a low angle. In an embodiment, the illuminator(s) 215 is placed at a top-down angle (90 degree). In an embodiment, the illuminators 215 are placed such that the angle of light hitting the package is between an angle of 90 and 160 degrees. In an embodiment, the illuminators 215 further include a polarizer to reduce glare and provide improved imaging capabilities.

In some embodiments, the wavelength of the incident light from the illuminators may be at least in the ultraviolet range. In some embodiments, the wavelength of the incident light from the illuminators may define a peak in the ultraviolet range. In some embodiments, the wavelength of the incident light from the illuminators may be in both the visible and the ultraviolet range. In some embodiments, the wavelength of the incident light from the illuminators may correspond to both natural light and ultraviolet light. In some embodiments, the wavelength of the fluorescent electromagnetic energy emitted by the excited fluorescence based indicator in response to the incident light may be at least in the ultraviolet range. In some embodiments, the wavelength of the fluorescent electromagnetic energy emitted by the excited fluorescence based indicator in response to the incident light may be at least in the visible spectrum. In some embodiments, the wavelength of the fluorescent electromagnetic energy emitted by the excited fluorescence based indicator in response to the incident light may be at least in blue or violet range. In some embodiments, the wavelength of the incident light may be in the ultraviolet range and the fluorescent electromagnetic energy emitted by the excited fluorescence-based indicator may be in the visible range. In some embodiments, the wavelength of the fluorescent electromagnetic energy emitted from the excited fluorescence-based indicator may be greater than the wavelength of the incident light from the illuminators. In an example embodiment, tests determined that the incident light emitted from the illuminators cause a desired fluorescence when the incident light is in the ultraviolet range with both exclusively ultraviolet and combination visible and ultraviolet light. In an embodiment, the illuminators 215 have a band pass filter that allows light to pass at a first wavelength and the imaging devices 210 have a band pass filter that allows light pass at a second wavelength distinct from the first wavelength. In an embodiment the first wavelength is less than 400 nm and the second wavelength is more than 400 nm.

The computing apparatus 220 may control and receive data from the imaging devices 210 and illuminators 215. In some embodiments, the computing apparatus 220 may be configured to use a vision inspection engine 504 provided with image processing and detection algorithms to accomplish the automated inspection of vacuum packaged products for vacuum tightness. In some embodiments, supervised and unsupervised learning algorithms can be used for image processing and fault detection, i.e., detection of gas between film and product. In some embodiments, multiple production lines or multiple production facilities may use the same computing apparatus 220 (e.g., a server) to perform computations on each line.

Example System Architecture

In some embodiments, one or more computing systems, such as the computing apparatus 220, may be used control the imaging devices 210, illumination 215, and overall vision system 225 of the gas-detecting apparatus 200 (shown in FIG. 3). In some embodiments, one or more computing systems, such as the computing apparatus 220, may control or direct other computing systems to control other functions within the packaging environment, such as in-line conveyor and materials handling devices.

As illustrated in FIG. 4A, the computing apparatus 220 may include a processor 250, a memory 252, input/output circuitry 254, communications circuitry 256, vision inspection circuitry 258, and acquisition circuitry 260, and may be configured to execute the functions described herein. In some embodiments, the processor 250 (and/or co-processor or any other processing circuitry assisting or otherwise associated with the processor) may be in communication with the memory 252 via a bus 262 for passing information among components of the apparatus. In some embodiments, the computing apparatus 220 may be a distributed system of computing components and/or a remotely located computing device. In some embodiments, the computing apparatus 220 may be local. The memory 252 may be non-transitory and may include, for example, one or more volatile and/or non-volatile memories. In other words, for example, the memory may be an electronic storage device (e.g., a computer readable storage medium). The memory may be configured to store information, data, content, applications, instructions, or the like, for enabling the apparatus to carry out various functions in accordance with any example embodiment of the present invention.

The processor 250 may be embodied in a number of different ways and may, for example include one or more processing devices configured to perform independently. Additionally or alternatively, the processor may include one or more processors configured in tandem via a bus to enable independent execution of instructions, pipelining, and/or multithreading.

In an example embodiment, the processor 250 may be configured to execute instructions stored in the memory 252 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 225 may include input/output circuitry 254 that may, in turn, be in communication with processor 250 to provide output to the user and, in some embodiments, to receive an indication of a user input. The input/output circuitry 254 may comprise a user interface and may include a display and may comprise a web user interface, a mobile application, a client device, a kiosk, or the like. In some embodiments, the input/output circuitry 254 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 252, and/or the like).

Meanwhile, the communications circuitry 256 may be any means such as a device or circuitry embodied in either hardware or a combination of hardware and software that is configured to receive and/or transmit data from/to a network and/or any other device or module in communication with the computing apparatus 220. In this regard, the communication circuitry may include, for example, one or more cables (e.g., USB cable) connecting the imaging device(s) 210 and illuminator(s) 215 to the apparatus 225 for use with the software and hardware configurations described herein. In some embodiments, the communications circuitry 256 may include, for example, an antenna (or multiple antennas) and supporting hardware and/or software for enabling communications with a wireless communication network or one or more wireless devices. Additionally or alternatively, the communication interface may include the circuitry for interacting with the cable(s) and/or antenna(s) to cause transmission of signals via the cable(s) and/or antenna(s) or to handle receipt of signals received via the cable(s) and/or antenna(s). In some environments, the communication interface may additionally or alternatively support wired communication with a network (e.g., Ethernet). As such, for example, the communication interface may include a communication modem and/or other hardware/software for supporting communication via cable, digital subscriber line (DSL), universal serial bus (USB), or other mechanisms.

The acquisition circuitry 258 may be used to buffer the series of images and data captured at the imaging device (e.g., camera(s) 210). In some embodiments, the imaging device(s) 210 may capture raw data incident one or more surfaces within the imaging device (e.g., on one or more substrates of an image sensor). The imaging device(s) 210 may convert the raw data into computer-readable image data via one or more circuitries, and may transmit the image data to the acquisition circuitry 258. In some embodiments, image data may include any sensor data corresponding to a wavelength and/or intensity of electromagnetic energy used to detect a leak in a packaged product. Image data may include individual images; sequences of images; videos; and the like. The acquisition circuitry 258 may further control the imaging device(s) 210 and illuminator(s) 215 to trigger and time the respective illumination of the packaged product and capture of the raw data according to any embodiments of the present invention. In some embodiments, the image data may be captured through any of the means for generating image data disclosed herein, which includes, but is not limited to, any of the imaging devices (e.g., cameras, sensors, etc.) disclosed herein in both manual, autonomous, and partly-manual and partly-autonomous forms of operation.

The vision inspection circuitry 260 may be used to facilitate processing and analysis the image data received from the acquisition circuitry 258. The vision inspection circuitry 260 may further trigger an alert or other downstream notifications or actions based on the result of the processing and analysis. The vision inspection circuitry may further connect to one or more remote servers for data mining and storage (e.g., to access models and data from which to train new models). In some embodiments, the vision system 225 and vision inspection circuitry 260 may comprise a single computing apparatus or may comprise multiple apparatus connected locally or interacting over a wired and/or wireless network.

In some embodiments, the vision system 225 may include an operator user interface (e.g., as part of input/output circuitry 254. Defect data (e.g., from the vision inspection circuitry 260) may be displayed on the interface and archived either locally or remotely (e.g., via a local connection or networked connection) in a database. Defect data and images may be displayed real time on the interface. Instantaneous, historical, and statistical data may also be viewed on-demand on the interface in some embodiments. The computing apparatus 220 can be setup to selectively detect and accurately classify defects in the packaged product, including detection of the excited fluorescence-based indicator indicative of gas trapped within the packaging article.

Images of each defect can be classified, stored, displayed, and compared with prior and future images of other defects. The computing apparatus 220 may capture high-resolution images of each defect in real time. Discrete defect information such as individual defect geometric information and statistics of group defects can be provided for instantaneous decision-making and actions regarding process improvement and monitoring such as defect alarming. In some embodiments, each potential defect may be shown to an operator for a manual decision for how to handle the defective packaged product. In some embodiments, the screening, flagging, and/or separation of defective packaged products may be done partly or wholly automatically. Human operators may, in some instances, double check the work of an otherwise automatic system.

Various outputs for marking/flagging, alarming, and autonomy can be set for different defect severity levels. Data can be exported, for example, to MS Excel and/or a SQL database located anywhere on a network, with data mining software allowing various reports to be easily generated automatically and/or on-demand. Defect data may be processed on a processing unit such as a digital processing board. Flagging can be used in conjunction with separating and/or discarding packaged products with damaged film or film with damage above a predetermined threshold. Flagging can be carried by applying a label to the film at (or corresponding with) the location of the defect in the film for manual or automatic separation (e.g., with the robotic pack-off described above). In some embodiments, defective packages (e.g., packaged products showing a leak or low-vac condition) may be unpackaged and repackaged with a new packaging article and a new vacuum sealing process.

In an embodiment, the input/output circuitry 254 may allow for external signal inputs such as new roll or new production run indication and pause inspection indication. Outputs for alarms on user-defined defect alarm criteria are also handled through the input/output circuitry 254 (e.g., the user interface). Outputs can also be initiated to control downstream flagging or marking devices. Alarms can be activated for defects of different pre-defined seventies or criteria. Alarm and defect information from the computing apparatus 220 can be sent via OPC (i.e., software interface standard) to the plant network, programmable logic controller (PLC), or supervisory control and data acquisition/human machine interface (SCADA/HMI).

In an embodiment, an encoder (not shown) may be used to measure the conveyor 205 speed so that the location of a detected defective packaged product is ascertainable. A series of pulses from the encoder is received by the system and counted. The count is sent to the processor 250 to determine the distance down the conveyor 250 at which the detected defective packaged product is located, and may be used to time operation of a defect separator to remove the defective packaged product from the line.

With reference to FIG. 4B, an example distributed system is shown in accordance with some embodiments discussed herein. In the depicted embodiment an image sensor system 264 (e.g., including imaging device(s) 210 and illuminator (s) 215) is connected to a first computing apparatus 270. The first computing apparatus 270 is connected to a network 272 and a second computing apparatus 274 via the network. In some embodiments, the network 272 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, network 272 may include a cellular telephone, an 802.11, 802.16, 802.20, and/or WiMax network. Further, the network 272 may include a public network, such as the Internet, a private network, such as an intranet, or combinations thereof, and may utilize a variety of networking protocols now available or later developed including, but not limited to TCP/IP based networking protocols.

In some embodiments, the first computing apparatus 270 and second computing apparatus 274 may collectively include the features of the computing apparatus 220 described herein. In some embodiments, any number of computing apparatuses may make up the computing apparatus 220. For example, in some embodiments, the first computing apparatus 270 may include the acquisition circuitry 258 and/or vision inspection circuitry 260 shown in FIG. 4A, and the second computing apparatus 274 may include the process generation circuitry 266 and the data collection circuitry 268 shown in FIG. 4A. In some embodiments, each computing apparatus may include a processor 250, memory 252, input/output circuitry 254, communications circuitry 256, and/or bus 262 as described herein.

Example Detection Models and Algorithms

In some embodiments, various algorithms, models, and processes may be implemented to detect defects in the packaged product. Each of the algorithms, models, and processes may be configured to locate and identify an area of excited fluorescence-based indicator on the packaged product. In some embodiments, a trained model may be implemented (e.g., as shown in FIG. 5A), while in other embodiments, an algorithmic approach may be used to detect gas within a packaged product based on received sensor information (e.g., as shown in FIG. 5B). The processes disclosed herein (e.g., algorithmic solutions, model-based solutions, etc.) may receive image data in one or more states of processing and pre-processing; may further process, sort, classify, and analyze the image data; and may identify gas present in the packaging article based thereon. In some embodiments, as discussed herein, a manipulator may be used to artificially increase the speed of any existing leaks and may move gas within the packaging article to a location on the packaging article that the gas is more easily detectable to improve the accuracy and precision of the detection processes discussed herein. The packaged product may be manipulated prior to or concurrent with the capture of image data. In some embodiments, any means for determining whether the fluorescent electromagnetic energy emitted by the excited fluorescence-based indicator is indicative of gas within the packaging article may be used, including, but not limited to, the computing apparatuses, algorithms, and models described herein, other imaging or sensing technology capable of detecting the fluorescence, or manual observation of a captured image and/or manual capture of an image and analysis thereof.

FIG. 5A illustrates a flow diagram of a model-based process 500 (depicted as a functional block diagram) for assessing whether a vacuum packaged product has gas (e.g., air) between the film and the product. The process 500 may be embodied in and executed by, for example, the gas-detecting apparatus 200 shown in FIG. 3 and the vision system 225 including the image sensor system 264 and the computing apparatus 220 shown in FIGS. 4A-4B. As depicted, the system may include one or more imaging devices 210, a data acquisition system 502 (e.g., utilizing the computing apparatus 220 and acquisition circuitry 258 shown in FIG. 4A), a vision inspection engine 504 (e.g., utilizing the computing apparatus 220 shown in FIGS. 4A-4B and vision inspection circuitry 260 shown in FIG. 4A), an in-line action system 506, a database management system 508, a data collecting system 510 (e.g., utilizing the computing apparatus 220 shown in FIGS. 4A-4B and data collection circuitry 268), and a model generator 520 (e.g., utilizing the computing apparatus 220 shown in FIGS. 4A-4B and process generation circuitry 266 shown in FIG. 4A). FIG. 5A shows an example flow diagram for executing a process 500 described in connection with the present invention according to some embodiments.

In the depicted embodiment, using an appropriate combination of an imaging device (e.g., including lens and/or sensor choice) and lighting (e.g., via illuminators 215), a series of images are acquired and fed into the acquisition system 502 where the data is acquired, buffered, and transferred to one of the vision inspection engine 504 or data collecting system 510. The depicted embodiment of FIG. 5A includes two example use cases, a model generation workflow and a model application workflow.

In a model generation workflow, the process 500 may generate a model from a plurality of images. Images may be captured by the imaging device(s) 210 and received by the acquisition system 502. The acquisition system may include an image acquisition engine 540, acquisition routine 542, memory buffer 544, and workspace 546. The acquisition system 502 may buffer the image and transmit the image to the data collecting system 510, which may label 512 the images (e.g., good/sufficient vacuum or bad/gas present) and store the images 514. In some embodiments, the model generation workflow may retrieve images directly from storage 514 or the images (e.g., a training set) may be loaded into the system separately (e.g., via communications circuitry 256 shown in FIG. 4A).

The images may be labeled 512 using any process described herein. For example, a user may input a label into the system in association with each image. In some embodiments, the packaged product may include a tag or label that identifies the characteristics of the packaged product to the user or to the vision system 225 for association with the respective images of the product. In some embodiments, a training set may be pre-loaded with labels.

From the data collecting system 510, the labeled images may be input to the model generator 520 to generate one or more models, which may receive the images in a first step 521 by receiving the labeled images in an image database 522 and initializing the images 523 for use in the model generator. The initialized images may then be passed into image analysis 524 where the images may be pre-processed 525 and may be analyzed 526. The model generation 527 may then be performed to create multiple models 528 based on the analyzed images using the training process described herein, and the models may be tested and a preferred model selected 529 in some embodiments based on the accuracy of its predictions in the test data.

Once the model is created and selected in the model generator 520, the model may be deployed to the vision inspection engine 504 in a model application workflow. In the model application workflow, an image may be captured by the imaging device(s) 210 and fed into the acquisition system 502 where the data is acquired, buffered, and transferred to the vision inspection engine 504. In the vision inspection engine 504, the model may be applied to an unknown image to classify the image (e.g., good/sufficient vacuum or bad/gas present) based on the trained model developed by the model generator 520 in the model generation workflow. The process may include initializing the model 532, the image may be input into the decision function 534 to receive a decision at the detection model output 536.

The detection results 538 may be fed into the in-line action system 506 to set up pre-determined alarms, film flagging, displaying an image of gas between the packaging article and the product (e.g., via the user interface), displaying data pertaining to one or more defects including displaying data related to geometric characteristics of the gas-filled area, location of the defect, degree of occurrence of defects; severity of defects, generating a report of defect data and/or any other desired output. Data pertaining to defects can be displayed instantaneously and online, or after production is complete (i.e., offline or not-on-the-fly), the data being accessible in an offline database management system 508. Using data mining, the data can be manipulated, visualized, and organized into any on-demand report forms desired.

The detection results may further be transferred from the vision inspection engine 504 to the data collecting system 510 as labeled images to be stored in image storage 514 and used in subsequent model generation processes to recursively improve the models' accuracy.

The data processing software and hardware may be set up to accommodate different concentration levels with minimum need for on-the-fly adjustment of parameters such as exposure time and light intensity. In some embodiments, portions of the process 500 may be done offline or remotely. For example, the data collecting system 510 and/or model generator 520 may be remotely located from the remainder of the process (e.g., performed on a server). Moreover, some or all of the vision inspection process may occur remotely.

Turning to FIG. 5B, an example flow diagram of an algorithmic process 550 is shown (depicted as a functional block diagram) for assessing whether a vacuum packaged product has gas (e.g., air) between the film and the product. The process 550 may be embodied in and executed by, for example, the gas-detecting apparatus 200 shown in FIG. 3 and the vision system 225 including the image sensor system 264 and the computing apparatus 220 shown in FIGS. 4A-4B. As depicted, the system may include one or more imaging devices 210, a data acquisition system 502 (e.g., utilizing the computing apparatus 220 shown in FIGS. 4A-4B and acquisition circuitry 258 shown in FIG. 4A), a vision inspection engine 504 (e.g., utilizing the computing apparatus 220 shown in FIGS. 4A-4B and vision inspection circuitry 260 shown in FIG. 4A), an in-line action system 506, a database management system 508, a data collecting system 510 (e.g., utilizing the computing apparatus 220 shown in FIGS. 4A-4B and data collection circuitry 268), and an inference engine 560 (e.g., utilizing the computing apparatus 220 shown in FIGS. 4A-4B and process generation circuitry 266 shown in FIG. 4A). FIG. 5B shows an example flow diagram for executing a process 550 described in connection with the present invention according to some embodiments.

In the depicted embodiment, using an appropriate combination of an imaging device (e.g., including lens and/or sensor choice) and lighting (e.g., via illuminators 215), a series of images are acquired and fed into the acquisition system 502 where the data is acquired, buffered, and transferred to one of the vision inspection engine 504 or data collecting system 510. The depicted embodiment of FIG. 5B includes two example use cases, an algorithm generation workflow and an algorithm application workflow.

In an algorithm generation workflow, the process 500 may generate an algorithm from a plurality of images. Images may be captured by the imaging device(s) 210 and received by the acquisition system 502. The acquisition system may include an image acquisition engine 540, acquisition routine 542, memory buffer 544, and workspace 546. The acquisition system 502 may buffer the image and transmit the image to the data collecting system 510, which may label 512 the images (e.g., good/sufficient vacuum or bad/gas present) and store the images 514. In some embodiments, the algorithm generation workflow may retrieve images directly from storage 514 or the images (e.g., a test set of images) may be loaded into the system separately (e.g., via communications circuitry 256 shown in FIG. 4A).

The images may be labeled 512 using any process described herein. For example, a user may input a label into the system in association with each image. In some embodiments, the packaged product may include a tag or label that identifies the characteristics of the packaged product to the user or to the vision system 225 for association with the respective images of the product. In some embodiments, a training set may be pre-loaded with labels.

From the data collecting system 510, the labeled images may be input to the inference engine 560 to generate and identify one or more algorithms that may receive the images in a first step 561 by receiving the labeled images in an image database 562 and initializing the images 563 for use in the inference engine. The initialized images may then be passed into image analysis 564 where the images may be pre-processed 565 and may be analyzed 566. The algorithm determination 567 may then be performed to create one or more algorithms 568 based on the analyzed images using the process described herein, and the algorithms may be tested and a preferred algorithm selected 569 in some embodiments based on the accuracy of its predictions in the test data. In some embodiments, one hundred test images may be used. In some embodiments, one thousand test images may be used. In some embodiments, a user may manually identify desired features in the images and/or image processing parameters to identify the features during or before algorithm generation. In some embodiments, the system may partly or fully autonomously process the images and/or detect desired features in the image using the techniques described herein.

Once the algorithm is created and selected in the inference engine 560, the algorithm may be deployed to the vision inspection engine 504 in an algorithm application workflow. In the algorithm application workflow, an image may be captured by the imaging device(s) 210 and fed into the acquisition system 502 where the data is acquired, buffered, and transferred to the vision inspection engine 504. In the vision inspection engine 504, the algorithm may be applied to the unknown (e.g., unlabeled) image to classify the image (e.g., good/sufficient vacuum or bad/gas present) based on the algorithm selected in the inference engine 560 in the algorithm generation workflow. The process may include initializing the algorithm 572, the image may be input into the decision function 574 to receive a decision at the detection algorithm output 576.

The detection results 578 may be fed into the in-line action system 506 to set up pre-determined alarms, film flagging, displaying an image of gas between the packaging article and the product (e.g., via the user interface), displaying data pertaining to one or more defects including displaying data related to geometric characteristics of the gas-filled area, location of the defect, degree of occurrence of defects; severity of defects, generating a report of defect data and/or any other desired output. Data pertaining to defects can be displayed instantaneously and online, or after production is complete (i.e., offline or not-on-the-fly), the data being accessible in an offline database management system 508. Using data mining, the data can be manipulated, visualized, and organized into any on-demand report forms desired.

The detection results may further be transferred from the vision inspection engine 504 to the data collecting system 510 as labeled images to be stored in image storage 514 and used in subsequent algorithm generation processes to improve the algorithms' accuracy. In some embodiments, the image analysis and algorithm generation in the inference engine 560 may be performed autonomously. In some embodiments, the image analysis and algorithm generation in the inference engine 560 may be performed partly manually. In some embodiments, the image analysis and algorithm generation in the inference engine 560 may be performed manually.

The data processing software and hardware may be set up to accommodate different concentration levels with minimum need for on-the-fly adjustment of parameters such as exposure time and light intensity. In some embodiments, portions of the process 550 may be done offline or remotely. For example, the data collecting system 510 and/or inference engine 560 may be remotely located from the remainder of the process (e.g., performed on a server). Moreover, some or all of the vision inspection process may occur remotely.

In some example embodiments, an algorithmic process may be used to detect the excited fluorescence-based indicator and identify gas in the packaged product. For example, in some embodiments, a feature-extraction based algorithm may be used to detect portions of the packaged products exhibiting excited fluorescence above a predetermined threshold intensity or at a predetermined wavelength or change in wavelength from the incident light. In some embodiments, Dark Feature Detection may be used to identify dark spots and light spots in the captured image data, which may separate areas of low fluorescence from areas of high fluorescence, with the high fluorescence areas indicating a likelihood of a leak. In some embodiments, Light Feature Detection may be used in a similar manner to Dark Feature Detection. In some embodiments, Dark Feature Detection and Light Feature Detection may be calculated based on grey scale value thresholds of the image data.

In some embodiments, feature extraction may include extracting one or more textures of the image. The image textures may be compared to reference images for one or more products to identify a leak. For example, a ham product may have a checkered surface texture which fluoresces with a checkered pattern. The checkered pattern of excited fluorescence-based indicator at a predetermined intensity or wavelength may be determined by the computing apparatus (e.g., computing apparatus 220) to indicate a leak. In some embodiments, feature extraction may further be used to exclude undesired areas such as background or an area around the seal. For example, in some embodiments, the seal of the packaging article may have an inconsistent texture or thickness, which may produce a bright spot on the captured images. In some embodiments, the bright spot caused by the seal may be excluded from the algorithm.

In some embodiments, the algorithmic process may comprise Streak Detection. The Streak Detection may be based on extracted geometry features in the captured images.

With reference to FIG. 6, in an example embodiment, the algorithm 600 (e.g., an algorithm generated by the inference engine 560) and associated image processing may comprise the following steps: (1) capture an image 602; (2) apply de-noising to the image 604; (3) convert the image to greyscale 606; (4) apply thresholding to reduce the section of the image for consideration 608; (5) eliminate undesired areas of the image (e.g., areas of higher or lower than expected fluorescence, such as background or the seal) 610; and (6) identify features in the remaining image corresponding to gas within the packaging article 612. In some embodiments, the algorithm 600 may further include classifying an image based on the detected features 614. In some embodiments, some steps of the aforementioned algorithm may be eliminated so long as the fluorescing areas of gas in the packaged product are identified.

As noted above, in some embodiments, a trained model (e.g., detection model shown in FIG. 5A) may be developed to classify image data of vacuum-packaged products (e.g., trained using the model generator 520 shown in FIG. 5A). Depicted in FIG. 7 is an embodiment of a method 700 of developing a trained image classification model. At block 702, training image data of vacuum-packaged products is obtained. In some embodiments, the training image data includes images and/or video (i.e., a sequence of images) of vacuum-packaged products having a known state. In some embodiments, the vision system 225 used to obtain the training image data is the same as the vision system 225 that will be used to obtain image data of vacuum-packaged products of unknown state after the trained image classification model is created (e.g., the vision system in the final production line). In some embodiments, a test bed or other experimental configuration may be used to obtain the training image data.

At block 704, the training image data is manually labeled with the states of the vacuum-packaged products in the training image data. For example, a user can manually input a state (e.g., the vacuum-packaged product is defective, is non-defective, or has a particular defect) for each image and/or video of a vacuum-packaged product in the image data. Manually labeling the image data may include physically testing the vacuum-packaged products to determine whether individual vacuum-packaged products are vacuum-sealed or defective and then applying a label to the image data based on the results of the physical testing. The training samples may include a plurality of vacuum-sealed packaged products and a plurality of defective packaged products (e.g., packaged products having a leak or low-vac condition). In some embodiments, the number of vacuum-packaged products represented in the training image data is in a range of tens of vacuum-packaged products, hundreds of vacuum-packaged products, thousands of vacuum-packaged products, or more. At these numbers, the manual labeling process of the training image data may be a labor- and time-intensive process. At block 706, the labeled training image date is input into a training module.

In some embodiments, the training model is a machine learning module, such as a "deep learning" module. Deep learning is a subset of machine learning that generates models based on training data sets provided to it. In some embodiments, the training model may use unsupervised learning techniques including clustering, anomaly detection, Hebbian Learning, as well as learning latent variable models such as Expectation-maximization algorithm, method of moments (mean, covariance), and Blind signal separation techniques, which include principal component analysis, independent component analysis, non-negative matrix factorization, and singular value decomposition. In one example, unsupervised learning techniques were utilized in combination with several image pre-/post-processing techniques including imaging texture analysis (e.g., calculating Leaker Detection Index values) to achieve detection and classification. In another embodiment, the unsupervised learning technique Anomaly Detection was utilized in combination with several image pre-/post-processing techniques including imaging texture analysis (e.g., calculating low-vac detection index values) to achieve detection and classification.

At block 708, the trained model is developed to classify vacuum-packaged products. In some embodiments, as the trained model is developed, one or more learning algorithms are used to create the trained model based on the labeled states of the vacuum-packaged products in the training image data. In some embodiments, the trained model is created based on one or more input vectors which are indicative of a characteristic of the vacuum-packaged products. In one example, the input vector may be the "looseness" of the packaging article on the vacuum-packaged product (e.g., wrinkles in the surface of the packaging), with looser vacuum-packaged products defined as defective. In one example, the looseness above a particular threshold may indicate a loss of vacuum within the packaging article. In another example, the input vectors may be the properties of the fluorescent electromagnetic energy emitted by the excited fluorescence-based indicator in the film in accordance with the particular indicator and illumination used, as described above. For example, the input vectors may include one or more of a wavelength of the fluorescent electromagnetic energy emitted by the excited fluorescence-based indicator; an intensity of the fluorescent electromagnetic energy emitted by the excited fluorescence-based indicator; and/or a change in wavelength of the fluorescent electromagnetic energy emitted by the excited fluorescence-based indicator compared to the incident electromagnetic energy from the illuminators. In some embodiment, the input vectors may correspond to a wavelength of the fluorescent electromagnetic energy emitted by the excited fluorescence-based indicator being one or more colors in the visible spectrum, detection of an additive in a film of the vacuum-packaged product using a non-visible electromagnetic energy (e.g., ultraviolet, infrared), the presence and numbers of film folds, or any other number of possible input vectors. In an embodiment the illuminators (e.g., illuminators 215) can be an ultraviolet backlight with software for controlling shutter speed and light intensity. In some embodiments, the wavelength of the fluorescent electromagnetic energy emitted by the excited fluorescence based indicator may be at least in the ultraviolet range. In some embodiments, the wavelength of the fluorescent electromagnetic energy emitted by the excited fluorescence based indicator may be at least in the visible spectrum. In some embodiments, the wavelength of the fluorescent electromagnetic energy emitted by the excited fluorescence based indicator may be at least in blue or violet range. In some embodiments, the wavelength of the incident light from the illuminators may be at least in the ultraviolet range. In some embodiments, the wavelength of the incident light from the illuminators may define a peak in the ultraviolet range. In some embodiments, the wavelength of the incident light may be in the ultraviolet range and the fluorescent electromagnetic energy emitted by the excited fluorescence-based indicator may be in the visible range. In embodiments in which the process is designed to simultaneously inspect multiple film layers at the same time for the same film, multiple illuminators 215 and/or multiple imaging devices 210 can be used with one or more controls for shutter speed and light intensity.

The use of input vectors for training may help the trained model identify defective vacuum-packaged products without identifying the underlying cause. For example, a vacuum-packaged product may have a small pinhole that would be difficult to detect using image data captured as the vacuum-packaged product is being moved on a transportation system (e.g., conveyor 205). The use of the input vectors and the fluorescence-based indicator detailed herein allows the trained model to detect that the vacuum-packaged product is defective without the need to identify the small pinhole or other defect itself. After the input vectors are modeled, a trained model can be developed as a decision-making process based on a number of the input vectors. Examples of decision-making processes include decision trees, neural networks, and the like. In some embodiments, the decision-making process of the trained model is based on a determination of an acceptable arrangement of the input vectors in the decision-making process.

The result of the development of the trained model in block 708 is the trained model depicted at block 710. The trained model can be used during normal operation (e.g., operation that is not used to train to the trained model) to identify states of vacuum-packaged products. In some embodiments, the trained model includes a neural network that has a number of layers. Depicted in FIG. 8 is an example of a neural network 800 that is a multilayer neural network. In the depicted embodiment, the neural network 800 includes a first layer 802 with three input nodes, a second layer 804 with five hidden nodes, a third layer 806 with four hidden nodes, a fourth layer 808 with four hidden nodes, and a fifth layer 810 with one output node.

The neural network 800 also includes a first set of connections 812 between each pair of the three input nodes in the first layer 802 and the five input nodes in the second layer 804, a second set of connections 814 between each pair of the five input nodes in the second layer 804 and the four hidden nodes in the third layer 806, a third set of connections 816 between each pair of the four hidden nodes in the third layer 806 and the four hidden nodes in the fourth layer 808, and a fourth set of connections 818 between each pair of the four hidden nodes in fourth layer 808 and the output node in the fifth layer 810. In some embodiments, the input nodes represent inputs into the trained models (e.g., image data, metadata associated with the image data, etc.), one or more of the hidden nodes (e.g., one of the layers of hidden nodes) may represent one of the input vectors determined during the development of the model, and the output node represents the determined state of the vacuum-packaged product.

Depicted in FIG. 9 is an embodiment of a method 900 of using a trained image classification model to classify a state (e.g., leaking or sealed, low-vac or vacuum) of a vacuum-packaged product. At block 902, image data of the vacuum-packaged product is acquired (e.g., by imaging device(s) 210 shown in FIG. 3). The image data of the vacuum-packaged product may be obtained by a vision system, such as the vision system 225 shown in gas-detecting apparatus 200 in FIG. 3. In some embodiments, the image data of the vacuum-packaged product is obtained while the vacuum-packaged product is being transported by a transport system (e.g., conveyor 205).

At block 904, the image data of the vacuum-packaged product is input into a trained image classification model. The trained image classification model may be operating on a computing device, such as a local computing device (e.g., computing apparatus 220) at the vision system 225 or a remote computing device from the local computing device. The trained image classification model is configured to classify a state of the vacuum-packaged product based on the image data. At block 906, a classification of a state of the vacuum-packaged product is received from the trained image classification model. In some embodiments, the classified state includes an indication that a vacuum-packaged product is defective, is non-defective, or has a particular defect, and/or an indication of a degree of certainty as to whether the vacuum-packaged product is defective, is non-defective, or has a particular defect. In some embodiments, the classified state is received by one or more of displaying the classification on a user interface output device, communicating the classification via a communication interface to one or more external devices, or storing the classification in a database. In some embodiments, the received classification the vacuum-packaged product includes one or more of the classified state or the vacuum-packaged product or a degree of certainty of the classified state of the classified state or the vacuum-packaged product. In one specific example, the state is communicated to a routing system (e.g., pack-off apparatus 300) that is configured to route vacuum-packaged products on a transportation system (e.g., conveyor 205) based on their states, such as routing defective packages to a location for repackaging and/or waste disposal.

As noted above, the method 700 is used to obtain the trained classification model at block 710 and then the trained classification model can be used in method 900 to classify vacuum-packaged products. In some embodiments, the training image data acquired at block 702 is image data of a particular type of vacuum-packaged products and the image data acquired at block 902 is image data of the same type of vacuum-packaged products. In one example, the training image data acquired at block 702 is image data of the vacuum-packaged products and the image data acquired at block 902 is image data of the same type of vacuum-packaged products as the vacuum-packaged products. In some embodiments, the training image data acquired at block 702 is image data of a particular type of vacuum-packaged products and the image data acquired at block 902 is image data of a different type of vacuum-packaged products. In one example, the training image data acquired at block 702 is image data of one type of vacuum-packaged products (e.g., ham) and the image data acquired at block 902 is image data of another type of vacuum-packaged products (e.g., turkey). Even though the vacuum-packaged products imaged in-line may be a different type from the vacuum-packaged products used in the training set, the trained classification model using the training image data from the training vacuum-packaged products may be able to classify states of the production vacuum-packaged products with sufficient accuracy.

Depicted in FIG. 10 is an embodiment of a method 1000 of developing a trained image classification model. At block 1002, training image data is acquired for a number of vacuum-packaged products. At block 1004, the training image data is manually labeled as defective or non-defective. The manual labeling of the training image data may be done by a user entering an indication of defective or non-defective for each of the vacuum-packaged products represented in the training image data into a user interface input device of a computing apparatus. In some embodiments, the training vacuum-packaged products may be labeled with their respective status (e.g., defective or non-defective).

At block 1006, model information, training objectives, and constraints are initialized. In some examples, model information includes a type of model to be used, such as a neural network, a number of input vectors, and the like. In some examples, training objectives can include a desired or expected performance of the trained model, such as an accuracy rate of greater than or equal to a predetermined rate (e.g., greater than or equal to one or more of 90%, 95%, 96%, 97%, 98%, or 99%). In some examples, constraints can include limitations of the trained model, such as a minimum number of layers of a neural network, a maximum number of layers of a neural network, a minimum weighting of input vectors, a maximum weighting of input vectors, or any other constraints of a trained model. At block 1008, the model can be trained using the model information and the model constraints. In some embodiments, the training image data is separated into two subsets—a training subset and a validation subset—and the training of the model at block 1008 includes training the model using the training subset of the image data.

At block 1010, a determination is made whether the training objective is met. In some embodiments, the determination at block 1010 is made by comparing the results of the trained model to the training objective initialized at block 1006. In some embodiments, where the training image data is separated into the training subset and the validation subset, the determination at block 1010 includes testing the model trained at block 1008 using the validation subset of the image data. If, at block 1010, a determination is made that the training objective is not met, then the method 1000 proceeds to block 1012 where the training objective and/or the constraints are updated. After the training objective and/or the constraints are updated at block 1012, the method 1000 returns to block 1008 where the model is trained using the updated training objective and/or constraints. If, at block 1010, a determination is made that the training objective is met, then the method 1000 proceeds to block 1014 where the trained model is stored. Storing the trained model may include storing the trained model in one or more memories in a computing device (e.g., a local computing device, a remote computing device, etc.).

In some embodiments, a vision system (e.g., vision system 225) may be used both to train a model to classify states of vacuum-packaged products and to apply the trained model to classify states of vacuum-packaged products. Depicted in FIG. 11 is an embodiment of a method 1100 for a vision inspection engine to both train a model to classify states of vacuum-packaged products and apply the trained model to classify states of vacuum-packaged products. In some embodiments, the vision system includes an image sensor system and a computing apparatus (e.g., image sensor system 264 and computing apparatus 220 shown in FIGS. 4A-4B) which may define a vision inspection engine 504 and an acquisition system 502. In those embodiments, the model may operate on the computing apparatus 220 while the image sensor system 264 obtains image data of vacuum-packaged products either for training or applying the model.

At block 1102, the vision system 225 and the classification model are initialized. In some embodiments, initialization of the vision system 225 includes initializing a computing apparatus 220 and initializing an image sensor system 264, and initialization of the classification model includes loading launching software that includes the classification model on the computing apparatus. At block 1104, the image data of a vacuum-packaged product is acquired (e.g., by image sensor system 264 and acquisition system 502). In some embodiments, the image sensor system 264 acquires the image data of the vacuum-packaged product and provides the image data to the computing apparatus 220. At block 1106, a determination is made whether the classification model is in training mode. The determination may be made by the software operating on the computing system that includes the classification model.

If, at block 1106, a determination is made that the classification model is in training mode, then the model passes to block 1108, where a determination is made if a state is available for the vacuum-packaged product. A state may be available for a vacuum-packaged product when a user manually enters a state for the vacuum-packaged product into a computing device or scans a state of the vacuum-packaged product (e.g., from a bar code on the training packaged products). If, at block 1108, a determination is made that a state is available, then the method proceeds to block 1110. At block 1110, the classification model is updated based on the image data and the state for the vacuum-packaged product. Updating the classification model can include any of the methods described herein for training and/or developing classification models. At this point, a vacuum-packaged product state (e.g., the manually-entered state) is available, as shown in block 1112. However, if, at block 1106, a determination is made that the classification model is not in training mode or if, at block 1108, a determination is made that a state is not available, then the method proceeds to block 1114.

At block 1114, the classification model classifies a state of the vacuum-packaged product. In some embodiments, the state of a vacuum-packaged product classified by the classification model includes a determination of whether the vacuum-packaged product is defective (e.g., leaking or low-vac), is non-defective, or has a particular defect, and an indication of a degree of certainty as to whether the vacuum-packaged product is defective, is non-defective, or has a particular defect. At block 1116, a determination is made whether a confidence level of the classified state is low. In some embodiments, the confidence level is a percentage representing the degree of certainty that the classified state of the vacuum-packaged product is accurate and confidence level is low if the degree of certainty is below a predetermined percentage of an acceptable degree of certainty. For example, if the acceptable degree of certainty is 90%, then the classified state of the vacuum-packaged product is deemed to be low if the degree of certainty of the classified state is below 90%. If, at block 1116, the confidence level is determined to not be low, then the vacuum-packaged product state has been determined, as shown at block 1118. However, if at block 1116, the confidence level is determined to be low, then the method proceeds to block 1120 where the vacuum-packaged product is set aside for off-line and/or manual classification (e.g., classification by a user after visual inspection or physical testing separate from the production line).

If a state of the vacuum-packaged product is available, either at block 1112 or at block 1118, then the method proceeds to block 1122. At block 1122, the state of the vacuum-packaged product is output. In some embodiments, outputting the state of the vacuum-packaged product includes one or more of displaying the state of the vacuum-packaged product on a user interface output device, communicating the state of the vacuum-packaged product via a communication interface to one or more external devices, or storing the state of the vacuum-packaged product in a database. In some embodiments, the state of the vacuum-packaged product includes one or more of an indication of whether the vacuum-packaged product is defective, is non-defective, or has a particular defect, or a degree of certainty of whether the vacuum-packaged product is defective, is non-defective, or has a particular defect.

Whether state of the vacuum-packaged product is output at block 1122 or the vacuum-packaged product is held for manual classification at block 1120, the method 1100 then proceeds to block 1124. At block 1124, a determination is made whether another vacuum-packaged product is available. In some embodiments, the determination at block 1124 can be based on whether another vacuum-packaged product is detected on the conveyor (e.g., via one or more sensors). In some embodiments, the determination at block 1124 can be based on whether a user inputs an indication whether another vacuum-packaged product is available. If, at block 1124, a determination is made that another vacuum-packaged product is not available, then, at block 1126, the vision system 225 and the classification model are shut down. However, if, at block 1124, a determination is made that another vacuum-packaged product is available, then the method 1100 loops back to block 1104 where image data is acquired of the next vacuum-packaged product and the method 1100 proceeds from block 1104 as described above for the next vacuum-packaged product.

As discussed above, a trained model to classify states of vacuum-packaged products from image data may include one decision-making process, such as a decision tree or a neural network. In some embodiments, a trained model to classify states of vacuum-packaged products from image data may include more than one decision-making process. Depicted in FIG. 12 is an embodiment of a method 1200 of classifying a state of a vacuum-packaged product. In the depicted embodiment, the method 1200 is performed in part by an image sensor system 1202 (e.g., image sensor system 264 shown in FIGS. 4A-4B), a detection decision-making process 1204, a classification decision-making process 1206, and an output device 1208. At block 1210, the image sensor system acquires image data of a vacuum-packaged product. In some embodiments, the image sensor system 1202 may acquire the image data as the vacuum-packaged product is being transported by a transport system. After the image data is acquired at block 1210, the image sensor system has image data 1212 that can be communicated to the detection decision-making process 1204. In some embodiments, the detection decision-making process 1204 is a software-based decision-making process operating on one or more computing devices.

At block 1214, the detection decision-making process 1204 processes the image data received from the image sensor system 1202. In some embodiments, the processing of the image data at block 1214 is performed by a trained model that has been trained to detect a region of interest associated with a vacuum-packaged product in image data. In some embodiments, the processing of the image data at block 1214 includes one or more of cropping an image in the image data around a detected vacuum-packaged product in the image, selecting a frame or a subset of frames from a video in the image data, identifying irrelevant pixels from an image in the image data and replacing the irrelevant pixels with the least significant values of the image data. In some embodiments, the processing of the image data produces a single image having a rectangular shape with the identified vacuum-packaged product substantially centered in the image and the pixels deemed to be irrelevant being replaced with the least significant values. In some embodiments, the processing of the image data can include masking a portion of an image, where areas of the image outside of a region of interest (e.g., outside of a vacuum-packaged product) are replaced with low value data (e.g., the pixels are all changed to black) to reduce the amount of processing to classify the state of the vacuum-packaged product and reduce the likelihood of error when classifying the state of the vacuum-packaged product.

In one embodiment of processing image data, a custom boundary is constructed around a representation of a vacuum-packaged product in the image data. A bounding box encompassing the vacuum-packaged product is also constructed in the custom boundary. The processing also includes cropping the bounding box from the entire image data. One advantage of cropping the image data based on the custom boundary is that the later classification of the state of the vacuum-packaged product may be limited to areas of interest without the need to inspect areas of the image data that are not of interest. This may, in turn, increase the confidence level of classification and therefore overall accuracy of the classification. In some embodiments, where the detection decision-making process 1204 is a multilayer neural network, creating the bounding box around the custom boundary simplifies compatibility requirements between the image data and the first layer of the neural network. Additionally, cropping the image data results in a portion of the image data being processed for classification, rather than the entire image data, which reduces the processing time for classification. In some embodiments, the custom boundary may help in generating a numerical value for one or more of the area of the vacuum-packaged product, its centroid, or its orientation.

At block 1216, a determination is made whether the presence of a vacuum-packaged product is detected in the image data. In some embodiments, the determination made at block 1216 is a part of the processing of the image data at block 1216. In some embodiments, the determination of whether vacuum-packaged product is detected at block 1216 is a separate process from the processing of the image data at block 1216. If, at block 1216, a determination is made that the presence of a vacuum-packaged product is not detected, then the method 1200 proceeds to block 1218 where the image data is discarded (e.g., deleted) and the method 1200 ends. However, if, at block 1216, a determination is made that the presence of a vacuum-packaged product is detected, then the processed image data represented at block 1220 can be communicated to the classification decision-making process 1206. In some embodiments, the classification decision-making process 1206 is a software-based decision-making process operating on one or more computing devices (e.g., on computing apparatus 220 in the vision inspection engine 504), which may be the same as or different from the one or more computing devices on which the detection decision-making process 1204 operates. In some embodiments, processing the image data at block 1214 to obtain the processed image data, as shown at block 1220, prior to classifying a state of the vacuum-packaged product represented in the data increases the accuracy of the later-performed classification by the classification decision-making process 1206.

At block 1222, the classification decision-making process 1206 classifies the processed image data received from the detection decision-making process 1204. In some embodiments, the classification of the image data at block 1222 is performed by a trained model that has been trained to classify a state of vacuum-packaged products represented in processed image data. In some embodiments, the classification of the state of the vacuum-packaged product represented in the processed image data at block 1222 includes a determination of whether the vacuum-packaged product is defective, is non-defective, or has a particular defect. In some embodiments, the classification of the state of the vacuum-packaged product represented in the processed image data at block 1222 includes a determination of whether the vacuum-packaged product is defective, is non-defective, or has a particular defect, and an indication of a degree of certainty as to whether the vacuum-packaged product is defective, is non-defective, or has a particular defect.

At block 1224, a determination is made whether a confidence level of the classified state is low. In some embodiments, the confidence level is a percentage representing the degree of certainty that the classified state of the vacuum-packaged product is accurate and the confidence level is low if the degree of certainty is below a predetermined percentage of an acceptable degree of certainty. For example, if the acceptable degree of certainty is 90%, then the classified state of the vacuum-packaged product is deemed to be low if the degree of certainty of the classified state is below 90%. If, at block 1224, the confidence level is determined to not be low, then the vacuum-packaged product state has been determined, as shown at block 1226. However, if at block 1224, the confidence level is determined to be low, then the method proceeds to block 1228 where the vacuum-packaged product and/or the image data is flagged for manual classification.

At block 1230, a state of the vacuum-packaged product is manually classified outside of the classification decision-making process. In some embodiments, the vacuum-packaged product is manually classified by a user after visual inspection or physical testing of the vacuum-packaged product. At block 1232, the user inputs the manually-classified state of the vacuum-packaged product to the classification decision-making process 1206. At block 1234, the classification decision-making process 1206 is updated. In embodiments where the classification decision-making process 1206 is a trained model, updating the classification decision-making process 1206 includes further training the trained model based on the manual classification. After updating the classification decision-making process 1206, the method 1100 returns to block 1226 where the classified state of the vacuum-packaged product is the manually-classified state of the vacuum-packaged product.

After the classified state of the vacuum-packaged product, as represented at block 1226, is classified or obtained by the classification decision-making process 1206, the classification decision-making process 1206 sends the classified stated of the vacuum-packaged product to the output device 1208 (e.g., input/output circuitry 254 and/or communications circuitry 256 shown in FIG. 4A). In the embodiments where the classification decision-making process 1206 is software operating on one or more computing devices, the output device 1208 can be a user interface output device. In some embodiments, the outputting the classified state of the vacuum-packaged product at block 1236 includes one or more of outputting the classified state of the vacuum-packaged product to a user via a user interface (e.g., a monitor, a touchscreen, etc.), communicating the classified state of the vacuum-packaged product to an external device via a communications circuitry, or locally storing the classified state of the vacuum-packaged product in a database.

In any of the embodiments disclosed herein, the image data received for any one vacuum-packaged product may include multiple forms of image data about the same vacuum-packaged product. For example, image data about a vacuum-packaged product may include two images in the visible light range of the same vacuum-packaged product. These multiple different forms of image data for the same vacuum-packaged product may be passed through a trained model separately. If the trained model returns the same classified state for the vacuum-packaged product using the two different forms of image data, then the confidence level of the classification for that vacuum-packaged product can be increased significantly. In one example, if the trained model classified one of the images as having a vacuum-packaged product with an imperfect seal at a 98% confidence level and classified the other image as having a vacuum-packaged product with an imperfect seal at a 96% confidence level, then the confidence level that the vacuum-packaged product has an imperfect seal may be greater than 99%. In another example, if the trained model classified one of the images as having a non-defective vacuum-packaged product at a 60% confidence level and classified the other image as having a non-defective vacuum-packaged product at a 70% confidence level, then the confidence level that the vacuum-packaged product is non-defective may be 88%. Even though the confidence level using two images may be significantly higher than either of the images alone, the combined confidence level from two images (e.g., 88%) may still be below a predetermined percentage of an acceptable degree of certainty (e.g., 95%), which may cause the vacuum-packaged product to be flagged for manual classification. In some further embodiments, multiple camera angles may be used to image the vacuum-packaged product on multiple surfaces and from multiple viewpoints (e.g., the three cameras 210 shown in FIG. 3). In some embodiments, two or more camera angles of the same vacuum-packaged product may be used. It will be apparent that the number of multiple forms of image data is not limited to two, but could be any number of forms of image data.

In some embodiments, not every area of increased or altered fluorescence is necessarily in need of detection and reporting, and a user or the computer apparatus may determine one or more thresholds to facilitate identification of gas in the packaged article. The threshold may be based on any of the parameters detailed herein and may be predetermined or applied as the result of an algorithm or model. A threshold value can be set so that only defects above the threshold size are flagged for removal. For example, the threshold can be set at a fluorescent region having a size of at least 2 millimeters in at least one direction (i.e., an altered fluorescence having a size of at least 2 millimeters in the machine direction and/or at least 2 mm in the transverse direction). Alternatively, the threshold can be set at a size of at least 1 millimeter in at least one direction, (i.e., an altered fluorescence of at least 1 millimeter in at least one direction). In some embodiments, a threshold value can be set at a predetermined surface area (e.g., an area of at least 1 $mm^2$, 2 $mm^2$, 3 $mm^2$, or 4 $mm^2$). Such a threshold can be set even if the system has the capability to see gas in the packaged product down to a size of as low as 10 microns in at least one direction. The setting of the threshold value is different from the capability of the machine vision system to detect a defect (e.g., gas in the packaged product) to at least a particular size in at least one direction. Rather, the setting of the threshold value is the setting of the minimum value of the size of the area which trigger the generation of the signal in response thereto. That threshold can be set at any desired value, and is different from the capability of the machine vision system to detect defects down to at least a specified size.

In some embodiments, the algorithmic or model-based detecting means disclosed herein may be used to detect defects in the packaging article. For example, in some embodiment, the algorithmic or model-based detecting means described herein may detect an area of high fluorescence that is higher than the majority of the seal, which may indicate a pleat or other defect in the seal. In some embodiments, the algorithmic or model-based detecting means may detect a substantially even, constant fluorescence from the seal, indicating a strong seal. In some embodiments, areas of less or no fluorescence in the region of the seal may indicate a discontinuity or weakness in the seal.

EXAMPLES

In an example embodiment, the algorithm and image processing may comprise some or all of the following steps: (1) capture an image; (2) apply de-noising to the image; (3) convert the image to greyscale; (4) apply thresholding to reduce the section of the image for consideration; (5) eliminate undesired areas of the image; (6) identify features in the remaining image corresponding to the presence of gas in the packaged product. Examples of each of these processing steps are shown and described in the following figures.

FIG. 13 is a color image 1300 of two ham products each packaged 10"×24" end-seal film packaging articles made from Film No. 1 having an indicator 1302 that is fluorescing. With reference to the left ham, a highly fluorescent area 1302 represents gas in the packaging article which shows the underlying pattern of the ham. In some embodiments, the fluorescent area 1302 may be identified as a gas by the uneven fluorescent pattern caused by the texture of the meat underneath (e.g., gas in the packaging article fills the crevices in the ham). Certain areas of the packaged product may be overexposed or may indicate high fluorescence without being defective, such as the areas around the seal 1304. These areas may have an uneven thickness of film or a wrinkled film unrelated to any leaking or defect in the packaged product. The algorithms and trained models disclosed herein may distinguish between gas-filled areas 1302 and non-defective, high-fluorescence areas (e.g., 1304), for example, because the non-defective, high fluorescence areas may have a higher and/or more uniform fluorescence than the leaking areas. Areas of the packaged product exhibiting low fluorescence (e.g., deeper blues and blacks in the color image) indicate that the film of the packaging article is against the meat.

FIG. 14 shows the image of FIG. 13 including a leaking area 1402 and the seal area 1400, with the image 1400 having undergone a de-noising process to distinguish the areas of different fluorescence and reduce the noise that the vision system must consider. In the depicted embodiment, the leaking area 1402 is caused by a puncture in the film. In one example, the de-noising process used a template window size of 7 pixels, a search window size of 21 pixels, and a filter strength of 20.

FIG. 15 shows an image 1500, including the leaking area 1502 and a seal area 1504. The image 1500 of FIG. 15 represents a greyscale version of the image 1400 of FIG. 14.

FIG. 16 shows a further processed image 1600, including the leaking area 1602 and a seal area 1604 which has undergone a thresholding process from the image in FIG. 15. In the depicted embodiment, the leaking area 1602 and non-leaking, high-fluorescence seal area 1604 are each visible. In the depicted embodiment, the image has undergone the thresholding process to more clearly show the contrasting areas of the packaged product emitting high and low fluorescence. In one example, the thresholding process used Otsu's Threshold for a binary-type thresholding.

FIG. 17 shows the image of FIG. 16 having undergone an elimination step to remove the high-fluorescence seal area according to any of the algorithms or models described herein. The resulting image 1700 depicts the leaking area 1702 as white while the seal area 1704 has been eliminated as non-leaking. In one example, the area step (e.g., area thresholding) used Contour Detection, set to maximum area elimination at the product boundary.

FIG. 18 shows the resulting identification of the leaking areas (surrounded by red lines) on the packaged product after the steps of FIGS. 13-17. The image 1800 includes leaking area 1802 identified as defective, gas-filled area and the seal area 1804 ignored.

Another example test is shown in FIGS. 19-22, which depict a cooked, boneless deli ham packaged in Film No. 1 after having a large puncture (~2-3 mm) artificially made in the package. In some instances, a large puncture may be referred to as a "bone puncture" without regard to the actual cause of the puncture.

FIG. 19 is a color image of two vacuum packaged ham products including a control packaged product 1900 (package on left, no leak) and a leaker packaged product 1902 (on the right), the image being taken after the large puncture (~2-3 mm) was made through the film of the vacuum package 1902 on the right. Both ham products were packaged in 10"×24" end-seal bags made from Film No. 1. After vacuum packaging in a rotary chamber vacuum machine (see FIG. 1D), the film was shrunk tight against the meat by passing the packaged product through a shrink tunnel.

FIG. 20 is a color image of the two vacuum packaged ham products of FIG. 19, with the image of FIG. 20 being taken 1 minute after the bone puncture occurred through the film of the package on the right. In FIG. 20, the control ham package 2000 is unchanged from FIG. 19; however, a leak 2004 is visibly appearing in the fluorescence of the leaking ham package 2002. The enhanced fluorescence is due to the gas that has entered the vacuum package through the leak.

FIG. 21 is a color image of the two vacuum packaged ham products of FIGS. 19 and 20, with the image of FIG. 21 being taken 5 minutes after the bone puncture occurred through the film of the package on the right. In FIG. 21, the control ham package 2100 is unchanged from FIG. 19; however, a leak 2104 is visibly larger in the fluorescence of the leaking ham package 2102 than in FIG. 19 or 20. The further enhanced fluorescence is due to the still greater amount of gas that has entered the vacuum package through the leak.

Based on the puncture shown in FIGS. 19-21, the baseline leaker detection index value was determined to be $I_{D0}=547$. After 1 minute, the leaker detection index value was $I_{D1}=13,115$. And after 5 minutes the leaker detection index value was $I_{D5}=29,152$.

FIG. 22 is a graph of leaker detection index as a function of time for the index values provided for the puncture embodiment images of FIGS. 19-21. The upwardly sloping curve shows how leaker detection index increases as a function of time. In the present example, a hypothesis threshold was set at a leaker detection index of 0.5.

Turning to FIGS. 23-26, another example test is shown, which depict a cooked, boneless deli ham packaged in Film No. 1 after having a small puncture (~1 mm) artificially made in the package. In some instances, a small puncture may be referred to as a "pinhole" or "pinhole puncture" without regard to the actual cause of the puncture.

FIG. 23 is a color image of two vacuum packaged ham products including a control packaged product 2300 (package on left, no leak) and a leaker packaged product 2302 (on the right), the image being taken after the small puncture (~1 mm) was made through the film of the vacuum package 2302 on the right. Both ham products were packaged in 10"×24" end-seal bags made from Film No. 1. After vacuum packaging in a rotary chamber vacuum machine (see FIG. 1D), the film was shrunk tight against the meat by passing the packaged product through a shrink tunnel.

FIG. 24 is a color image of the two vacuum packaged ham products of FIG. 23, with the image of FIG. 24 being taken 40 seconds after the pinhole puncture occurred through the film of the package on the right. In FIG. 24, the control ham package 2400 is unchanged from FIG. 23; however, a leak 2404 is visibly appearing in the fluorescence of the leaking ham package 2402. The enhanced fluorescence is due to the gas that has entered the vacuum package through the leak.

FIG. 25 is a color image of the two vacuum packaged ham products of FIGS. 23 and 24, with the image of FIG. 25 being taken 250 seconds after the small puncture occurred through the film of the package on the right. In FIG. 25, the control ham package 2500 is unchanged from FIG. 23; however, a leak 2504 is visibly larger in the fluorescence of the leaking ham package 2502 than in FIG. 23 or 24. The further enhanced fluorescence is due to the still greater amount of gas that has entered the vacuum package through the leak.

Based on the puncture shown in FIGS. 23-25, the baseline leaker detection index value was determined to be $I_{D0}=159$. After 1 minute, the leaker detection index value was $I_{D40}=1,842$. And after 5 minutes the leaker detection index value was $I_{D250}=6,004$.

FIG. 26 is a graph of leaker detection index as a function of time for the index values provided for the puncture embodiment images of FIGS. 23-25. The upwardly sloping curve shows how leaker detection index increases as a function of time. In the present example, a hypothesis threshold was set at a leaker detection index of 1000.

Low-Vac Detection Feasibility Test

In one example embodiment, a low-vac condition was simulated to observe the ability of the systems and methods described herein to detect a low-vac in a sealed package. As described herein, a low-vac condition occurs where a packaged product is sealed, but the vacuum process failed to remove sufficient gas from the packaging article prior to sealing and excess gas is present in the packaged product above a satisfactory amount. The following describes the test setup and results of the low-vac detection feasibility test involving a cooked, deli ham product. For the test, the unsupervised learning technique Anomaly Detection was utilized in combination with several image pre-/post-processing techniques including imaging texture analysis (low-vac detection index values were calculated) to achieve detection and classification.

Test Preparation—Packaging, Setups

Packaging Machine Information:
UltraVac 2100
Program 1
Seal: 1.0
Vacuum settings:
Control packages: 97% Vacuum+Vac Plus 4
Low vacuum packages: 93% Vacuum
Package Information:
The ham packages ranged from 4"-5.5" in height, and the cut face was about 6.5-8" in diameter.

| Material | Package | Torr |
|---|---|---|
| Control (0 ppm of indicator) | C-L (low vac) | 30.8 |
| | C 1 | 4.5 |
| | C 2 | 4.5 |
| | C 3 | 4.5 |
| Film 2 (18 ppm of indicator) | F2-L (low vac) | 31.5 |
| | F2 1 | 4.5 |
| | F2 2 | 4.5 |
| | F2 3 | 4.5 |
| Film 1 (52 ppm of indicator) | F1-L (low vac) | 32.3 |
| | F1 1 | 5.3 |
| | F1 2 | 5.3 |
| | F1 3 | 4.5 |

With reference to FIGS. 27-29, the captured images and resulting analysis for the Film No. 1 test is shown. FIG. 27 shows the color photo of the control 2702 and low-vac 2700 hams with colormap adjustment, each being packaged in Film No. 1. In the photos, the low-vac ham 2700 shows a pattern of high fluorescence 2704 where gas is built up in the packaging article, while the baseline ham shows no gas at the same location 2706. Each packaged product shows high fluorescence at the seal 2708, 2710.

FIGS. 28-29 show the images of FIG. 27 having a texture analysis applied as described above, with the area of gas 2804 visible and identified in the textured images 2904 of the low-vac condition 2800, while no similar texture 2906 is identified in the same area 2806 of the baseline image 2802. Each packaged product shows high fluorescence at the seal 2808, 2810, which section is removed during the texture analysis as described herein. The resulting analysis determined that the Texture Index Value of the low-vac test ham was 14,449 and the Texture Index Value of the baseline test ham was 339, showing ready identification and differentiation of the gas present in the low-vac condition.

FIG. 30 shows example hue, saturation, value (HSV) plots used in connection with an example image masking process as described with any of the texture identification processes herein (e.g., converting from FIG. 15 to FIG. 16 or FIG. 27 to FIG. 28). Using image masking, the captured image data may be filtered to remove undesirable portions of the image to focus on portions of the received image data corresponding to the properties of the fluorescence-based indicator described herein. The HSV plot further shows the hue, saturation, and value of an example image captured by the imaging devices herein, although the exact parameters of the images may vary depending on the imaging device, illumination, and indicator used. In the hue plot, the boxed area generally corresponds to the color spectrum from an approximately teal color to an approximately violet color (e.g., the leftward-oriented spike in hue near the "H" label corresponding to teal, and clockwise from teal the large hue spikes correspond to ~green, ~yellow, ~red, ~pink, and ~blue).

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation. Color images may be filed with the present disclosure for illustration of some example embodiments, and should be understood to not be required or limiting in each instance. Greyscale versions of the figures of the present disclosure may be converted to color using approximately the HSV values shown in example FIG. 30 or the wavelengths disclosed herein in some embodiments. Attached herewith is an Appendix A comprising greyscale versions of FIGS. 1A-30.

What is claimed is:

1. A process for detecting a defective vacuum-packaged product, the process comprising:
providing a packaged product comprising a product enclosed within a packaging article, wherein the packaging article comprises a multilayer film having at least one inner layer containing a fluorescence-based indicator, wherein the fluorescence-based indicator is present in at least one layer of the film, with the fluorescence-based indicator being present at a level of from 0.5 to 150 ppm, based on layer weight;
exposing the packaged product to incident electromagnetic energy to produce an excited fluorescence-based indicator, wherein the excited fluorescence-based indicator emits fluorescent electromagnetic energy; and
determining, based on the fluorescent electromagnetic energy emitted by the excited fluorescence-based indicator, that gas is present within the packaging article.

2. The process of claim 1, wherein determining that the gas is present within the packaging article comprises determining that the film exhibits at least one of (i) a higher fluorescent electromagnetic energy in a first region in which gas is between the film and the product, relative to a second region in which gas is not present between the film and the product, and (ii) a fluorescent electromagnetic energy color shift in the first region wherein gas is between the film and the product.

3. The process of claim 1, wherein determining, based on the fluorescent electromagnetic energy emitted by the excited fluorescence-based indicator, that the gas is present within the packaging article is indicative of at least one of a hole in the packaging article, a gap in a seal of the packaging article, a defect in the film of the packaging article, or a low-vac condition in the packaging article.

4. The process of claim 1, wherein the fluorescence-based indicator comprises at least one member selected from the group consisting of ultraviolet-indicator, infrared-indicator, dye, pigment, optical brightener, fluorescent whitening agent, 2,2'-(2,5-thiophenylenediyl)bis(5-tert-butylbenzoxazole), hydroxyl-4-)p-tolylamino)anthracene-9,10-dione, 2,5-thiophenediylbis(5-tert-butyl-1,3-benzoxazole), and anthraquinone dyestuff; the fluorescence-based indicator is present in at least one layer of the film, with the fluorescence-based indicator being present at a level of from 0.5 to 150 ppm, based on layer weight.

5. The process of claim 1, wherein in an instance in which the gas is detected within the packaging article, the process further comprises unpackaging the product from the packaging article and repackaging the product in a second packaging article.

6. The process of claim 1, wherein determining, based on the fluorescent electromagnetic energy emitted by the excited fluorescence-based indicator, that the gas is present within the packaging article, comprises determining that greater than a threshold quantity of the gas is present within the packaging article.

7. The process of claim 1, wherein determining, based on the fluorescent electromagnetic energy emitted by the excited fluorescence-based indicator, that the gas is present within the packaging article, comprises determining that greater than a threshold pressure of the gas is present within the packaging article.

8. The process of claim 1, wherein providing the packaged product comprising the product enclosed within the packaging article comprises:

placing the product inside the packaging article;
evacuating gas from the packaging article; and
at least partially sealing the packaging article to create the packaged product.

9. The process of claim 8, wherein the film is a heat-shrinkable film; wherein providing the packaged product further comprises shrinking the film against the product after evacuating the gas from the packaging article; and wherein determining that the gas is present within the packaging article occurs before shrinking the film;.

10. The process of claim 1, wherein determining that the gas is present within the packaging article comprises:
generating image data based on the fluorescent electromagnetic energy emitted by the excited fluorescence-based indicator; and
analyzing the image data to determine whether the fluorescent electromagnetic energy emitted by the excited fluorescence-based indicator is indicative of gas within the packaging article.

11. The process of claim 10, wherein analyzing the image data comprises determining whether at least a portion of the packaged product exhibits a fluorescence wavelength and/or intensity of fluorescence corresponding with a presence of gas between the product and the film.

12. The process of claim 10 wherein generating the image data comprises capturing raw data with an imaging device and converting the raw data into the image data wherein analyzing the image data is carried out using a computing apparatus comprising computer executable instructions configured to determine whether the fluorescent electromagnetic energy emitted by the excited fluorescence-based indicator is indicative of the gas within the packaging article, wherein the computer executable instructions comprise a trained model.

13. The process of claim 11, wherein the at least the portion of the packaged product defines an area greater than a threshold area of the packaged product.

14. The process of claim 11, wherein analyzing the image data comprises determining whether the at least the portion of the packaged product exhibits the fluorescence wavelength and/or the intensity of fluorescence corresponding with the presence of gas between the product and the film comprises detecting a threshold fluorescence wavelength and/or threshold intensity of fluorescence.

15. The process of claim 14, wherein the threshold fluorescence wavelength and/or the threshold intensity of fluorescence indicates a threshold quantity of the gas inside the packaging article.

16. The process of claim 14, wherein the threshold fluorescence wavelength and/or the threshold intensity of fluorescence indicates a threshold pressure of the gas inside the packaging article.

17. The process of claim 1, wherein the at least one inner layer comprises a functional layer; and wherein the fluorescence-based indicator is present in the functional layer selected from the group consisting of oxygen barrier layer, organoleptic barrier layer, moisture barrier layer, hazardous chemical barrier layer, microbial barrier layer, acid layer, acid salt layer, bacteriocin layer, bacteriophage layer, metal layer, metal salt layer, natural oil layer, natural extract layer, layer containing polyhexamethylene biguanide hydrochloride, layer containing paraben, layer containing grafted silane-quaternary amine, layer containing triclosan, layer containing zeolite of silver, copper, and/or zinc.

18. The process of claim 17, wherein the functional layer is an oxygen barrier layer comprising at least one member selected from the group consisting of vinylidene chloride copolymer, saponified ethylene/vinyl acetate copolymer, polyamide, polyester, oriented polypropylene, and ethylene homopolymer.

19. The process of claim 17, wherein the multilayer film comprises:
A) a first layer which is a first outer film layer configured to serve as a heat seal layer;
B) a second layer which is a second outer layer configured to serve as an abuse layer;
C) a third layer which is between the first layer and the second layer, wherein the third layer is configured to serve as a functional layer;
D) a fourth layer which is between the first layer and the third layer, wherein the fourth layer is configured to serve as a first tie layer; and
E) a fifth layer which is between the second layer and the third layer, wherein the fifth layer is configured to serve as a second tie layer.

20. A system for detecting a defective vacuum-packaged product, the system comprising:
a packaging article comprising a multilayer film having at least one inner layer containing a fluorescence-based indicator, wherein the fluorescence-based indicator is present in at least one layer of the film, with the fluorescence-based indicator being present at a level of from 0.5 to 150 ppm, based on layer weight;
wherein the packaging article is configured to receive a product therein;
wherein the fluorescence-based indicator is configured to emit enhanced fluorescent electromagnetic energy in an instance in which the fluorescence-based indicator is excited by incident electromagnetic energy; and
wherein the fluorescent electromagnetic energy emitted by the excited fluorescence-based indicator is indicative of whether a gas is present within the packaging article.

21. The system of claim 20 further comprising: an imaging device configured to generate image data based on the fluorescent electromagnetic energy emitted by the excited fluorescence-based indicator;
a computing apparatus comprising computer executable instructions configured to, when executed by the computing apparatus, cause the computing apparatus to determine whether the fluorescent electromagnetic energy emitted by the excited fluorescence-based indicator is indicative of the gas within the packaging article; wherein the computer executable instructions are further configured to, when executed by the computing apparatus, cause the computing apparatus to determine whether the fluorescent electromagnetic energy emitted by the excited fluorescence-based indicator is indicative of the gas above a predetermined threshold quantity or pressure within the packaging article;
means for generating image data based on the fluorescent electromagnetic energy emitted by the excited fluorescence-based indicator; and
means for determining whether the fluorescent electromagnetic energy emitted by the excited fluorescence-based indicator is indicative of the gas within the packaging article.

22. A packaging article comprising:
a multilayer film having at least one inner layer containing a fluorescence-based indicator, wherein the fluorescence-based indicator is present in at least one layer of the film, with the fluorescence-based indicator being present at a level of from 0.5 to 150 ppm, based on layer weight;

wherein the packaging article is configured to receive a product therein;

wherein the fluorescence-based indicator is configured to emit fluorescent electromagnetic energy in an instance in which the fluorescence-based indicator is excited by incident electromagnetic energy; and wherein the fluorescent electromagnetic energy emitted by the excited fluorescence-based indicator is indicative of whether a gas is present within the packaging article.

* * * * *